US012573915B2

(12) United States Patent
Nakamura et al.

(10) Patent No.: US 12,573,915 B2
(45) Date of Patent: Mar. 10, 2026

(54) MOTOR WITH DECELERATION MECHANISM

(71) Applicant: MITSUBA Corporation, Gunma (JP)

(72) Inventors: Osamu Nakamura, Gunma (JP); Keisuke Toriyama, Gunma (JP)

(73) Assignee: MITSUBA Corporation, Gunma (JP)

( * ) Notice: Subject to any disclaimer, the term of this patent is extended or adjusted under 35 U.S.C. 154(b) by 231 days.

(21) Appl. No.: 18/281,559

(22) PCT Filed: Mar. 28, 2022

(86) PCT No.: PCT/JP2022/015046

§ 371 (c)(1),
(2) Date: Sep. 11, 2023

(87) PCT Pub. No.: WO2022/270096

PCT Pub. Date: Dec. 29, 2022

(65) Prior Publication Data

US 2024/0162783 A1 May 16, 2024

(30) Foreign Application Priority Data

| Jun. 23, 2021 | (JP) | ................................ | 2021-104164 |
| Jun. 25, 2021 | (JP) | ................................ | 2021-105462 |
| Jun. 25, 2021 | (JP) | ................................ | 2021-105962 |

(51) Int. Cl.
| *H02K 7/116* | (2006.01) |
| *B60S 1/08* | (2006.01) |
| *B60S 1/26* | (2006.01) |

(52) U.S. Cl.
CPC ............... *H02K 7/1166* (2013.01); *B60S 1/08* (2013.01); *B60S 1/26* (2013.01)

(58) Field of Classification Search
CPC ...... H02K 7/1166; H02K 7/116; H02K 7/081; H02K 7/1163; H02K 11/38; H02K 5/10;
(Continued)

(56) References Cited

U.S. PATENT DOCUMENTS

2017/0353079 A1* 12/2017 Iso ......................... B60S 1/0807
2018/0083507 A1* 3/2018 Tokizaki .................. H02K 3/50

FOREIGN PATENT DOCUMENTS

| JP | H07322547 | 12/1995 |
| JP | 2000116049 | 4/2000 |
(Continued)

OTHER PUBLICATIONS

Machine translation of JP-2011072053-A. (Year: 2011).*
(Continued)

*Primary Examiner* — Michael Andrews
(74) *Attorney, Agent, or Firm* — JCIPRNET

(57) ABSTRACT

A cylindrical member 93 is provided with a pair of slits 93*a*, 93*b* extending in the axial direction of the cylindrical member 93. The opening widths of the pair of slits 93*a*, 93*b* in the circumferential direction of the cylindrical member 93 are narrower on the outside (opening widths W2, W4) of the cylindrical member 93 than on the inside (opening widths W1, W3) thereof. This makes it possible to prevent rainwater and the like from reaching a communication hole 91 inside the cylindrical member 93 and quickly discharge the rainwater and the like intruded into the inside of the cylindrical member 93 to the outside of the cylindrical member 93. Accordingly, it is possible to effectively prevent the rainwater and the like from intruding into the inside (hollow portion) of a gear cover 80, thereby enabling to improve a water exposure reliability.

15 Claims, 32 Drawing Sheets

(58) Field of Classification Search
CPC .. H02K 5/16; H02K 2205/09; H02K 2213/09;
B60S 1/08; B60S 1/26
USPC ......................................................... 310/83
See application file for complete search history.

(56) References Cited

FOREIGN PATENT DOCUMENTS

| | | | |
|----|-----------------|---|---------|
| JP | 2005137092 | | 5/2005 |
| JP | 2008148388 | | 6/2008 |
| JP | 2011072053 | | 4/2011 |
| JP | 2011072053 A | * | 4/2011 |
| JP | 2011241863 | | 12/2011 |
| JP | 2014219044 | | 11/2014 |
| JP | 2016086539 | | 5/2016 |
| JP | 2017096370 | | 6/2017 |
| JP | 2017096370 A | * | 6/2017 |

OTHER PUBLICATIONS

Machine translation of JP-2017096370-A. (Year: 2017).*
"Notice of Reasons for Refusal of Japan Counterpart Application",
issued on Oct. 22, 2024, with English translation thereof, p. 1-p. 8.
"International Search Report (Form PCT/ISA/210) of PCT/JP2022/
015046", mailed on May 31, 2022, with English translation thereof,
pp. 1-4.

* cited by examiner

MOTOR WITH DECELERATION MECHANISM

CROSS-REFERENCE TO RELATED APPLICATION

This application is a 371 application of the International PCT application serial no. PCT/JP2022/015046, filed on Mar. 28, 2022, which claims the priority benefits of Japan Patent Application No. 2021-104164, filed on Jun. 23, 2021, Japan Patent Application No. 2021-105462, filed on Jun. 25, 2021, and Japan Patent Application No. 2021-105962, filed on Jun. 25, 2021. The entirety of each of the above-mentioned patent applications is hereby incorporated by reference herein and made a part of this specification.

TECHNICAL FIELD

The present invention relates to a motor with a deceleration mechanism including a motor part having a rotation shaft and a deceleration mechanism part having a deceleration mechanism for decelerating rotation of the rotation shaft.

BACKGROUND ART

For example, a motor with a deceleration mechanism is used as a drive source for a wiper device, a power window device, or the like. Particularly, a motor with a deceleration mechanism used as a drive source for a wiper device is installed in an engine room in a high-temperature atmosphere and continuously operated for a relatively long period of time. Thus, the temperature of the motor with a deceleration mechanism rises, and if it is exposed to water in this state, it will be rapidly cooled. Consequently, the inside of a housing is under a negative pressure, and there is concern that rainwater or the like may intrude into the housing. Hence, for example, a motor with a deceleration mechanism provided with a so-called "breathing function" in order to curb a situation in which the inside of a housing is under a negative pressure is described in Patent Literature 1.

A drive device (motor with a deceleration mechanism) described in Patent Literature 1 includes a gear case (housing) and a cover (housing), and a deceleration mechanism for decelerating rotation of a rotation shaft is accommodated inside the gear case and the cover. Further, the cover is provided with a vent hole for communication between the inside and the outside thereof. Accordingly, air can freely flow in and out through the vent hole in accordance with pressure fluctuation inside the housing.

CITATION LIST

Patent Literature

Patent Literature 1

Japanese Patent Laid-Open No. 2016-086539

SUMMARY OF INVENTION

Technical Problem

However, in the motor with a deceleration mechanism disclosed in Patent Literature 1 described above, there is concern that rainwater or the like may intrude through a vent hole depending on an attachment posture of the motor with a deceleration mechanism with respect to a vehicle. Since a control board for controlling a rotation state of a rotation shaft is provided inside a housing, there is a need to more reliably prevent rainwater or the like from intruding into the housing.

An object of the present invention is to provide a motor with a deceleration mechanism in which intrusion of rainwater or the like into a housing can be more reliably curbed and water exposure reliability can be improved.

Solution to Problem

According to an aspect of the present invention, there is provided a motor with a deceleration mechanism including a motor part having a rotation shaft and a deceleration mechanism part having a deceleration mechanism for decelerating rotation of the rotation shaft. The motor with a deceleration mechanism has a housing which accommodates the deceleration mechanism; a communication hole which is provided in the housing and allows communication between the inside and the outside of the housing; a cylindrical member which is provided outside the housing, which extends in an axial direction of the communication hole, and of which the inside communicates with the communication hole; and slits which are provided in the cylindrical member and extend in an axial direction of the cylindrical member. Opening widths of the slits in a circumferential direction of the cylindrical member are narrower on an outer side than on an inner side of the cylindrical member.

Advantageous Effects of Invention

According to the present invention, in a cylindrical member, slits extending in an axial direction of the cylindrical member are provided, and opening widths of the slits in a circumferential direction of the cylindrical member are narrower on an outer side than on an inner side of the cylindrical member. Accordingly, a situation in which rainwater or the like reaches a communication hole inside the cylindrical member can be curbed, and rainwater or the like which has intruded into the cylindrical member can be quickly discharged to the outside of the cylindrical member. Therefore, intrusion of rainwater or the like into a housing can be effectively curbed, and thus water exposure reliability can be improved.

Figure 17:
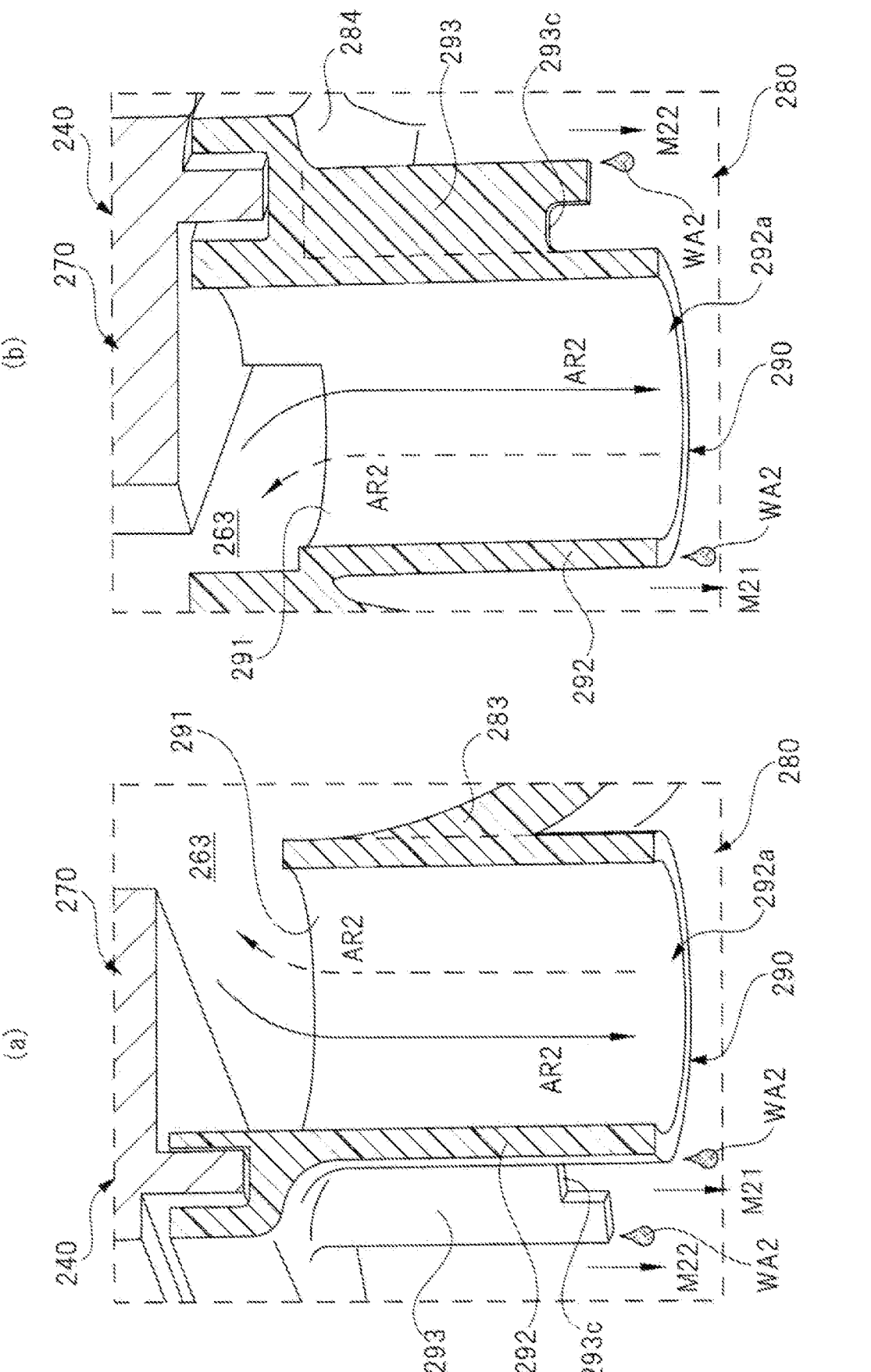

(a) and (b) of FIG. 17 are enlarged explanatory cross-sectional views of a state when the wiper motor is exposed to water.

Figure 18:
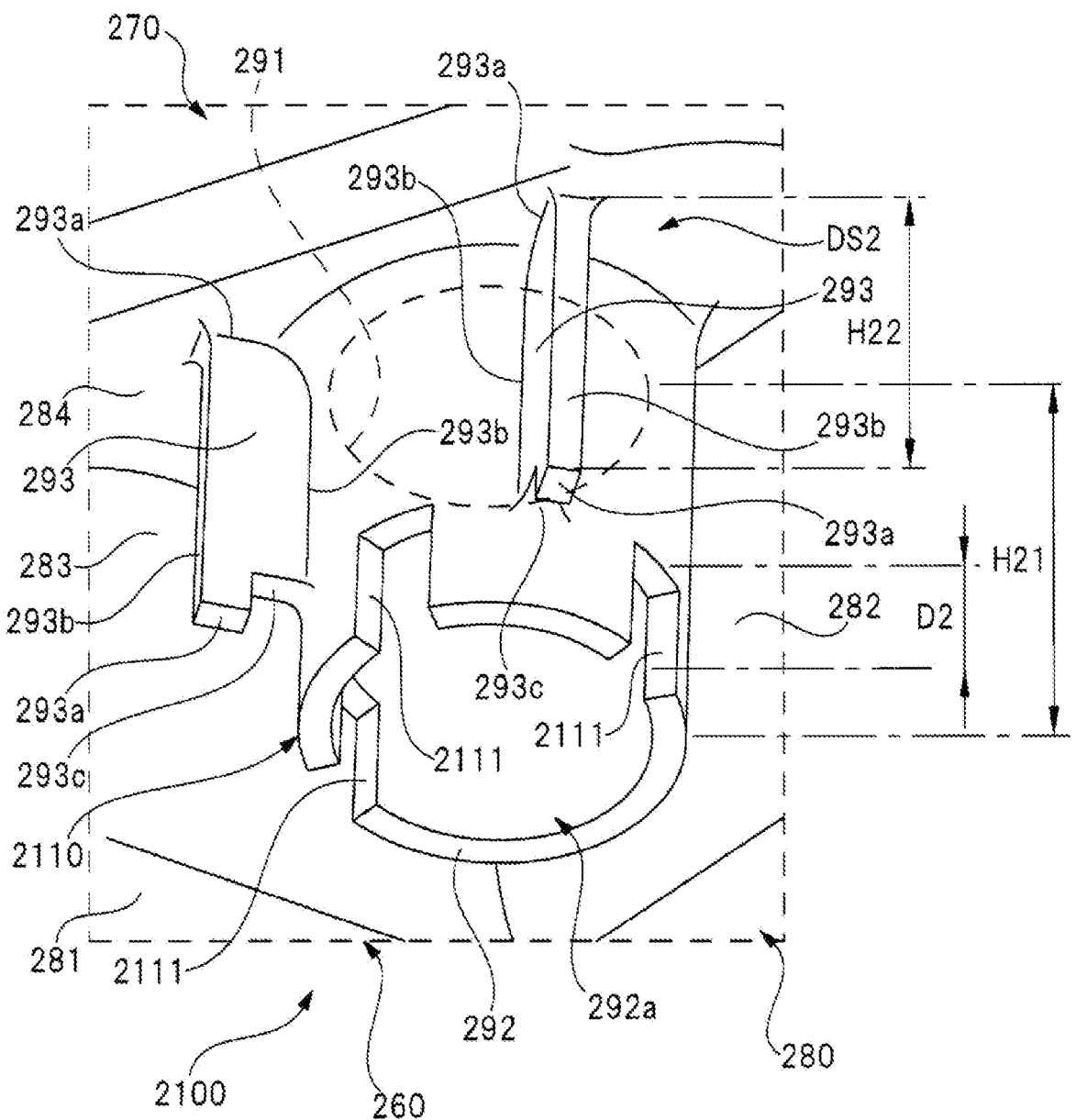

FIG. 18 is an enlarged perspective view around a cylindrical member in a wiper motor according to Embodiment 5.

Figure 19:
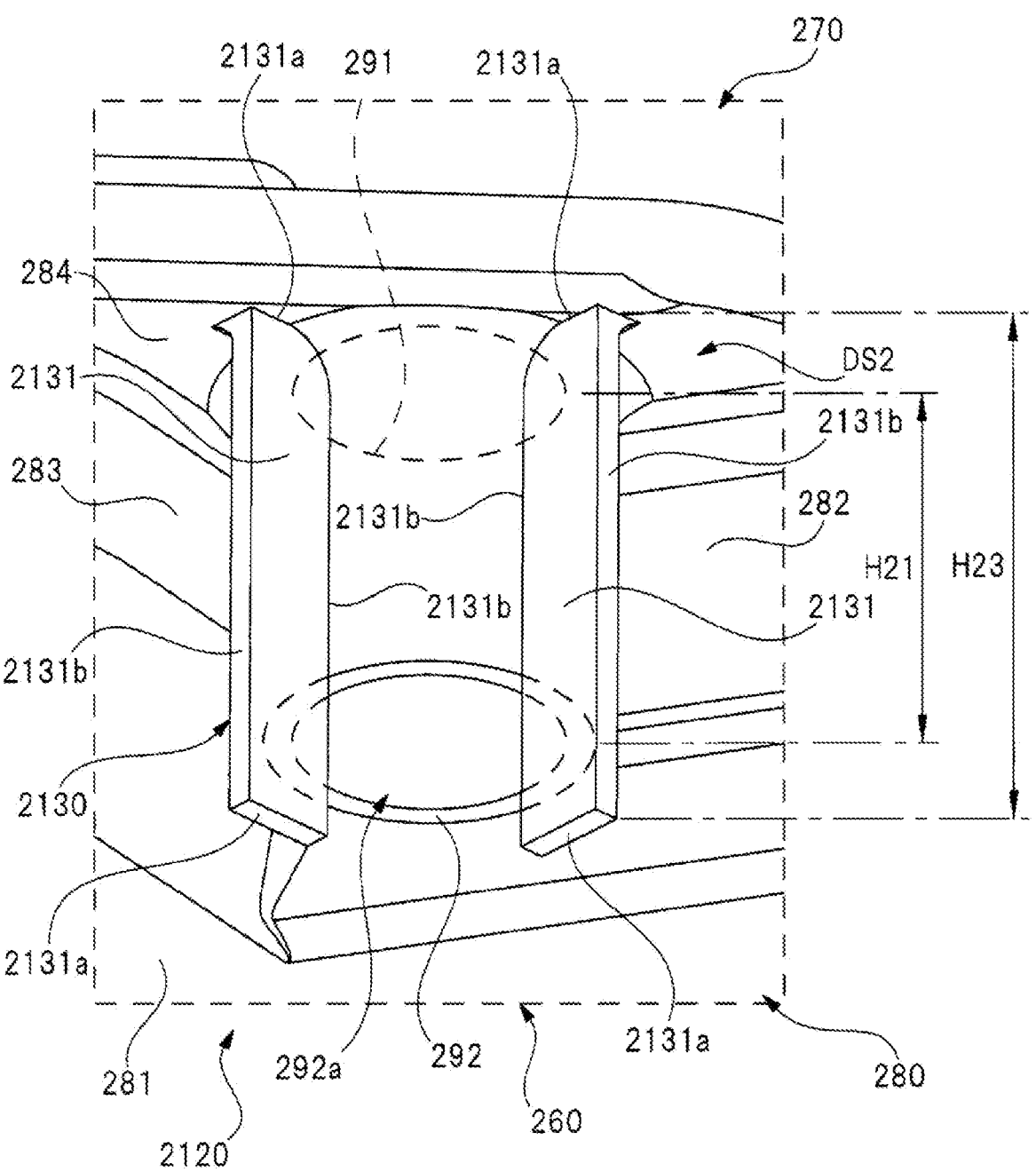

FIG. 19 is an enlarged perspective view around a cylindrical member in a wiper motor according to Embodiment 6.

Figure 20:
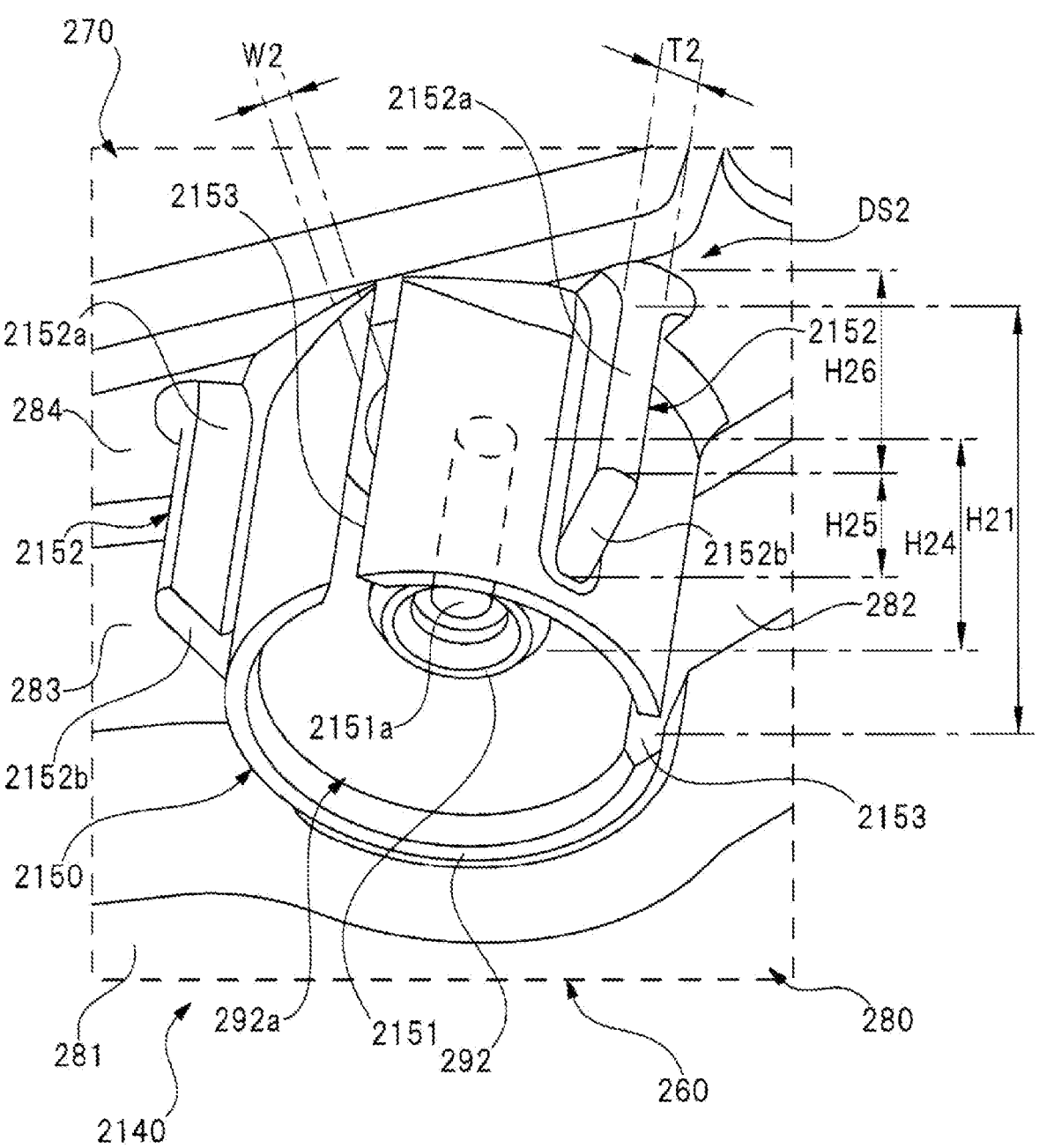

FIG. 20 is an enlarged perspective view around a cylindrical member in a wiper motor according to Embodiment 7.

Figure 21:
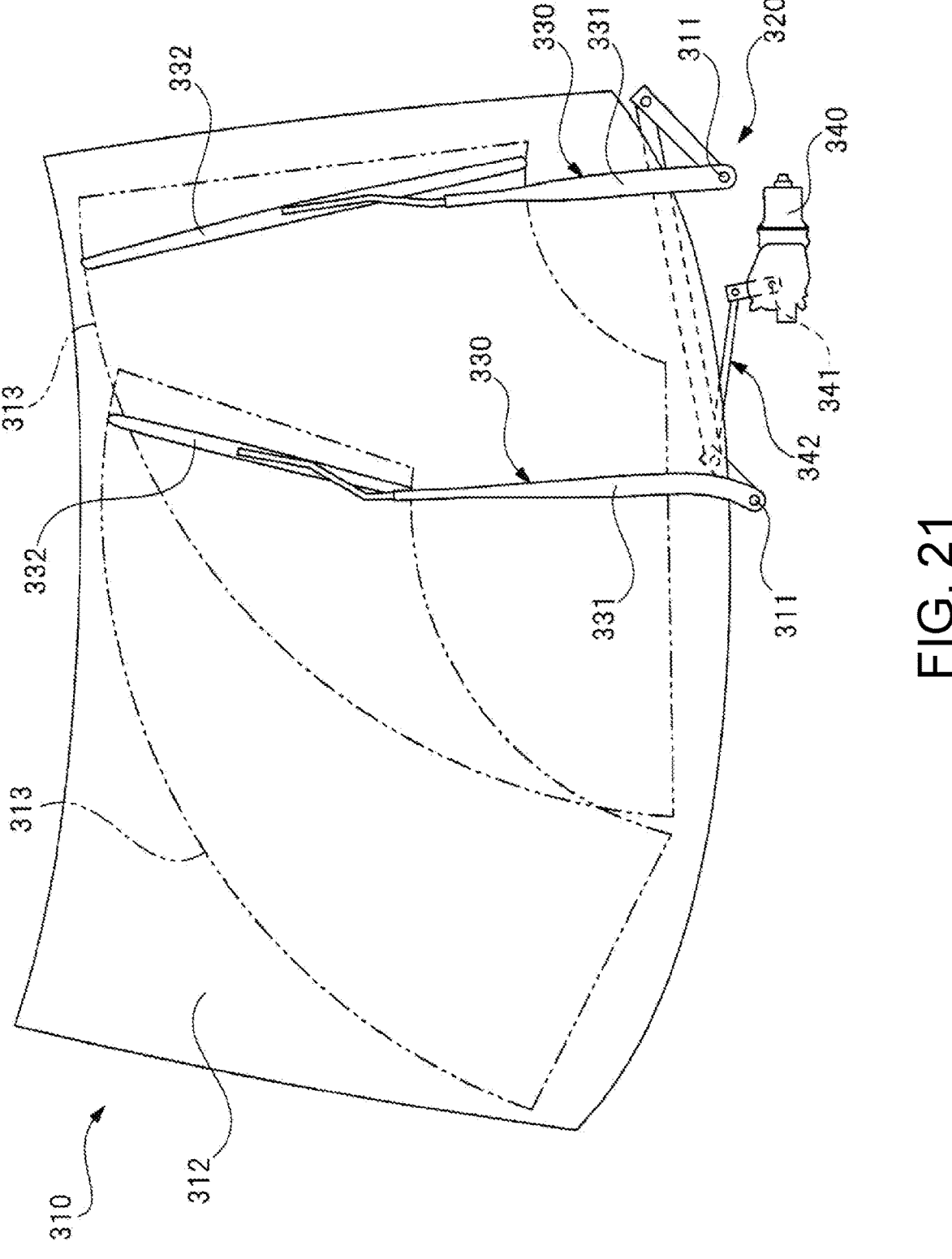

FIG. 21 is a schematic view of a vehicle in which the wiper motor is mounted.

Figure 22:
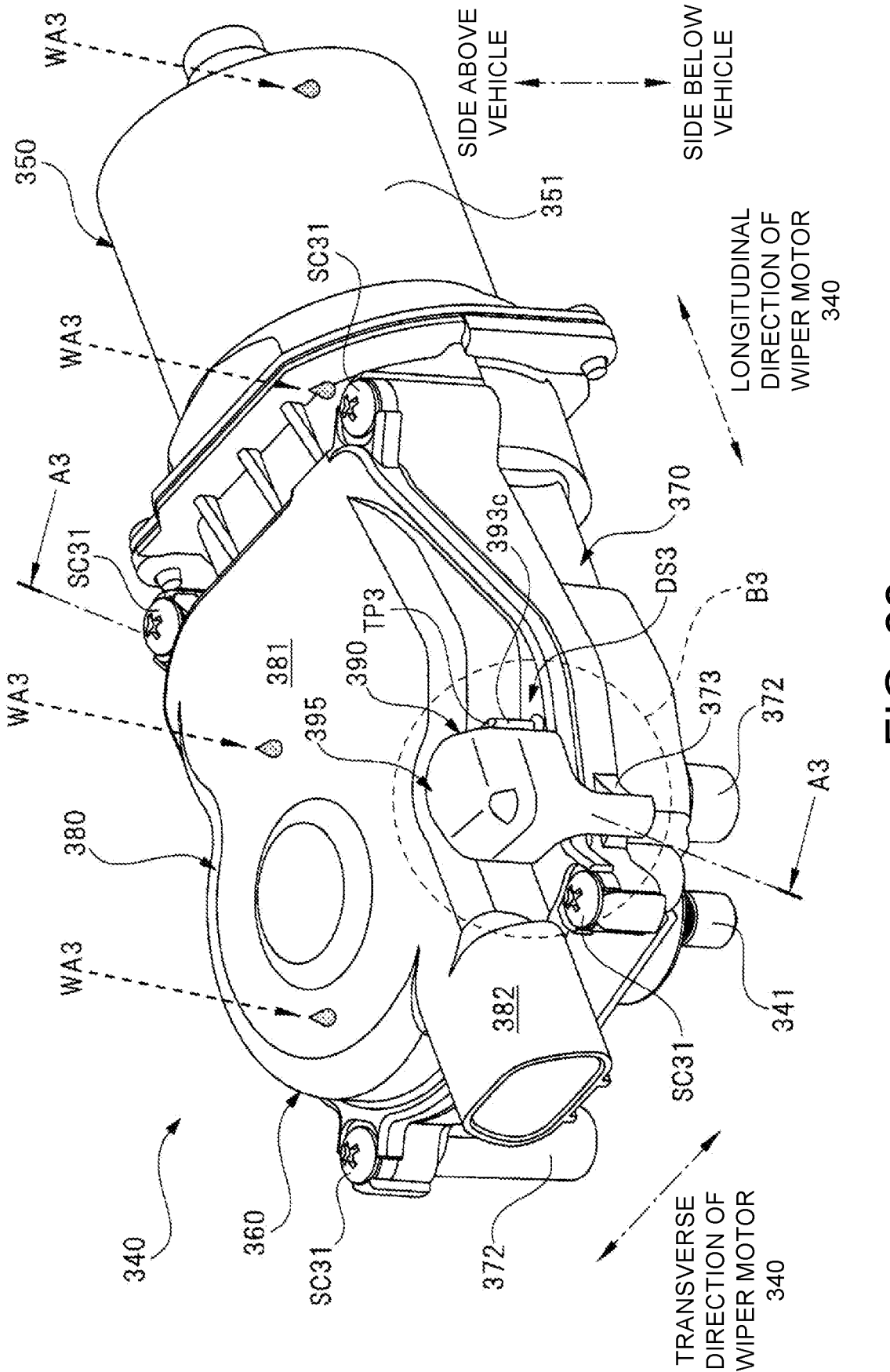

FIG. 22 is a perspective view illustrating the wiper motor in FIG. 21.

Figure 23:
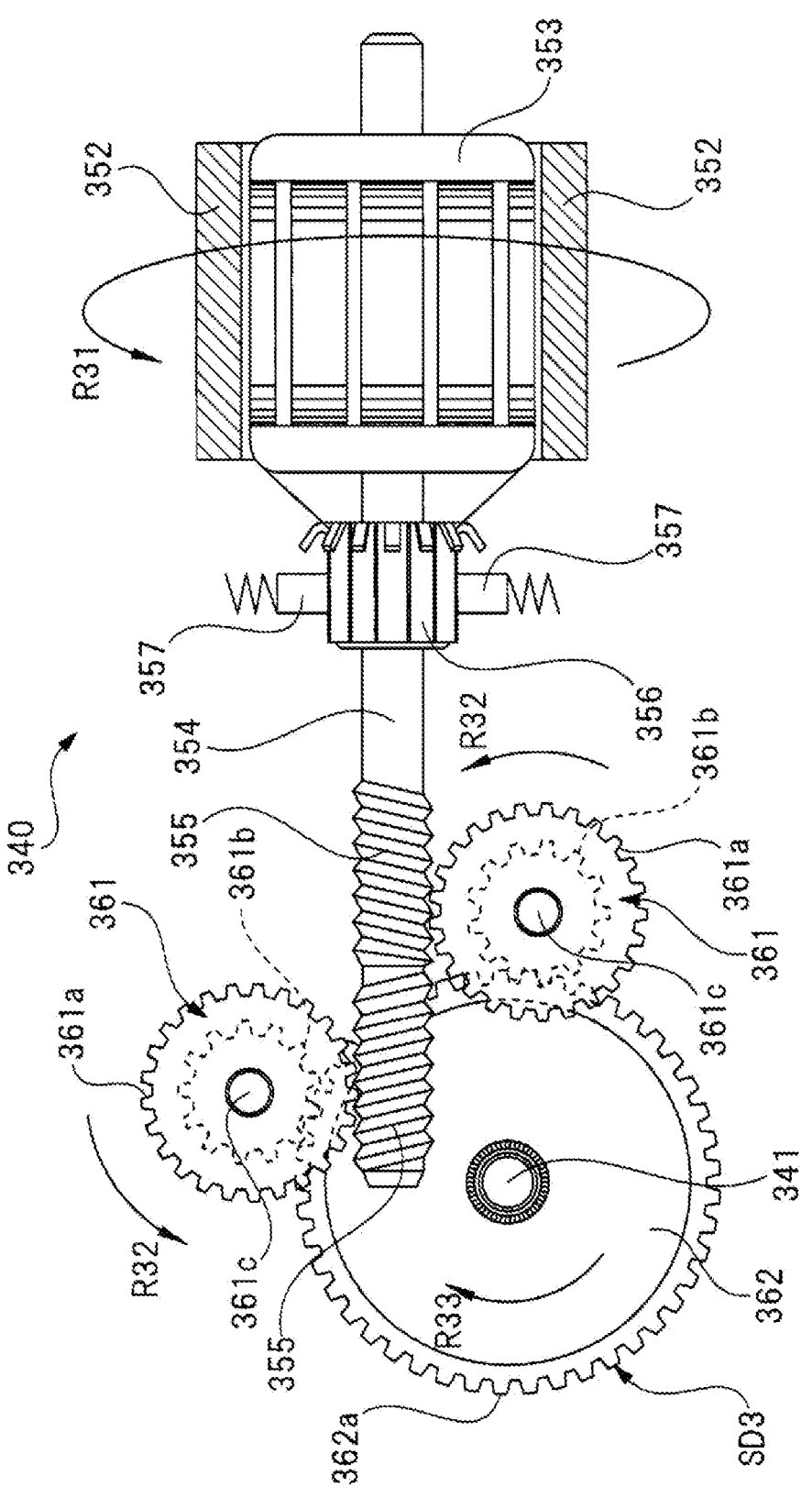

FIG. 23 is a cross-sectional view along line A3-A3 in FIG. 22.

Figure 24:
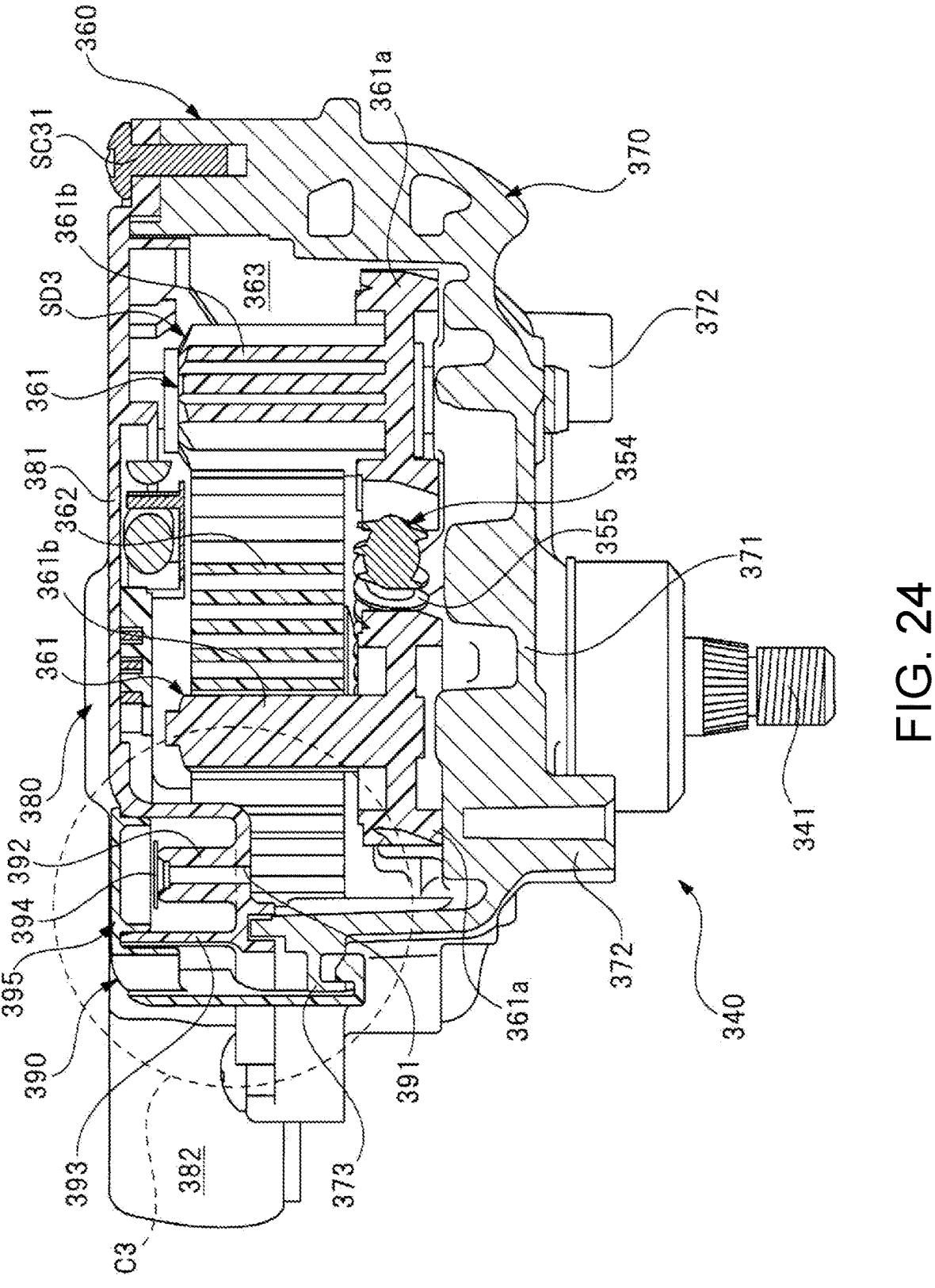

FIG. 24 is a view illustrating an internal structure of the wiper motor in FIG. 22.

Figure 25:
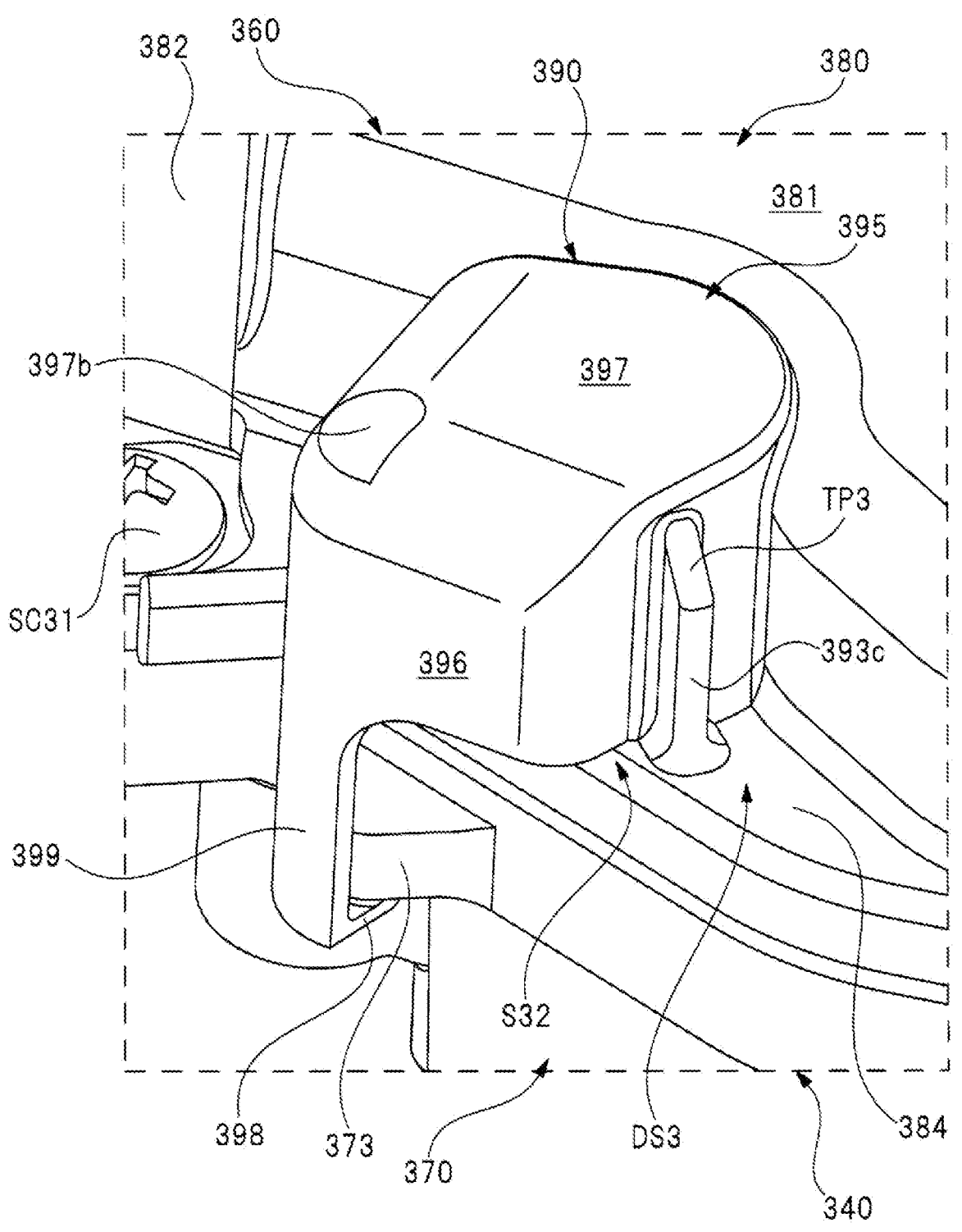

FIG. 25 is an enlarged view of a dashed circle B3 part in FIG. 22.

Figure 26:
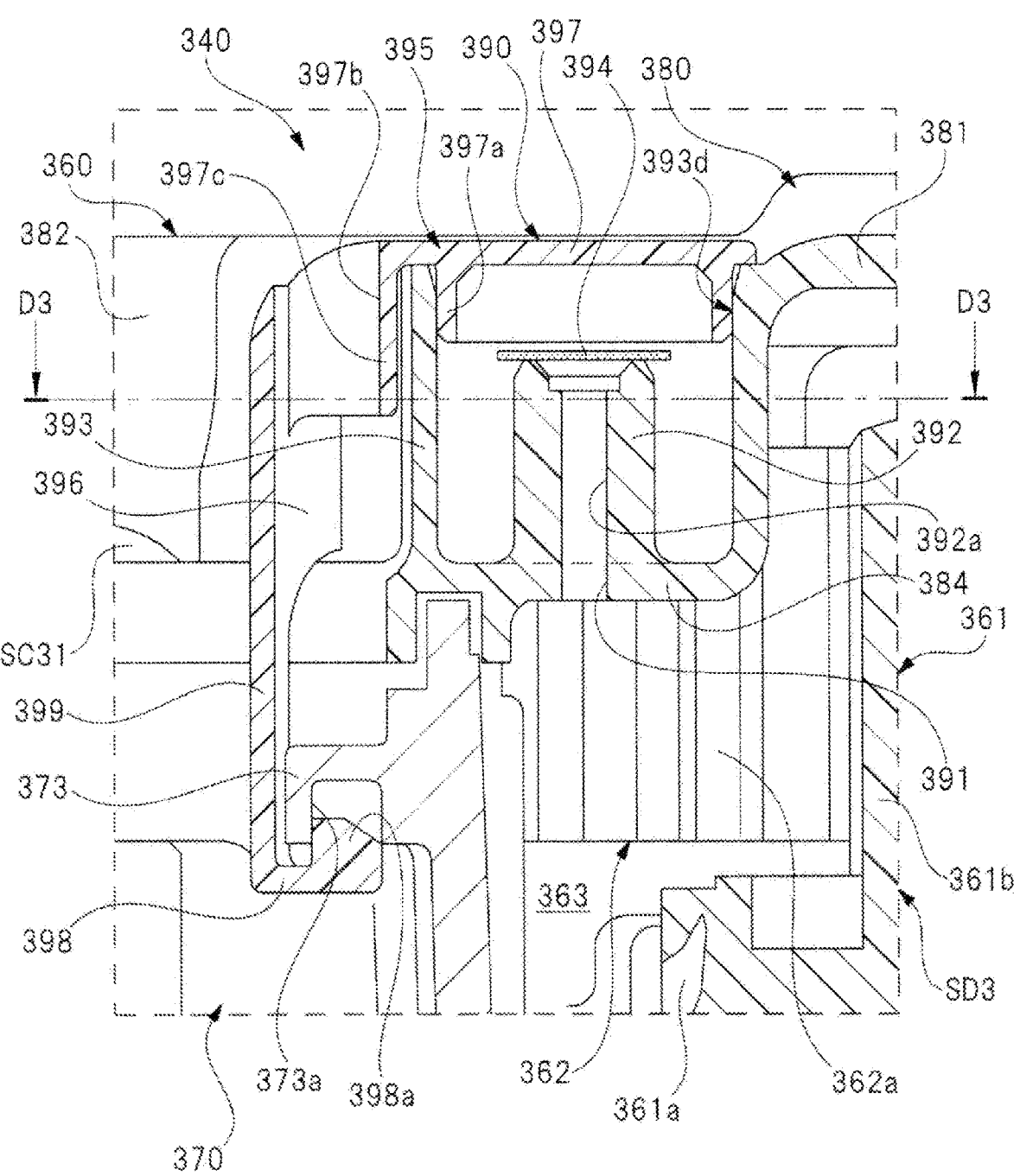

FIG. 26 is an enlarged view of a dashed circle C3 part in FIG. 24.

Figure 27:
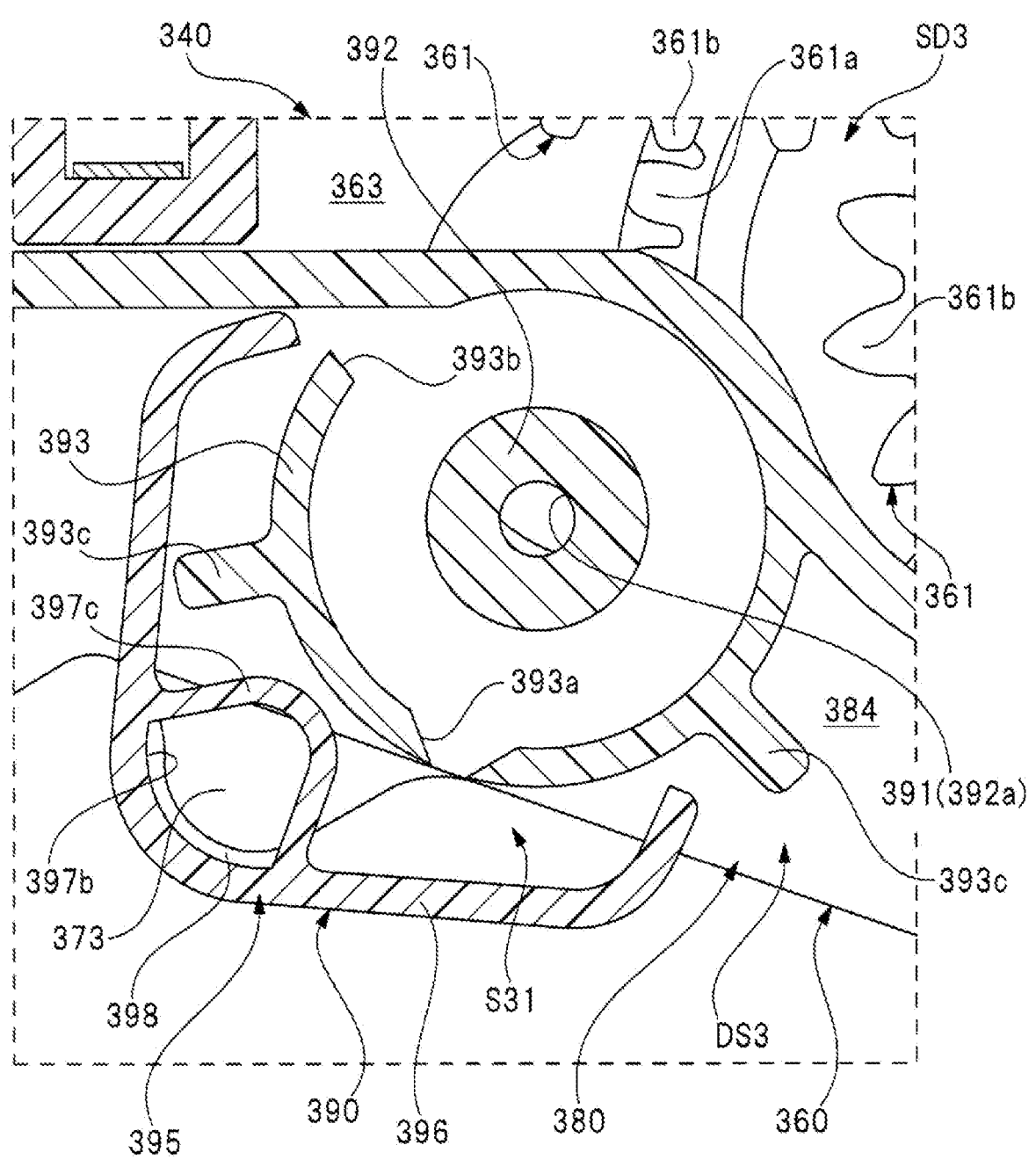

FIG. 27 is a cross-sectional view along line D3-D3 in FIG. 26.

Figure 28:
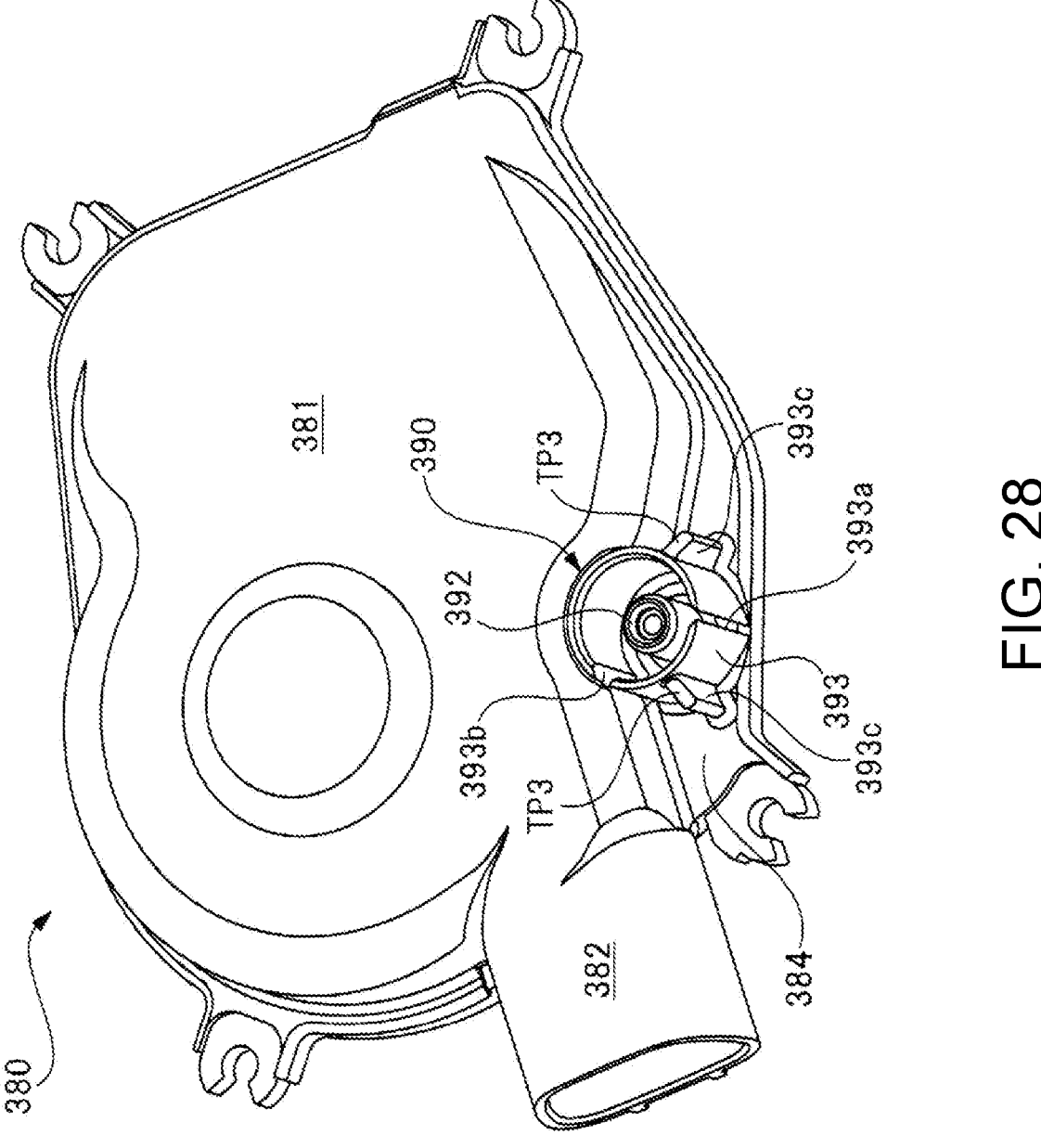

FIG. 28 is a perspective view of a single gear cover.

Figure 29:
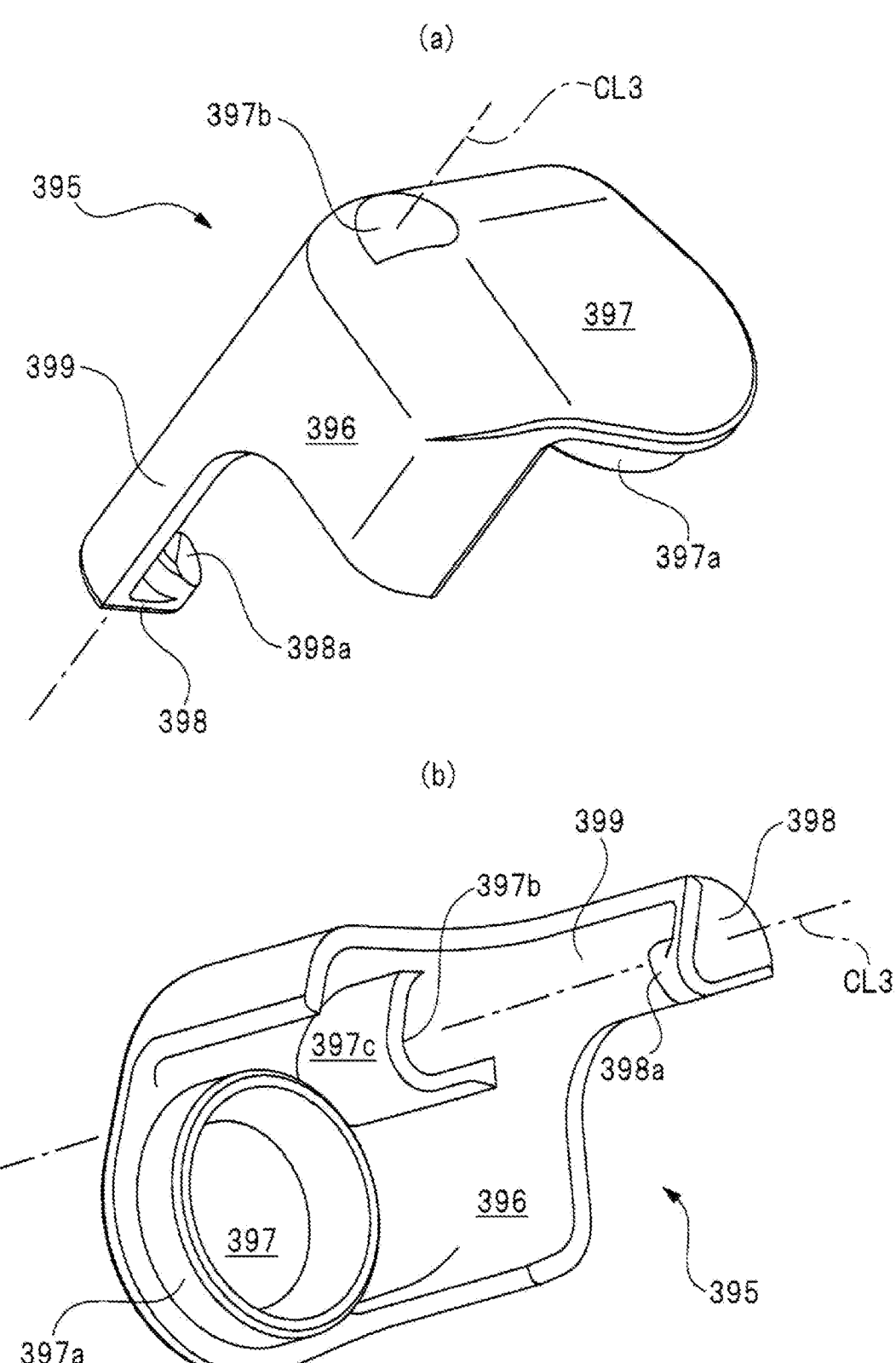

(a) and (b) of FIG. 29 are perspective views of a single breather cap.

Figure 30:
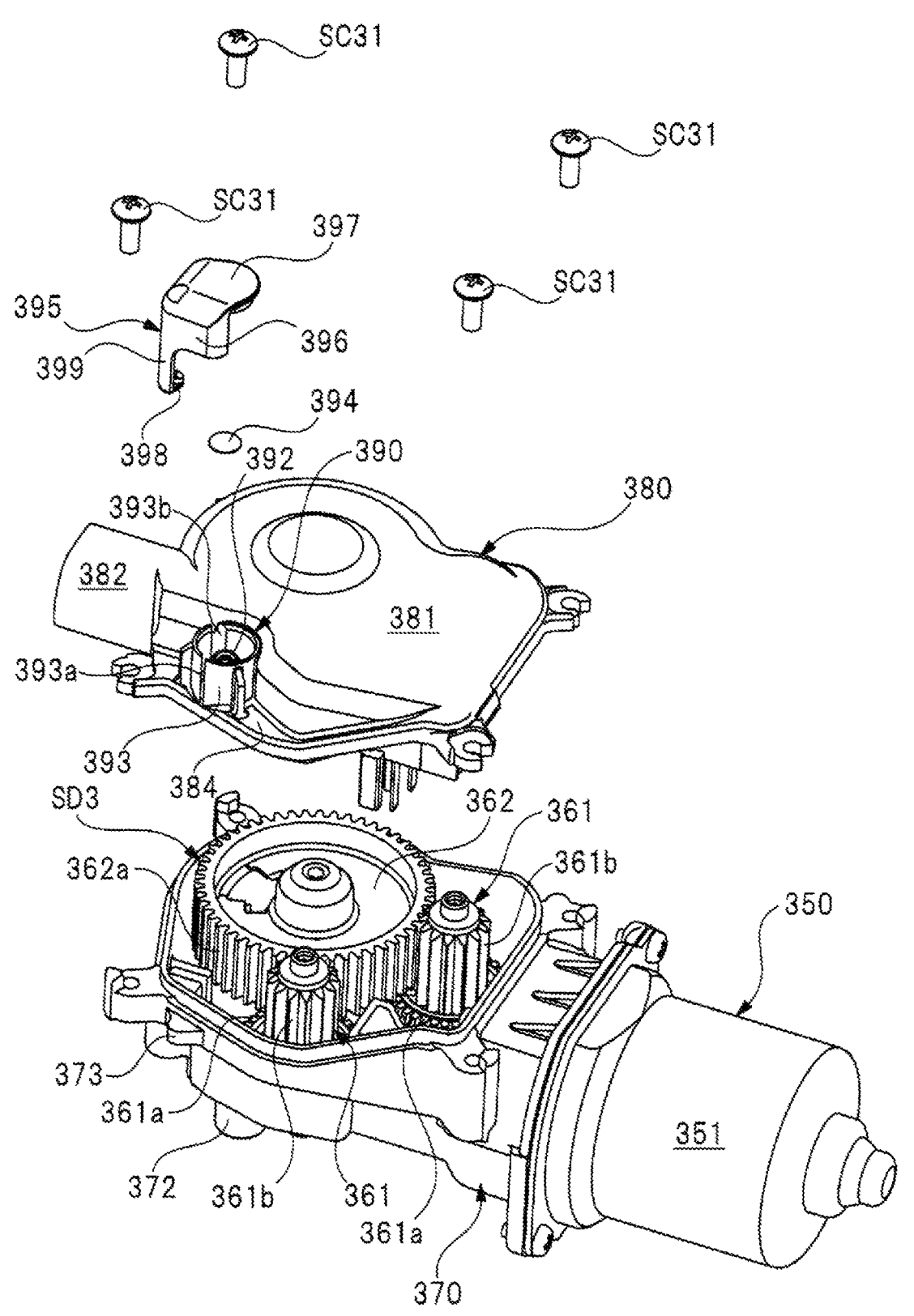

FIG. 30 is an exploded perspective view of a deceleration mechanism part of the wiper motor in FIG. 22.

Figure 31:
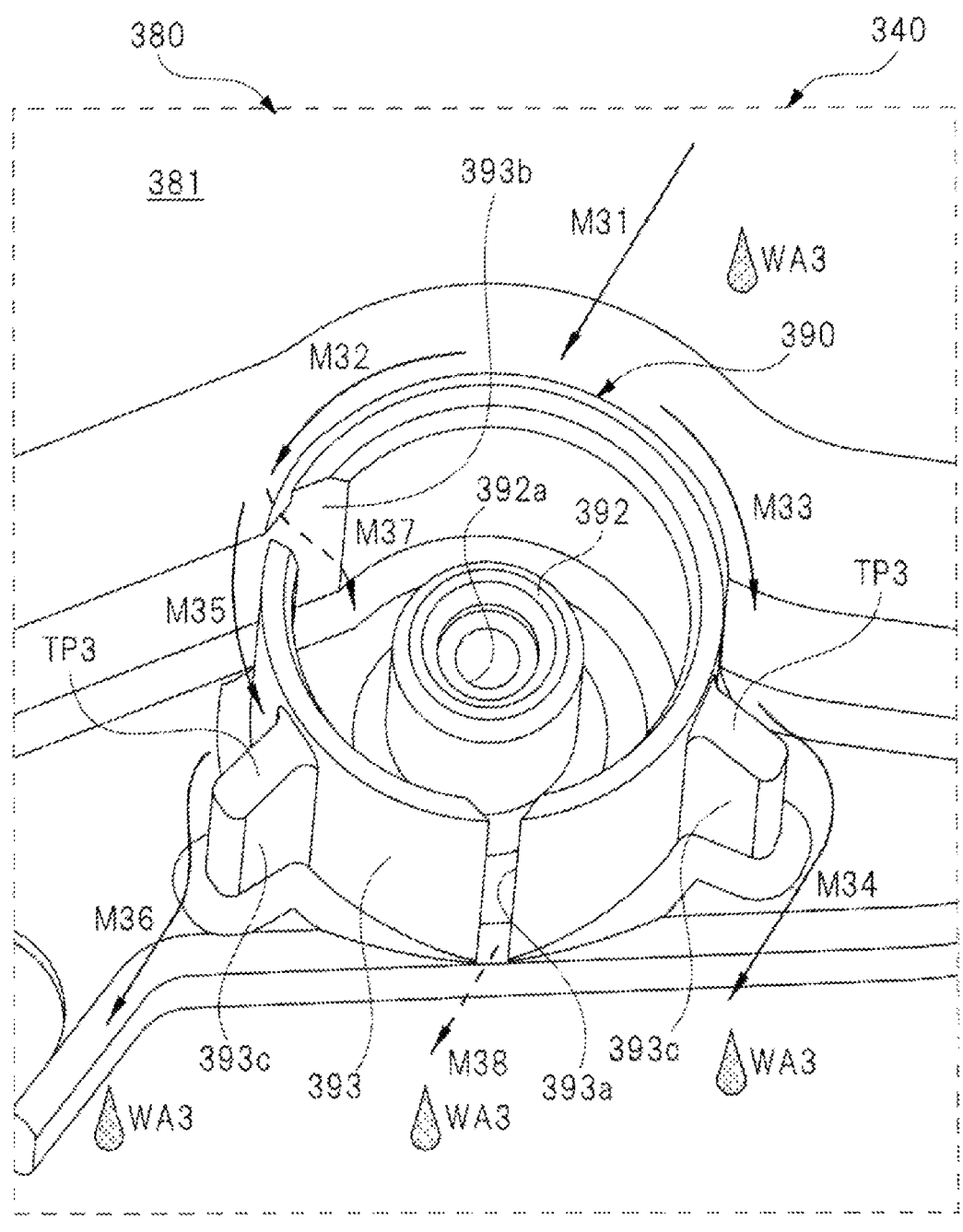

FIG. 31 is an explanatory view of a flow condition of rainwater or the like in the cylindrical member.

Figure 32:
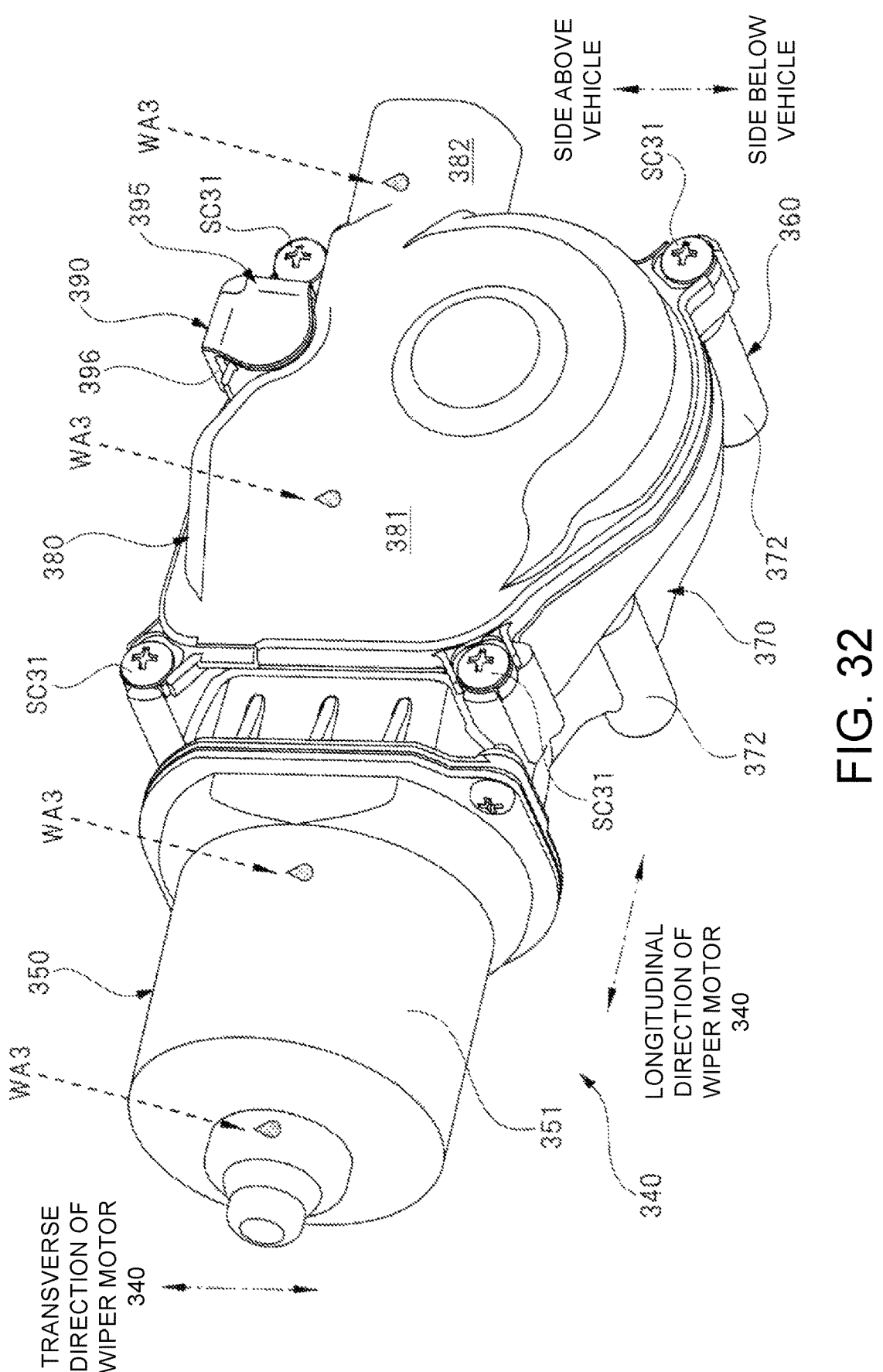

FIG. 32 is an explanatory view of another attachment posture of the wiper motor in FIG. 22.

DESCRIPTION OF EMBODIMENTS

Hereinafter, Embodiment 1 of the present invention will be described in detail using the drawings.

Figure 1:
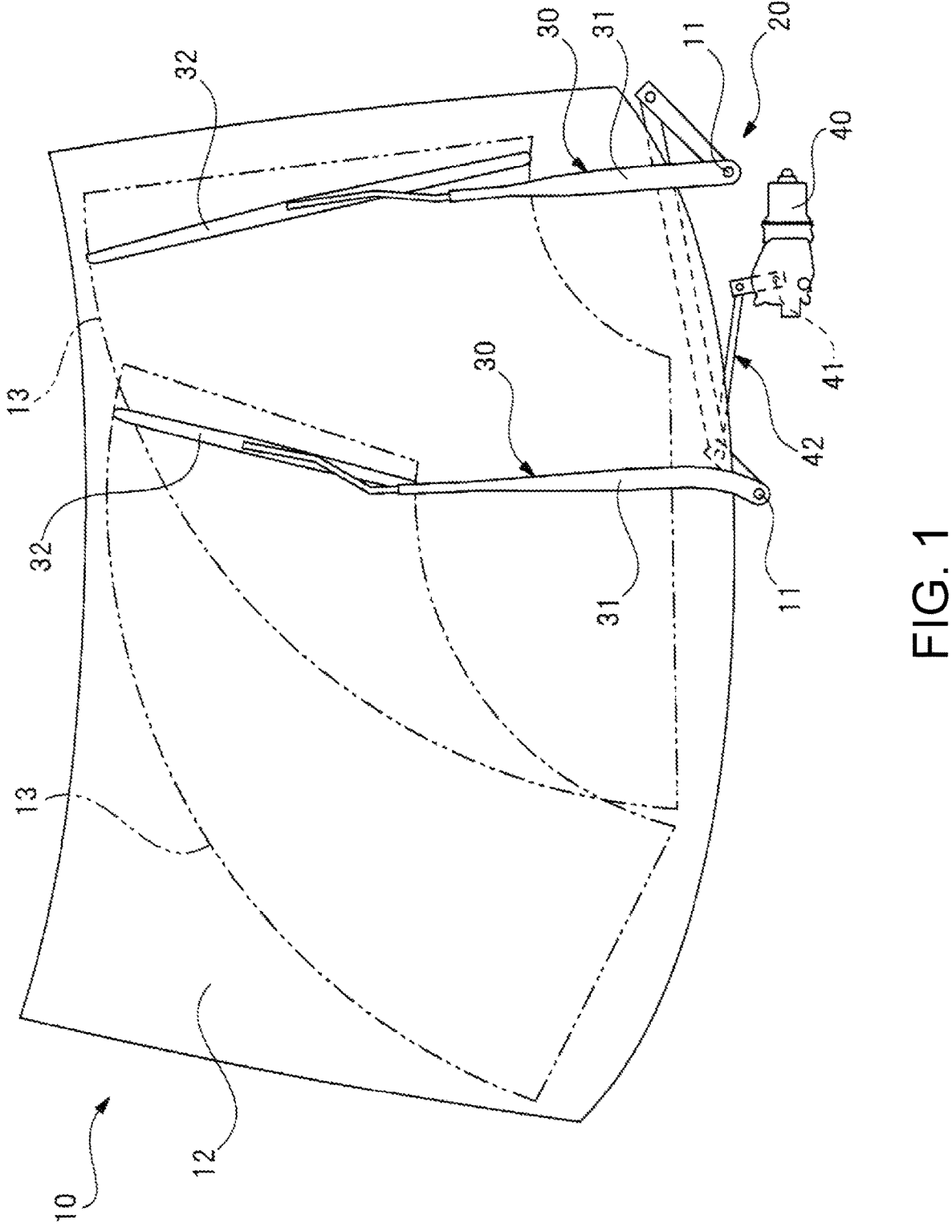
FIG. 1 is a schematic view of a vehicle in which a wiper motor is mounted.
Figure 2:
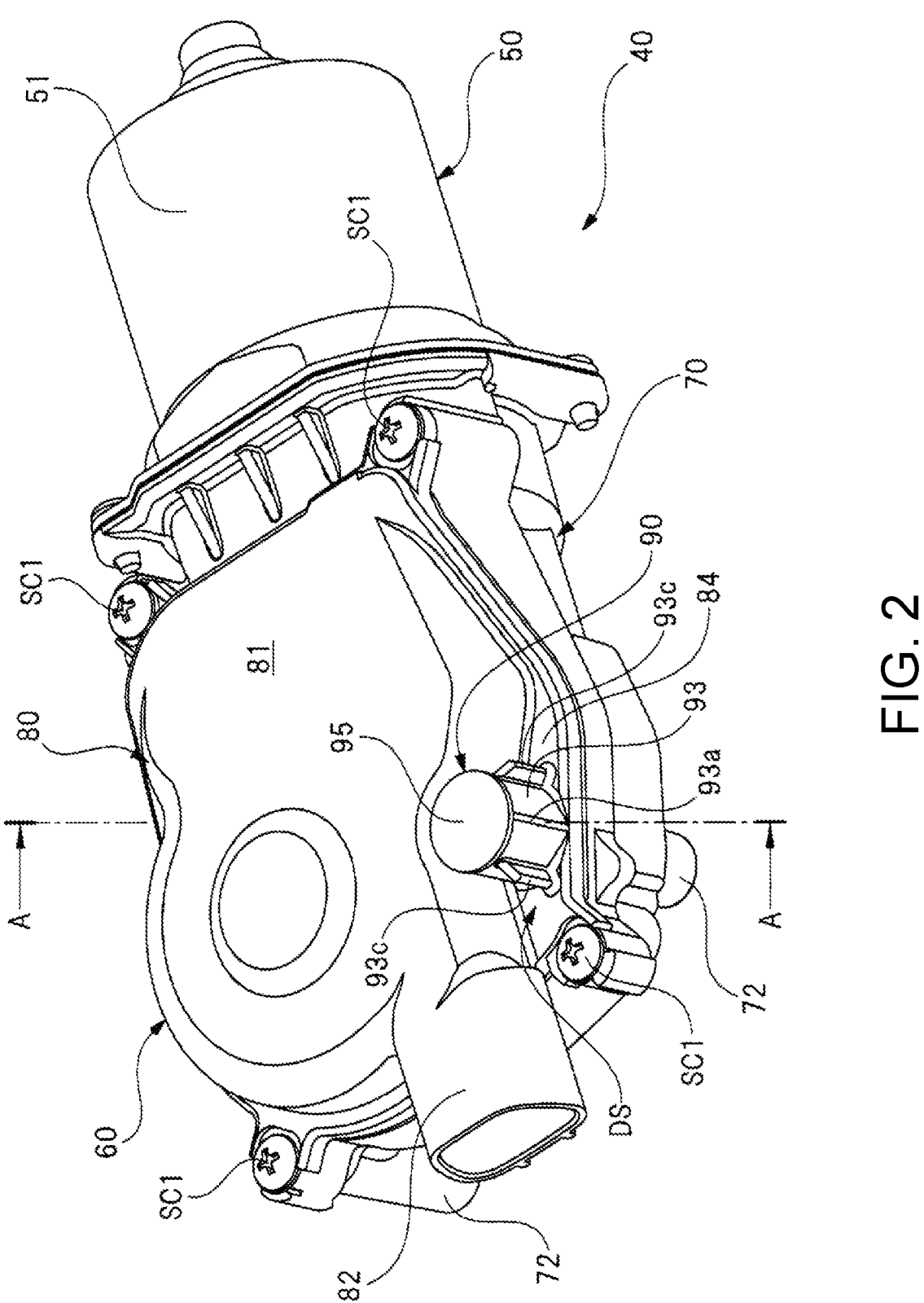
FIG. 2 is a perspective view illustrating the wiper motor in FIG. 1.
Figure 3:
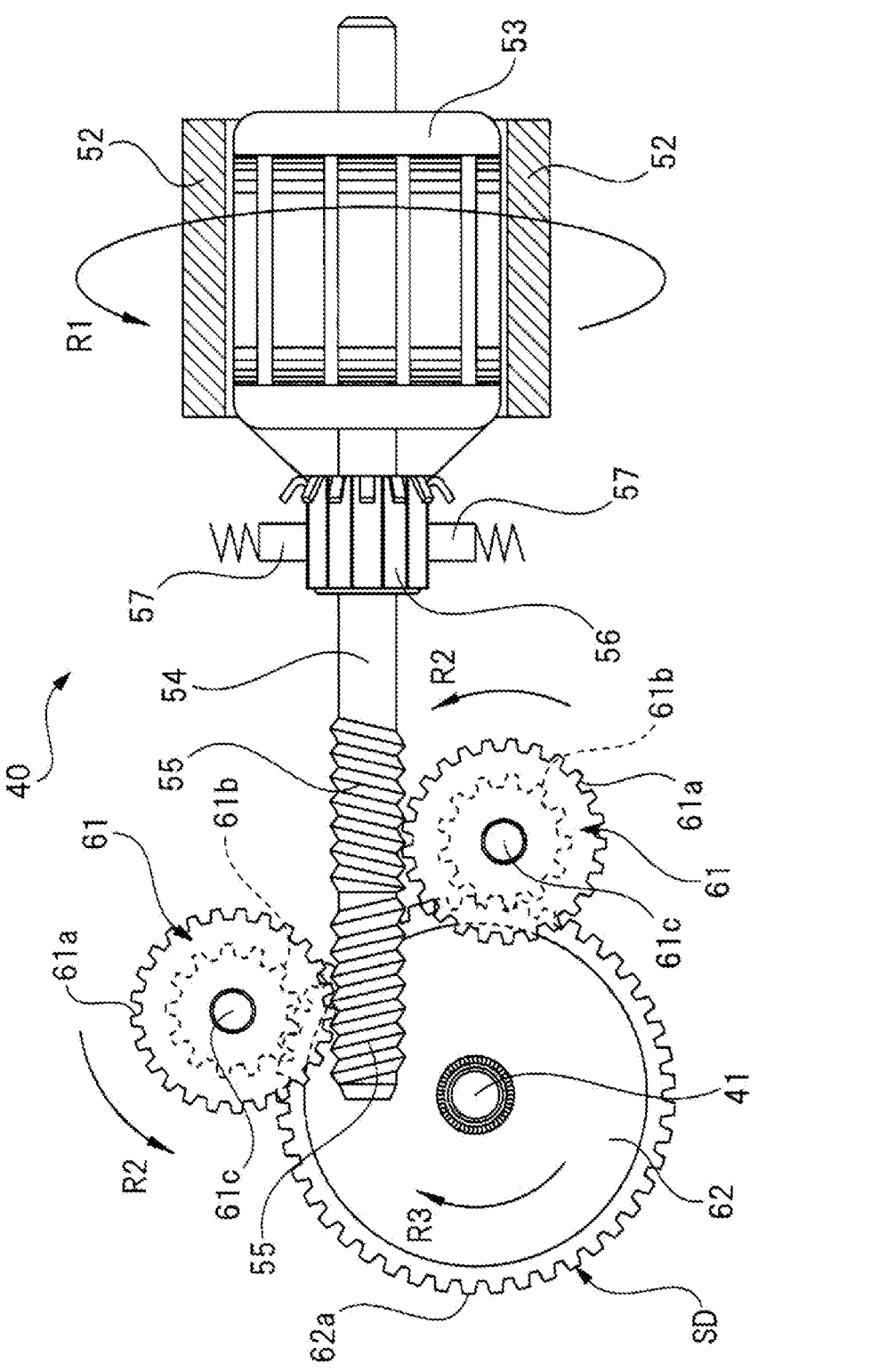
FIG. 3 is a view illustrating an internal structure of the wiper motor in FIG. 2.
Figure 4:
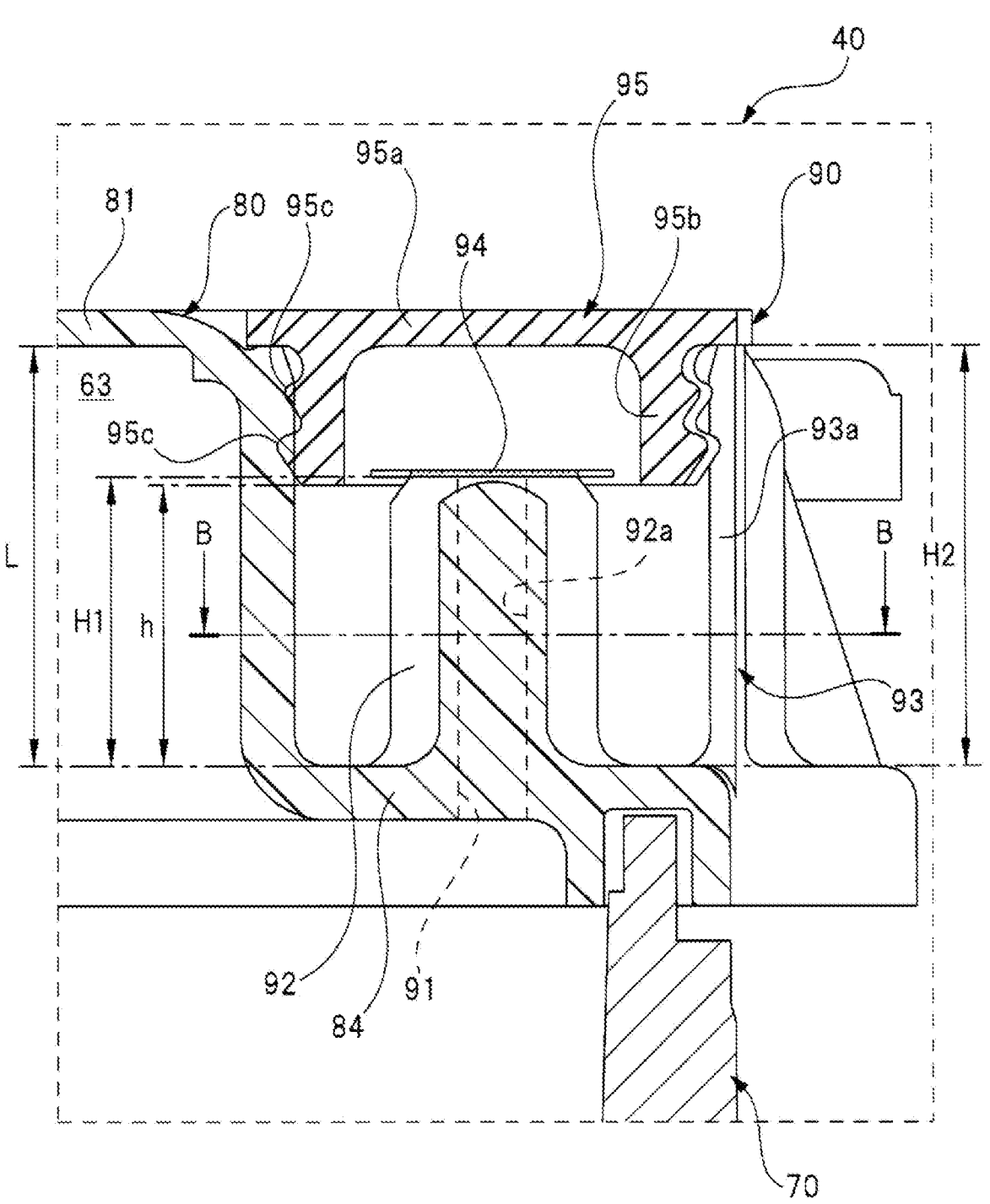
FIG. 4 is a cross-sectional view around a cylindrical member along line A-A in FIG. 2.
Figure 5:
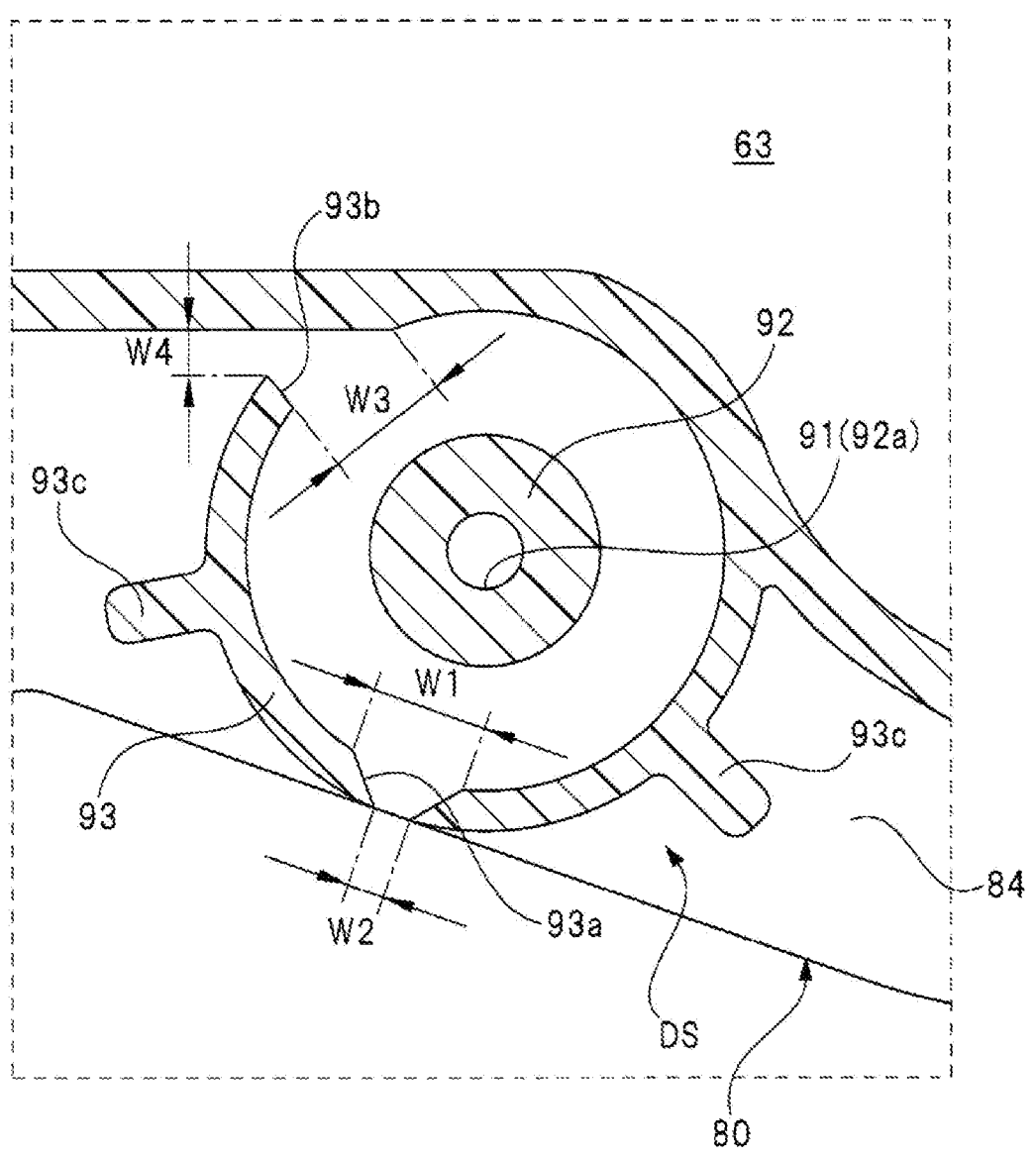
FIG. 5 is a cross-sectional view around the cylindrical member along line B-B in FIG. 4.
Figure 6:
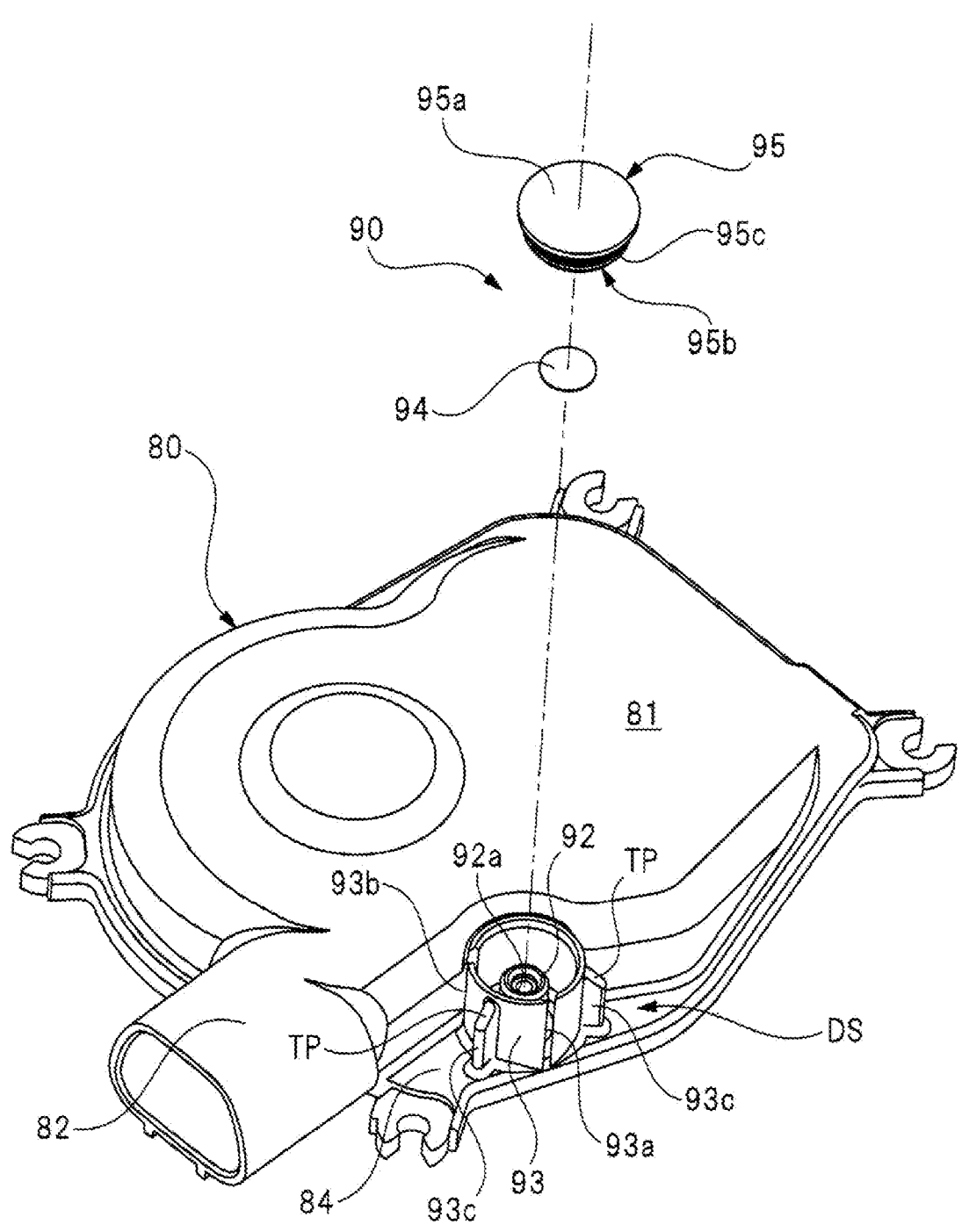
FIG. 6 is a perspective view illustrating a mounting order of a filter and a cap member with respect to the cylindrical member.
Figure 7:
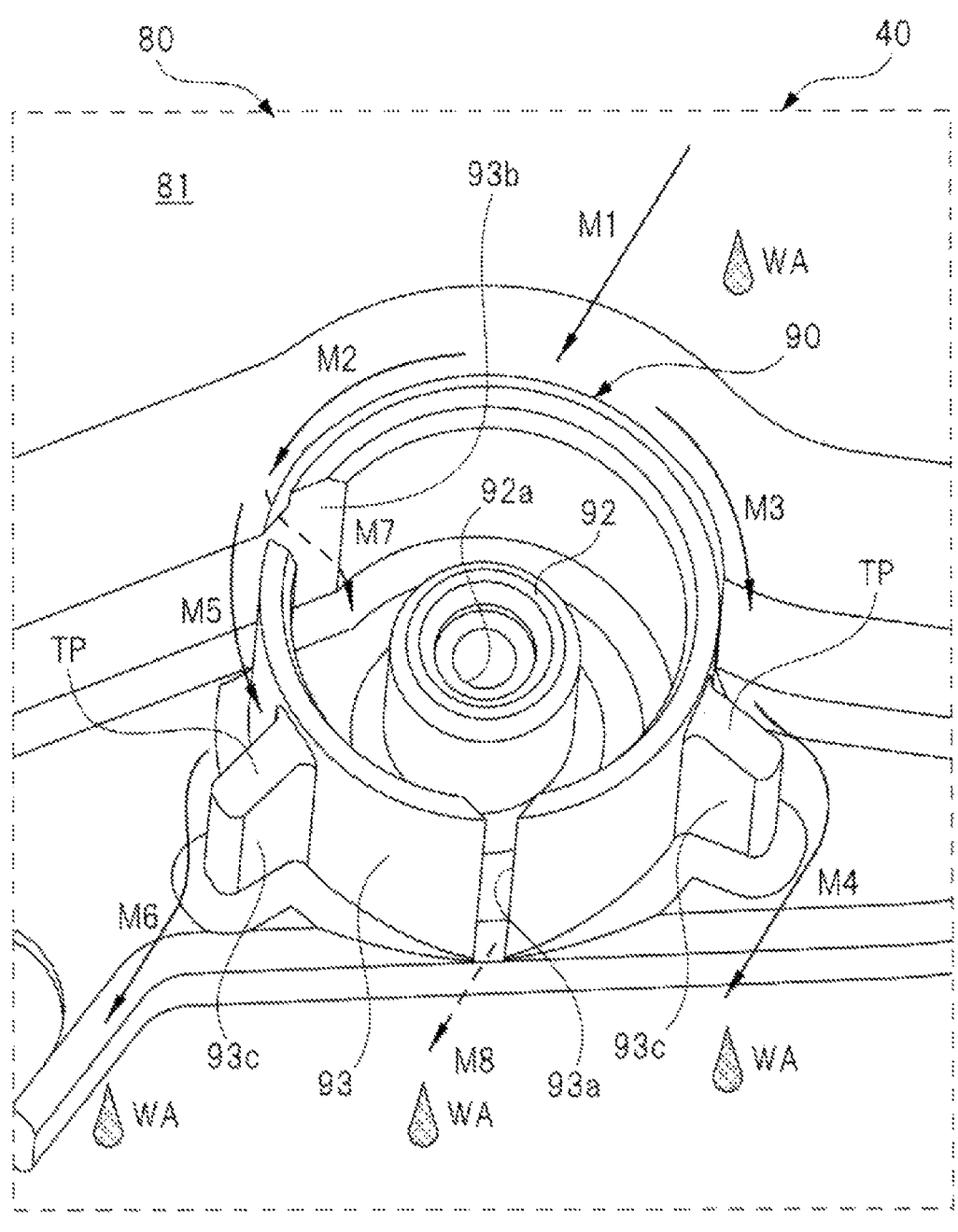
FIG. 7 is a perspective view around the cylindrical member illustrating a flow condition of rainwater or the like in the cylindrical member.

FIG. 1 is a schematic view of a vehicle in which a wiper motor is mounted, FIG. 2 is a perspective view illustrating the wiper motor in FIG. 1, FIG. 3 is a view illustrating an internal structure of the wiper motor in FIG. 2, FIG. 4 is a cross-sectional view around a cylindrical member along line A-A in FIG. 2, FIG. 5 is a cross-sectional view around the cylindrical member along line B-B in FIG. 4, FIG. 6 is a perspective view illustrating a mounting order of a filter and a cap member with respect to the cylindrical member, and FIG. 7 is a perspective view around the cylindrical member illustrating a flow condition of rainwater or the like in the cylindrical member, respectively.

As illustrated in FIG. 1, a wiper device 20 is mounted in an engine room (not illustrated) on a front side of a vehicle 10 such as an automobile. The wiper device 20 swings a pair of wiper members 30 provided correspondingly to a driver's seat side (Driver) and an assistant driver's seat side (Assist). The wiper members 30 include wiper arms 31 formed to have substantially a rod shape, and proximal end sides of the wiper arms 31 in a longitudinal direction are fixed to pivot axes 11 which are turnably provided in the vehicle 10. In addition, wiper blades 32 are mounted on distal end sides of the wiper arms 31 in the longitudinal direction. Accordingly, the wiper arms 31 swing on a windshield 12 when the wiper device 20 is driven.

The wiper device 20 includes a wiper motor (motor with a deceleration mechanism) 40. In addition, the wiper motor 40 includes an output shaft 41, and a link mechanism 42 for converting rotational motion of the output shaft 41 into swing motion of the pair of pivot axes 11 is provided between the output shaft 41 and the pair of pivot axes 11. Accordingly, rotational motion of the output shaft 41 becomes swing motion of the pivot axes 11 through the link mechanism 42 in accordance with operation of the wiper motor 40, and the wiper blades 32 perform a reciprocating wiping operation in respective wiping ranges 13.

Here, the attachment posture of the wiper motor 40 with respect to the vehicle 10 is a posture in which the output shaft 41 of the wiper motor 40 faces a side below the vehicle 10. That is, in the wiper motor 40, a gear case 70 side (refer to FIG. 2) on which the output shaft 41 protrudes faces a side below the vehicle 10, and a gear cover 80 side (refer to FIG. 2) blocking the gear case 70 faces a side above the vehicle 10.

As illustrated in FIG. 2, the wiper motor 40 forming the wiper device 20 includes a motor part 50 and a deceleration mechanism part 60. The motor part 50 includes a yoke (motor case) 51 which is formed to have substantially a bottomed cylindrical shape by performing deep drawing or the like with a steel plate, and as illustrated in FIG. 3, four magnets 52 in total (only two are illustrated in the diagram) are fixed to a radially inner side of the yoke 51. In addition, an armature core 53 is turnably provided on the radially inner side of each of the magnets 52 with a predetermined space (air gap) therebetween.

An armature shaft (rotation shaft) 54 constituted of a round steel rod is fixed to a rotation center of the armature core 53. The armature shaft 54 jointly rotates in accordance with rotation of the armature core 53. A pair of worms 55 are integrally provided on the distal end side of the armature shaft 54 (left side in FIG. 3), and twirling directions of the respective worms 55 are opposite to each other.

Moreover, a commutator 56 is fixed between the worms 55 and the armature core 53 in the longitudinal direction of the armature shaft 54. Three brushes 57 in total (only two are illustrated in the diagram) come into sliding contact with an outer circumferential portion of the commutator 56. In this manner, the wiper motor 40 is an electric motor with brushes, which is rotationally driven in a forward direction or a reverse direction when a drive current is supplied from a battery or the like (not illustrated) installed in the engine room or the like.

As illustrated in FIG. 2, the deceleration mechanism part 60 includes the gear case 70 and the gear cover 80. The gear case 70 and the gear cover 80 correspond to the housings in the present invention. As illustrated in FIG. 3, a deceleration mechanism SD is accommodated inside the gear case 70 and the gear cover 80. The deceleration mechanism SD is formed to include the pair of worms 55 provided in the armature shaft 54, a pair of counter gears 61 respectively meshed with these worms 55, and a single spur gear 62 meshed with these counter gears 61.

The pair of worms 55 are respectively meshed with large-diameter teeth parts 61*a* of the pair of counter gears 61. Accordingly, the pair of counter gears 61 individually rotate in the same direction (counterclockwise direction) in accordance with rotation of the armature core 53 (refer to the arrow R1) as indicated by the arrows R2. In addition, a teeth part 62*a* of the spur gear 62 is meshed with small-diameter teeth parts 61*b* of the pair of counter gears 61. Accordingly, the spur gear 62 rotates in the clockwise direction as indicated by the arrow R3.

Accordingly, high-speed rotation of the armature core 53 (armature shaft 54) is decelerated by the pair of worms 55 and the pair of counter gears 61, and therefore the spur gear 62 rotates at a low speed. Accordingly, a torque-increased rotation force is output toward the link mechanism 42 (refer to FIG. 1) from the output shaft 41 fixed to the rotation center of the spur gear 62.

As illustrated in FIG. 2, the gear case 70 forming the deceleration mechanism part 60 is formed to have substantially a bowl shape including a case bottom wall (not illustrated) by pouring a molten aluminum material into a casting mold. In addition, the gear cover 80 forming the deceleration mechanism part 60 is formed to have substantially a bowl shape including a cover bottom wall 81 by pouring a molten plastic material into a mold (not illustrated).

Further, in a state in which the gear case 70 and the gear cover 80 abut against each other, a hollow part 63 (refer to FIGS. 4 and 5) is formed inside these, and the deceleration mechanism SD (refer to FIG. 3) is accommodated inside the hollow part 63. In a state in which the motor part 50 and the deceleration mechanism part 60 are assembled, the inside of the hollow part 63 and the inside of the yoke 51 (not illustrated) communicate with each other.

In addition, a connection portion (abutment portion) between the gear case 70 and the gear cover 80 and a connection portion (abutment portion) between the gear case 70 and the yoke 51 are sealed from each other with a seal member such as an O-ring (not illustrated) therebetween. Accordingly, intrusion of rainwater or the like into the wiper motor 40 from these connection portion is inhibited.

Here, three attachment legs 72 in total (only two are illustrated in the diagram) are provided integrally with the case bottom wall of the gear case 70, and the wiper motor 40 is fixed to the vehicle 10 with these attachment legs 72 therebetween. In addition, the output shaft 41 fixed to the spur gear 62 is rotatably supported by a substantially center portion of the case bottom wall with a seal member such as an O-ring (not illustrated) therebetween. Thus, intrusion of rainwater or the like into the wiper motor 40 from between the output shaft 41 (refer to FIG. 3) and the case bottom wall is inhibited. Moreover, center shafts 61*c* (refer to FIG. 3) of the pair of counter gears 61 are also rotatably supported by the case bottom wall of the gear case 70.

As illustrated in FIG. 2, the gear cover 80 is fixed to the gear case 70 using four fixing screws SC1 in total. In addition, a connector connection part 82 is provided integrally with the gear cover 80. An external connector (not illustrated) provided in the vehicle 10 is connected to a distal end portion of the connector connection part 82 (left side in the diagram). Accordingly, a drive current is supplied to the wiper motor 40 from a battery or the like of the vehicle 10. Here, a connection direction of the external connector with respect to the connector connection part 82 is from a side of the gear cover 80 opposite to the motor part 50 side. That is, as illustrated in FIG. 2, the connector connection part 82 is disposed substantially coaxially with the motor part 50.

In addition, as illustrated in FIGS. 2 and 4, a breathing mechanism 90 is provided in the vicinity of the connector connection part 82 in the gear cover 80. The breathing mechanism 90 includes a communication hole 91, a small-diameter cylinder part 92, a cylindrical member 93, a filter 94, and a breather cap 95. Here, the communication hole 91, the small-diameter cylinder part 92, and the cylindrical member 93 are provided integrally with the gear cover 80 and jointly formed when the gear cover 80 is molded. Further, the breathing mechanism 90 has a function of imparting a breathing function to the wiper motor 40 in order to curb pressure fluctuation between the inside and the outside of the wiper motor 40.

Specifically, the breathing mechanism 90 has a function of preventing intrusion of rainwater or the like into the wiper motor 40 while allowing air to smoothly flow in and out (breathable) in accordance with pressure fluctuation between the inside and the outside of the wiper motor 40. Here, in order to obtain the ideal breathing mechanism 90, there is a need to achieve both the foregoing antithetical events, that is, to facilitate "breathing" and to make it difficult for rainwater or the like to intrude.

The breathing mechanism 90 is disposed at a portion away from the motor part 50 in a portion of the gear cover 80 (refer to FIG. 2). Accordingly, for instance, even if rainwater or the like intrudes into the wiper motor 40 through the breathing mechanism 90, rainwater or the like which has intruded is unlikely to reach a portion of the commutator 56 or the brushes 57 (refer to FIG. 3). Thus, damage or the like to the wiper motor 40 or a controller (not illustrated) for controlling the wiper motor 40 due to an overcurrent is effectively curbed.

As illustrated in FIGS. 4 and 5, the communication hole 91 is provided in a cover plane part 84 which is provided to be offset in an axial direction of the output shaft 41 (refer to FIG. 3) with respect to the cover bottom wall 81 of the gear cover 80. Specifically, the communication hole 91 is provided in a portion of the gear cover 80 near the gear case 70 (below in FIG. 4) in the axial direction of the output shaft 41. Here, an inner diameter dimension of the communication hole 91 is approximately 2 mm. Further, the communication hole 91 allows the inside and the outside of the gear cover 80 (wiper motor 40) to communicate with each other and functions as a so-called "breathing hole".

The small-diameter cylinder part 92 is provided outside the gear cover 80 and extends in the axial direction of the communication hole 91. Further, an air passage 92*a* is provided inside the small-diameter cylinder part 92, and the proximal end side of the air passage 92*a* in the longitudinal direction (below in FIG. 4) communicates with the communication hole 91. That is, the proximal end side of the small-diameter cylinder part 92 in the longitudinal direction is provided integrally with the cover plane part 84. An inner diameter dimension of the air passage 92*a* is approximately 2 mm which is the same as the inner diameter dimension of the communication hole 91. In addition, an outer diameter dimension of the small-diameter cylinder part 92 is approximately 5 mm. Moreover, a height dimension H1 of the small-diameter cylinder part 92 from the cover plane part 84 is approximately ⅔ of a distance L from the cover plane part 84 to the cover bottom wall 81 (H1≈L×⅔). The inside of the small-diameter cylinder part 92 indicates a portion of the small-diameter cylinder part 92 on the radially inner side.

In addition, the cylindrical member 93 is provided integrally with the cover plane part 84 of the gear cover 80 and disposed in a manner of surrounding an area around the small-diameter cylinder part 92. That is, the cylindrical member 93 extends in the axial direction of the small-diameter cylinder part 92 and the communication hole 91 (in the axial direction of the output shaft 41). Specifically, the cylindrical member 93 is provided outside the gear cover 80, and the proximal end side of the cylindrical member 93 in the axial direction is fixed to the cover plane part 84.

Here, an inner diameter dimension of the cylindrical member 93 is approximately 10 mm, and the inside of the cylindrical member 93 communicates with the communication hole 91 through the air passage 92*a* of the small-diameter cylinder part 92. Accordingly, the inside and the outside of the wiper motor 40 communicate with each other through the cylindrical member 93, the small-diameter cylinder part 92, and the communication hole 91, and air circulates through the cylindrical member 93, the small-diameter cylinder part 92, and the communication hole 91. In other words, the small-diameter cylinder part 92 having a smaller diameter than the cylindrical member 93 is provided inside the cylindrical member 93, and the air passage 92*a* inside the small-diameter cylinder part 92 communicates with both the inside of the cylindrical member 93 and the communication hole 91. The inside and outside of the cylindrical member 93 indicates portions of the cylindrical member 93 on the radially inner side and the radially outer side.

A height dimension H2 of the cylindrical member 93 from the cover plane part 84 is substantially equivalent to the distance L from the cover plane part 84 to the cover bottom wall 81 (H2≈L). Accordingly, a situation in which the cylindrical member 93 (breathing mechanism 90) significantly protrudes in the axial direction of the communication hole 91 is curbed, and therefore increase in size of the wiper motor 40 is curbed. In other words, the breathing mechanism 90 is disposed in a relatively large dead space DS (refer to FIGS. 2 and 5) formed in the gear cover 80.

In this manner, since the small-diameter cylinder part 92 and the cylindrical member 93 communicating with the communication hole 91 are provided, when the wiper motor 40 is exposed to water, rainwater or the like approaching along a surface of the wiper motor 40 is unlikely to reach the hollow part 63 inside the wiper motor 40.

As illustrated in FIGS. 4 and 5, a pair of slits 93*a* and 93*b* are provided in the cylindrical member 93. These slits 93*a* and 93*b* extend in the axial direction of the cylindrical member 93 and are provided throughout the entire area of the cylindrical member 93 in the longitudinal direction. The pair of slits 93*a* and 93*b* penetrate the cylindrical member 93 in the radial direction such that the inside and the outside of the cylindrical member 93 communicate with each other. In addition, the pair of slits 93*a* and 93*b* are disposed with an interval of substantially 90 degrees therebetween in a circumferential direction of the cylindrical member 93. Accordingly, even if the breather cap 95 is mounted on the distal end side of the cylindrical member 93 in the axial direction, air can circulate between the inside and the outside of the cylindrical member 93 through the pair of slits 93*a* and 93*b*.

As illustrated in FIG. 5, one slit 93*a* is disposed on a side farther from the hollow part 63 and the other slit 93*b* is disposed on a side closer to the hollow part 63. Further, regarding an attachment posture of the wiper motor 40 with respect to the vehicle 10, the one slit 93*a* is disposed near a side below the vehicle 10 and the other slit 93*b* is disposed near a side above the vehicle 10 (refer to FIG. 7).

Further, an opening width W1 of the one slit 93*a* on the inner side of the cylindrical member 93 is wider than an opening width W2 on the outer side (W1>W2). In other words, the opening width of the one slit 93*a* in the circumferential direction of the cylindrical member 93 is narrower on the outer side (opening width W2) than on the inner side (opening width W1) of the cylindrical member 93. Here, the opening width W1 is approximately 2.5 mm, and the opening width W2 is approximately 1.5 mm.

Accordingly, rainwater or the like is unlikely to intrude into the cylindrical member 93 from a portion of the one slit 93*a*. For instance, even if rainwater or the like has intruded into the cylindrical member 93, the amount is very small, and rainwater or the like is likely to gather inside the one slit 93*a* having the opening width W1. Thus, rainwater or the like which has intruded into the cylindrical member 93 from a portion of the one slit 93*a* can be quickly discharged to the outside of the cylindrical member 93.

In the other slit 93*b* as well, an opening width W3 on the inner side of the cylindrical member 93 is wider than an opening width W4 on the outer side (W3>W4). In other words, the opening width of the other slit 93*b* in the circumferential direction of the cylindrical member 93 is narrower on the outer side (opening width W4) than on the inner side of the cylindrical member 93 (opening width W3). Here, the opening width W3 is approximately 2.5 mm, and the opening width W4 is approximately 1.5 mm.

Moreover, as illustrated in FIGS. 5 and 6, a pair of rib members 93*c* are provided on an outer circumferential surface of the cylindrical member 93 with an interval of substantially 90 degrees therebetween in the circumferential direction of the cylindrical member 93. These rib members 93*c* have substantially the same thickness as the thickness of the cylindrical member 93, and they protrude toward the outside of the cylindrical member 93 and extend in the axial direction of the cylindrical member 93.

Here, the proximal end sides of the rib members 93*c* in the axial direction of the cylindrical member 93 are fixed to the cover plane part 84. In addition, tapered parts TP are respectively provided on the distal end sides of the rib members 93*c* in the axial direction of the cylindrical member 93, and the tapered parts TP are formed such that height dimensions of the rib members 93*c* in the radial direction of the cylindrical member 93 gradually decrease toward the distal end sides of the rib members 93*c*. Accordingly, a mold used for injection molding or the like of the gear cover 80 can be easily released.

Further, the pair of slits 93*a* and 93*b* and the pair of rib members 93*c* are alternately disposed at positions shifted by substantially 45 degrees in the circumferential direction of the cylindrical member 93. More specifically, as illustrated in FIG. 5, when the cylindrical member 93 is viewed in the axial direction, the other slit 93*b*, the rib member 93*c*, the one slit 93*a*, and the rib member 93*c* are arranged in this order from the left side in the diagram in the circumferential direction of the cylindrical member 93.

Here, the pair of rib members 93*c* are disposed on both sides of the one slit 93*a* in the circumferential direction of the cylindrical member 93. Accordingly, regarding an attachment posture of the wiper motor 40 with respect to the vehicle 10, rainwater or the like approaching along the surface of the wiper motor 40 can be kept away from the one slit 93*a* (refer to FIG. 7). That is, the pair of rib members 93*c* have a function of preventing rainwater or the like from intruding into the cylindrical member 93 through the one slit 93*a*.

As illustrated in FIGS. 4 and 6, the filter 94 is formed to have a thin disk shape and fixed to the distal end side of the small-diameter cylinder part 92 in the longitudinal direction (upward side in FIG. 4) by means of an adhesive, welding, or the like. Specifically, the filter 94 is provided in a manner of blocking the air passage 92a of the small-diameter cylinder part 92. The filter 94 is constituted of a porous film made of polytetrafluoroethylene (PTFE), for example, and has properties of allowing air to pass therethrough but not allowing water, dust, and the like to pass therethrough. Accordingly, water exposure reliability of the wiper motor 40 is improved. However, the filter 94 can also be omitted in accordance with the water exposure performance required for the wiper motor 40.

In addition, as illustrated in FIGS. 4 and 6, the breather cap 95 is formed to have substantially a bowl shape using an elastic material such as a natural rubber. The breather cap 95 includes a cap main body 95a corresponding to the cap member in the present invention and formed to have substantially a disk shape, and a fitting cylinder part 95b fitted into the distal end side of the cylindrical member 93 in the axial direction. Further, a plurality of annular convex parts 95c is integrally provided on an outer circumferential surface of the fitting cylinder part 95b, and these annular convex parts 95c are fitted into an inner circumferential surface of the cylindrical member 93 while being elastically deformed. The outer circumferential surface of the fitting cylinder part 95b indicates a portion of the fitting cylinder part 95b on the radially outer side.

Accordingly, the breather cap 95 blocks the distal end side of the cylindrical member 93 in the axial direction and is in a state of being prevented from coming off from the cylindrical member 93. However, the breather cap 95 can also be omitted in accordance with the attachment posture of the wiper motor 40. Specifically, when the output shaft 41 of the wiper motor 40 (refer to FIG. 3) is in a posture facing a side above the vehicle 10, that is, in a case of a posture in which the breathing mechanism 90 of the gear cover 80 faces downward, the breather cap 95 can be omitted.

Here, in a state in which the breather cap 95 is mounted in the cylindrical member 93, a height dimension h of the gear cover 80 from the cover plane part 84 to a distal end portion of the fitting cylinder part 95b is substantially equivalent to the height dimension H1 of the small-diameter cylinder part 92 from the cover plane part 84 (h≈H1). Accordingly, a situation in which the fitting cylinder part 95b becomes excessively long in the axial direction thereof can be curbed, and the breather cap 95 can be easily mounted in the cylindrical member 93 while elastic deformation of the breather cap 95 is curbed.

Next, the breathing function of the wiper motor 40 formed as described above and a function when it is exposed to water will be described in detail using FIG. 7. In FIG. 7, in order to facilitate understanding of a path along which rainwater WA moves, illustration of the filter 94 and the breather cap 95 is omitted.

First, the breathing function of the wiper motor 40 will be described.

If the wiper motor 40 installed in the engine room operates, the temperature inside the wiper motor 40 rises due to heat generated by the wiper motor 40 and a high-temperature atmosphere in the engine room. Further, if the rainwater WA spatters on the wiper motor 40 and the wiper motor 40 is exposed to water in this state, the wiper motor 40 is rapidly cooled. Thus, a temperature difference occurs between the inside and the outside of the wiper motor 40. Consequently, the hollow part 63 of the wiper motor 40

(refer to FIGS. 4 and 5) is at a relatively low temperature compared to the outside of the wiper motor 40. Accordingly, the hollow part 63 is under a negative pressure, and air outside the gear case 70 flows into the hollow part 63 through the pair of slits 93a and 93b, the air passage 92a, and the communication hole 91. Accordingly, occurrence of a differential pressure between the inside and the outside of the wiper motor 40 is curbed.

In contrast, if the temperature inside the wiper motor 40 significantly rises due to a high-speed operation or the like of the wiper motor 40 performed for a long period of time and the temperature inside the wiper motor 40 exceeds the external temperature, the hollow part 63 is at a relatively high temperature compared to the outside of the wiper motor 40. Consequently, contrary to that described above, the hollow part 63 is under a positive pressure, and air inside the hollow part 63 is discharged to the outside through the communication hole 91, the air passage 92a, and the pair of slits 93a and 93b. Accordingly, occurrence of a differential pressure between the inside and the outside of the wiper motor 40 is curbed.

However, the inside and the outside of the wiper motor 40 communicate with each other at all times through the pair of slits 93a and 93b, the air passage 92a, and the communication hole 91. For this reason, air does not rapidly move between the inside and the outside of the wiper motor 40. Thus, even if the filter 94 is provided, the breathing function can be sufficiently exhibited.

Next, a function when the wiper motor 40 is exposed to water will be described.

If the vehicle 10 travels in heavy rain, the rainwater WA intrudes into the engine room so that the wiper motor 40 is exposed to water. Consequently, as indicated by the arrow M1, the rainwater WA flows toward the breathing mechanism 90 along a surface of the gear cover 80. Thereafter, as indicated by the arrow M2 and the arrow M3, the rainwater WA which has reached the breathing mechanism 90 flows in two directions with the cylindrical member 93 as a boundary, and the rainwater WA flowing along the arrow M2 reaches a portion of the other slit 93b.

In contrast, the rainwater WA flowing along the arrow M3 reaches one rib member 93c (right side in the diagram), and thereafter, as indicated by the arrow M4, it flows downward to a side below the vehicle 10 from a portion of the one rib member 93c. Therefore, the rainwater WA flowing along the arrow M3 and the arrow M4 flows downward to a side below the vehicle 10 at a position away from the one slit 93a.

As indicated by the arrow M2, most of the rainwater WA which has reached the other slit 93b passes over the other slit 93b and flows along the arrow M5. Further, it reaches the other rib member 93c (left side in the diagram). Thereafter, the rainwater WA which has reached the other rib member 93c flows downward to a side below the vehicle 10 from a portion of the other rib member 93c as indicated by the arrow M6. Accordingly, the rainwater WA flowing along the arrow M2, the arrow M5, and the arrow M6 flows downward to a side below the vehicle 10 at a position away from the one slit 93a.

Some of the rainwater WA which has reached the other slit 93b may enter the inside of the cylindrical member 93 from the other slit 93b as indicated by the arrow M7 (dashed line). Further, the rainwater WA which has entered the inside of the cylindrical member 93 flows along the inner circumferential surface of the cylindrical member 93 and smoothly gathers in the one slit 93a. Thereafter, as indicated by the arrow M8 (dashed line), the rainwater WA which has flowed along the inner circumferential surface of the cylindrical member 93 flows downward to a side below the vehicle 10 from the one slit 93*a*.

Accordingly, the rainwater WA is unlikely to reach the small-diameter cylinder part 92 and the air passage 92*a* so that intrusion of rainwater or the like into the wiper motor 40 (hollow part 63) is curbed.

As described above in detail, according to the wiper motor 40 of the present embodiment, the pair of slits 93*a* and 93*b* extending in the axial direction of the cylindrical member 93 are provided in the cylindrical member 93, and the opening widths of the pair of slits 93*a* and 93*b* in the circumferential direction of the cylindrical member 93 are narrower on the outer side (opening widths W2 and W4) than on the inner side of the cylindrical member 93 (opening widths W1 and W3). Accordingly, a situation in which rainwater or the like reaches the communication hole 91 inside the cylindrical member 93 is curbed, and rainwater or the like which has intruded into the cylindrical member 93 can be quickly discharged to the outside of the cylindrical member 93. Therefore, intrusion of rainwater or the like into the gear cover 80 (hollow part 63) is effectively curbed, and thus water exposure reliability can be improved.

In addition, according to the wiper motor 40 of the present embodiment, the small-diameter cylinder part 92 having a smaller diameter than the cylindrical member 93 is provided inside the cylindrical member 93, and the air passage 92*a* inside the small-diameter cylinder part 92 communicates with the inside of the cylindrical member 93 and the communication hole 91. Accordingly, a passage through which air inside the cylindrical member 93 passes can be made complicated in a maze shape. Thus, intrusion of rainwater or the like into the gear cover 80 (hollow part 63) can be more reliably curbed, and thus water exposure reliability can be further improved.

Moreover, according to the wiper motor 40 of the present embodiment, the distal end side of the cylindrical member 93 in the axial direction is blocked by the breather cap 95. Accordingly, when the attachment posture of the wiper motor 40 with respect to the vehicle 10 is a posture in which the gear case 70 side faces a side below the vehicle 10 and the gear cover 80 side faces a side above the vehicle 10 (refer to FIG. 2), intrusion of rainwater or the like into the hollow part 63 can be more reliably curbed.

In addition, according to the wiper motor 40 of the present embodiment, the rib members 93*c* extending in the axial direction of the cylindrical member 93 are provided on the outer circumferential surface of the cylindrical member 93, and the pair of slits 93*a* and 93*b* and the pair of rib members 93*c* are alternately disposed in the circumferential direction of the cylindrical member 93. Accordingly, the rainwater WA moving along the surface of the wiper motor 40 can be caused to flow along the rib members 93*c*, and therefore the rainwater WA can be kept away from the one slit 93*a*. Thus, water exposure reliability can be further improved.

Moreover, according to the wiper motor 40 of the present embodiment, water exposure reliability can be improved, a lifespan of the product can be extended, and therefore manufacturing energy saving can be achieved. Thus, in the Sustainable Development Goals (SDGs) led by the United Nations, it is possible to particularly contribute to Goal 7 (Ensure access to affordable, reliable, sustainable, and modern energy for all) and Goal 13 (Take urgent action to combat climate change and its impacts).

Next, Embodiment 2 of the present invention will be described in detail using the drawings. The same signs are applied to portions having a function similar to that in Embodiment 1 described above, and detailed description thereof will be omitted.

Figure 8:
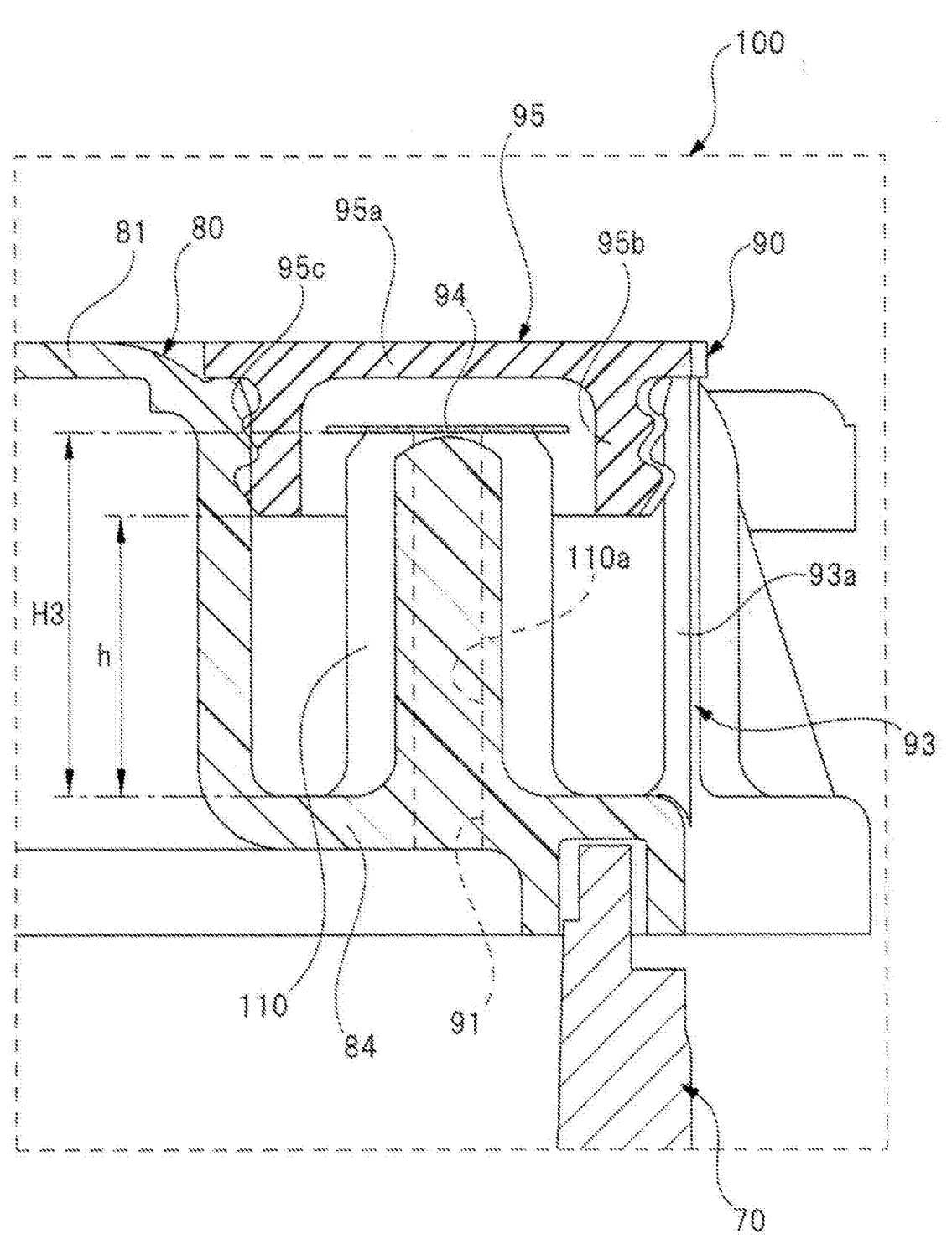
FIG. 8 is a cross-sectional view around a cylindrical member in a wiper motor according to Embodiment 2.

FIG. 8 is a cross-sectional view around a cylindrical member in a wiper motor according to Embodiment 2.

As illustrated in FIG. 8, in a wiper motor (motor with a deceleration mechanism) 100 according to Embodiment 2, compared to the wiper motor 40 (refer to FIG. 4) according to Embodiment 1, only a height dimension H3 of a small-diameter cylinder part 110 (air passage 110*a*) from the cover plane part 84 differs. Specifically, the height dimension H3 of the small-diameter cylinder part 110 (air passage 110*a*) is a height dimension of the distal end side of the small-diameter cylinder part 110 (air passage 110*a*) in the axial direction which has entered the inside of the fitting cylinder part 95*b* of the breather cap 95.

That is, in a state in which the breather cap 95 is mounted in the cylindrical member 93, the height dimension h of the gear cover 80 from the cover plane part 84 to the distal end portion of the fitting cylinder part 95*b* is smaller than the height dimension H3 of the small-diameter cylinder part 110 (air passage 110*a*) from the cover plane part 84 (h<H3). Accordingly, a passage through which air inside the cylindrical member 93 passes can be made longer than that in Embodiment 1 while having a maze shape.

In Embodiment 2 formed as described above as well, it is possible to exhibit operational effects substantially similar to those in Embodiment 1 described above. In addition to this, in Embodiment 2, since the distal end side of the small-diameter cylinder part 110 (air passage 110*a*) in the axial direction enters the inside of the fitting cylinder part 95*b* of the breather cap 95, a passage through which air inside the cylindrical member 93 passes can be made longer than that in Embodiment 1 while having a maze shape. Thus, intrusion of rainwater or the like into the gear cover 80 (hollow part 63) can be more reliably curbed, and thus water exposure reliability can be further improved.

Next, Embodiment 3 of the present invention will be described in detail using the drawings. The same signs are applied to portions having a function similar to that in Embodiment 1 described above, and detailed description thereof will be omitted.

Figure 9:
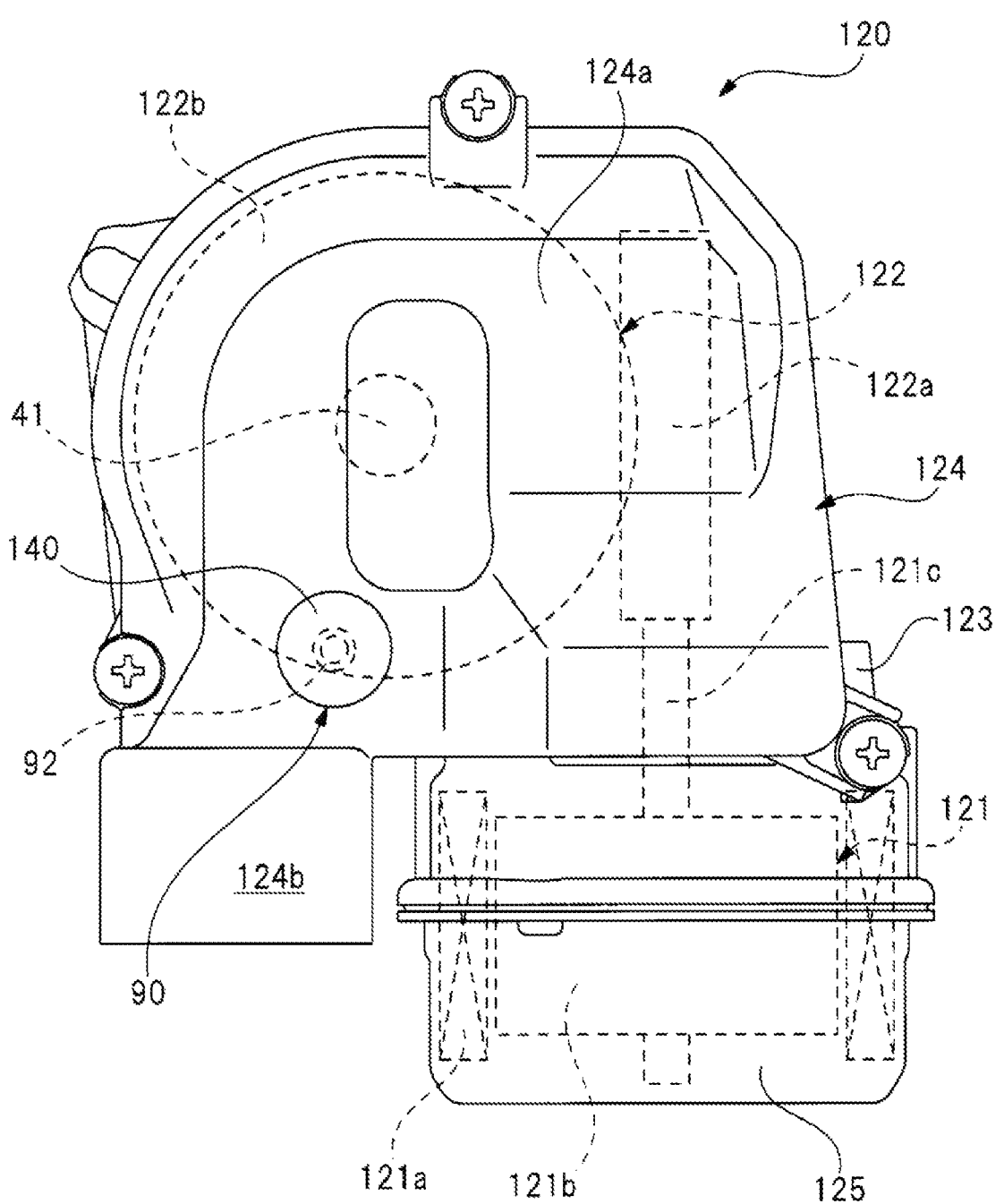
FIG. 9 is a plan view of a wiper motor according to Embodiment 3.
Figure 10:
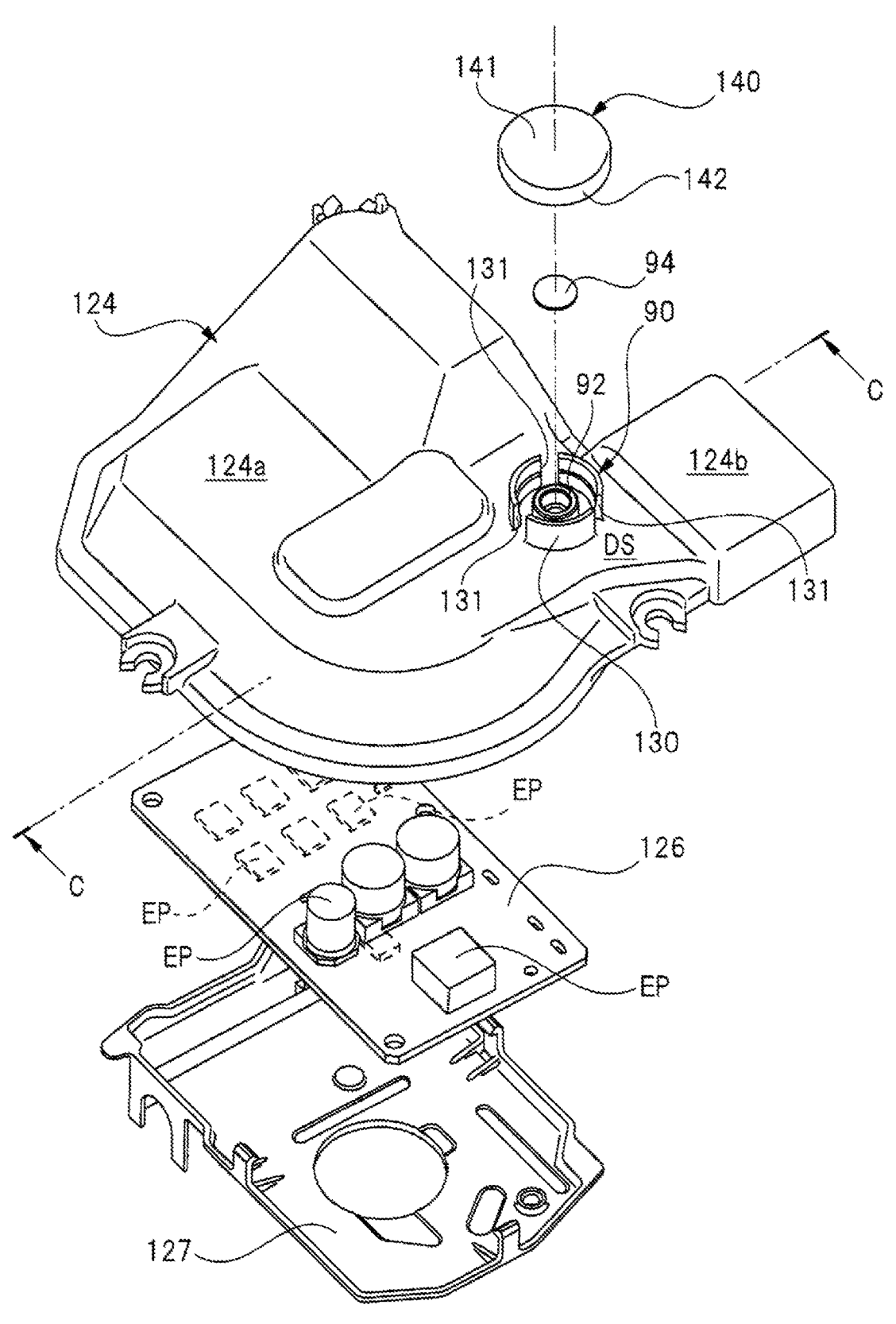
FIG. 10 is an exploded perspective view illustrating an internal structure of the wiper motor in FIG. 9.
Figure 11:
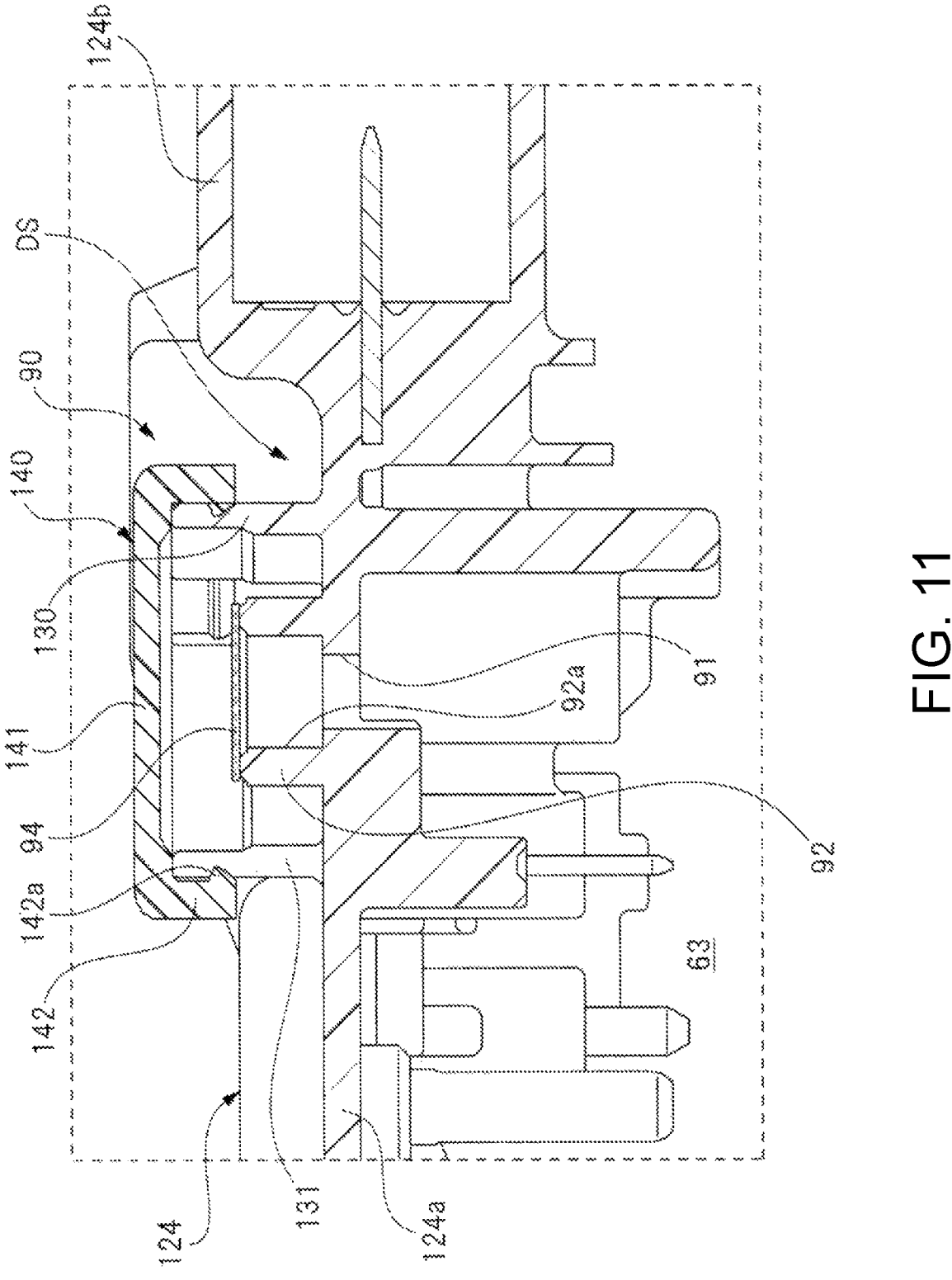
FIG. 11 is a cross-sectional view around the cylindrical member along line C-C in FIG. 10.

FIG. 9 is a plan view of a wiper motor according to Embodiment 3, FIG. 10 is an exploded perspective view illustrating an internal structure of the wiper motor in FIG. 9, and FIG. 11 is a cross-sectional view around the cylindrical member along line C-C in FIG. 10, respectively.

As illustrated in FIG. 9, Embodiment 3 differs from Embodiment 1 in that a wiper motor 120 including a brushless motor 121 is employed. In addition, as illustrated in FIG. 10, Embodiment 3 differs therefrom in that three slits 131 in total are provided in a cylindrical member 130 forming the breathing mechanism 90 and the rib members are omitted. Moreover, Embodiment 3 differs therefrom in fitting structure with respect to the cylindrical member 130 of a breather cap (cap member) 140 forming the breathing mechanism 90. In addition, as illustrated in FIG. 11, in the breathing mechanism 90 according to Embodiment 3, a dimension thereof in the axial direction is smaller than that of the breathing mechanism 90 according to Embodiment 1 (refer to FIG. 4). Here, the slits 131 have the same shape as the slit 93*a* according to Embodiment 1 (refer to FIG. 5), and the opening widths of the slits 131 in the circumferential direction of the cylindrical member 130 are narrower on the outer side than on the inner side of the cylindrical member 130.

Specifically, a wiper motor (motor with a deceleration mechanism) 120 includes a case (housing) 123 accommodating a motor 121 and a deceleration mechanism 122, a cover member (housing) 124 sealing a first opening part (not illustrated) of the case 123, and a motor cover 125 blocking a second opening part (not illustrated) of the case 123. Further, the case 123, the cover member 124, and the motor cover 125 form an outer shell of the wiper motor 120 in a state of being assembled together.

The motor 121 accommodated in the case 123 includes a stator 121a. The stator 121a is formed to have substantially a cylindrical shape by stacking a plurality of steel plates which are magnetic materials, and coils of U-phase, V-phase, and W-phase (not illustrated) are wound around a plurality of teeth (not illustrated) thereof on the radially inner side by a predetermined winding method.

In addition, a rotor 121b is rotatably accommodated on the radially inner side of the stator 121a with a predetermined space therebetween. The rotor 121b is formed to have substantially a columnar shape by stacking a plurality of steel plates which are magnetic materials. Further, the rotor 121b is provided with a plurality of permanent magnets (not illustrated).

Moreover, the proximal end side of a rotation shaft 121c (lower side in FIG. 9) is fixed to a rotation center of the rotor 121b. Worms 122a formed by rolling or the like are integrally provided on the distal end side of the rotation shaft 121c (upper side in FIG. 9). Here, the worms 122a constitute the deceleration mechanism 122 together with a worm wheel 122b accommodated in the case 123.

Further, the proximal end side of the output shaft 41 is fixed to a rotation center of the worm wheel 122b, and the distal end side of the output shaft 41 protrudes toward the outside of the case 123. Similar to Embodiment 1, the link mechanism 42 (refer to FIG. 1) is mounted in the output shaft 41.

As illustrated in FIG. 10, the cover member 124 is made of plastic and includes a cover bottom wall 124a. In addition, a connector connection part 124b having an external connector (not illustrated) provided in the vehicle 10 connected thereto is integrally formed. Further, a control board 126 for controlling the wiper motor 120 is mounted on the inner side of the cover member 124. Here, a plurality of electronic components EP is mounted on each of front and rear sides of the control board 126. Accordingly, the motor 121 (refer to FIG. 9) is rotationally driven in a predetermined direction at a predetermined rotation frequency.

Moreover, a plastic board cover 127 is mounted on the control board 126. That is, the control board 126 is disposed between the cover member 124 and the board cover 127 inside the case 123 (refer to FIG. 9). Here, the board cover 127 prevents lubricating grease (not illustrated) applied to the deceleration mechanism 122 (the worms 122a and the worm wheel 122b) from scattering and adhering to the control board 126.

Further, as illustrated in FIG. 10, the breathing mechanism 90 is disposed the outer side of the cover bottom wall 124a in the cover member 124 and in the dead space DS in the vicinity of the connector connection part 124b. As illustrated in FIG. 11, the breather cap 140 includes a cap main body 141 and a fitting cylinder part 142. A single annular convex part 142a is integrally provided on an inner circumferential surface of the fitting cylinder part 142, and the annular convex part 142a is fitted into an outer circumferential surface of the cylindrical member 130 while being elastically deformed.

In Embodiment 3 formed as described above as well, it is possible to exhibit operational effects substantially similar to those in Embodiment 1 described above. In addition to this, in Embodiment 3, since the motor 121 is a brushless motor, the deceleration mechanism 122 is formed to include only the worms 122a and the worm wheel 122b, and an axial length of the breathing mechanism 90 is shortened while the structure thereof is simplified, the number of components of the wiper motor 120 can be reduced compared to that of Embodiment 1. Thus, not only manufacturing costs can be reduced but also miniaturization and weight reduction can be achieved.

The present invention is not limited to each of the embodiments described above, and it goes without saying that various changes can be made within a range not departing from the gist thereof. For example, in each of the embodiments described above, the breathing mechanism 90 is provided in each of the gear cover 80 and the cover member 124, but the present invention is not limited thereto. For example, in a case of an attachment posture in which the gear case 70 side faces a side below the vehicle 10, a breathing mechanism may be provided in the gear case 70 and the case 123.

In addition, in each of the embodiments described above, the wiper motor 40, 100, or 120 is applied to a wiper device on the front side wiping the wiping ranges 13 on the windshield 12, but the present invention is not limited thereto and can also be applied to wiper devices on the rear side wiping a wiping range on a rear glass.

Moreover, in each of the embodiments described above, the wiper motor 40, 100, or 120 has been described as an example, but the present invention is not limited thereto and can also be applied to motors with a deceleration mechanism in a similar attachment posture for other purposes having a probability of water exposure.

Furthermore, the material, the shape, the dimension, the number, the installation place, and the like of each of the constituent elements in each of the embodiments described above are arbitrary as long as the present invention can be achieved and are not limited to each of the embodiments described above.

Hereinafter, Embodiment 4 of the present invention will be described in detail using the drawings.

Figure 12:
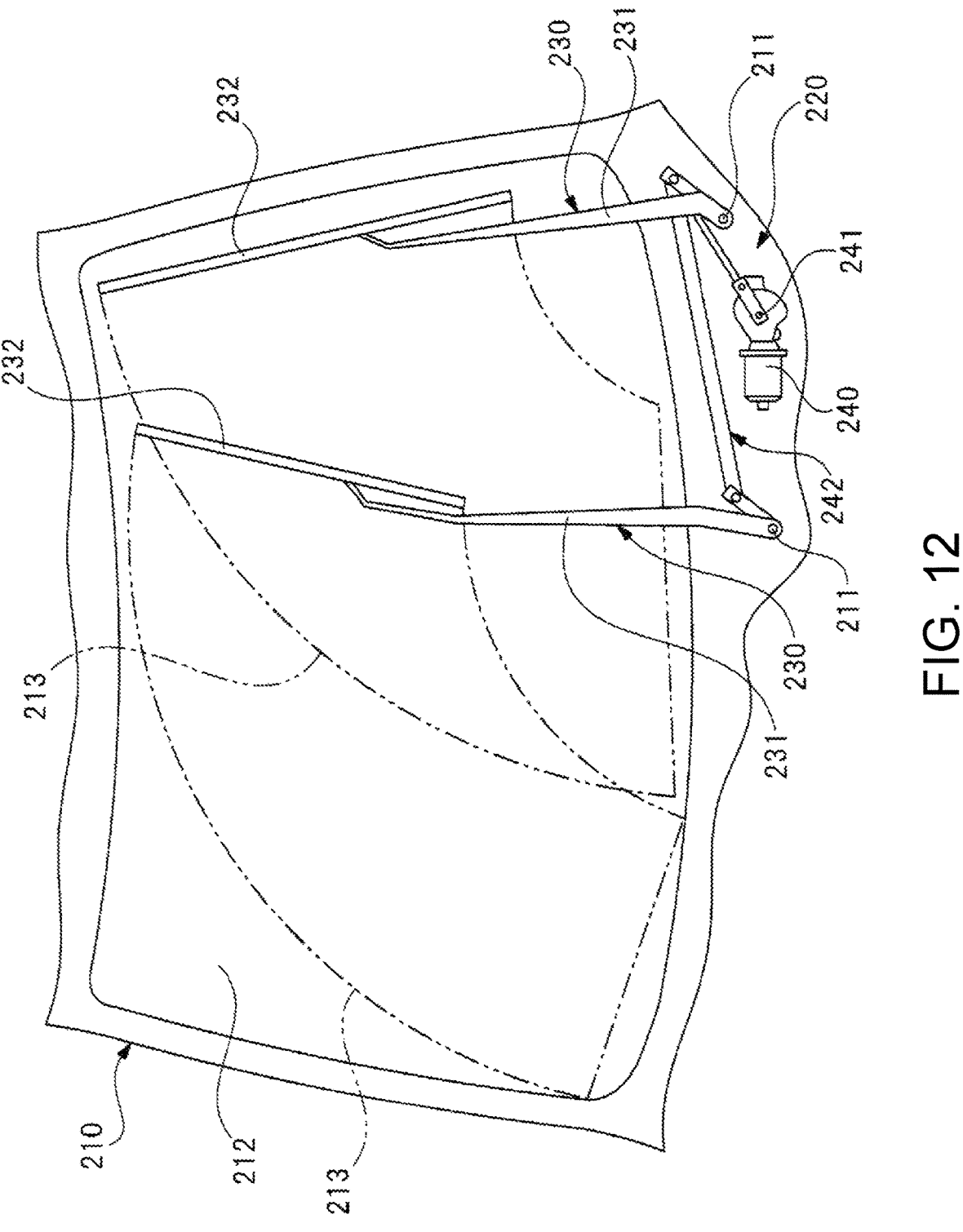
FIG. 12 is a schematic view of a vehicle in which the wiper motor is mounted.
Figure 13:
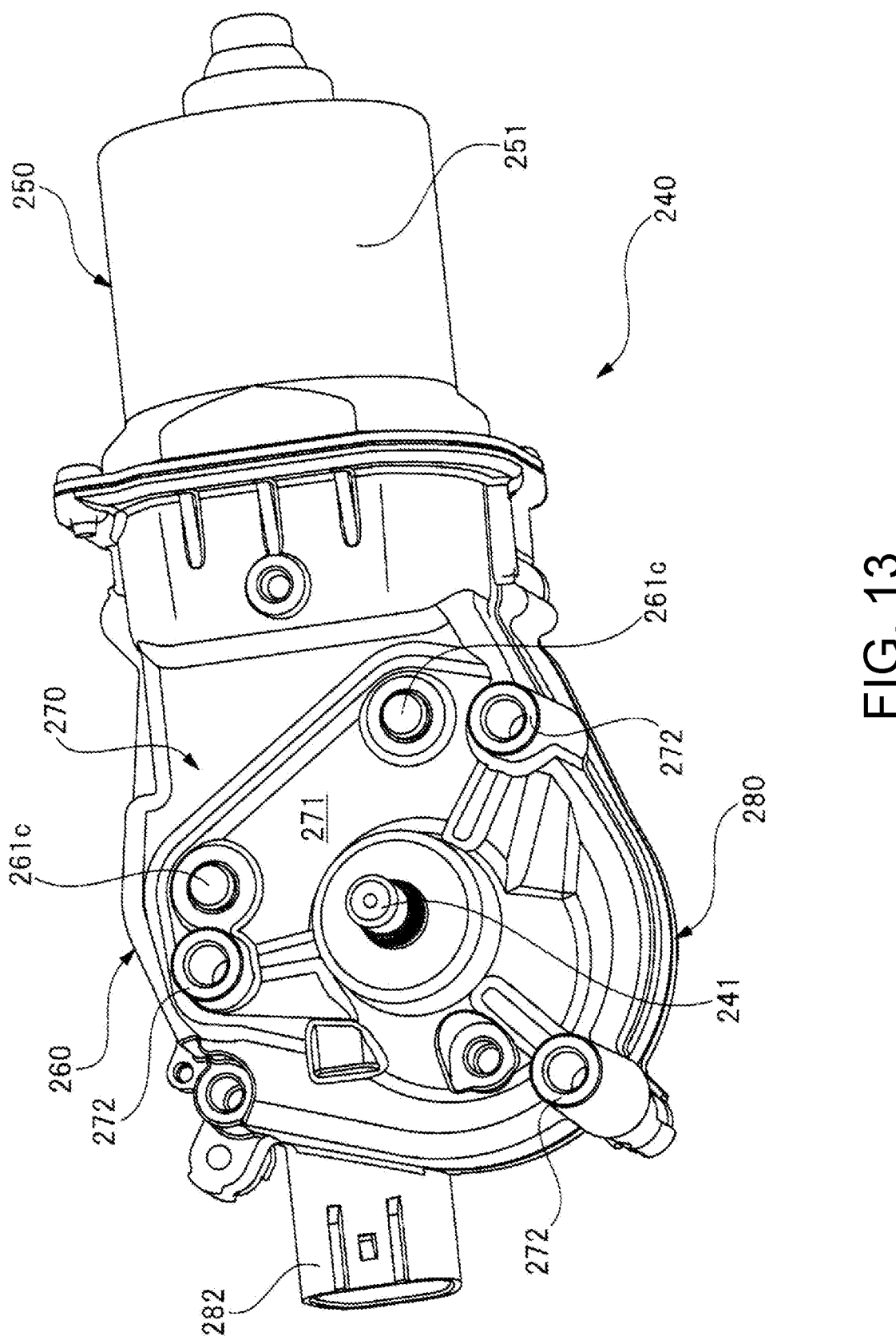
FIG. 13 is a perspective view illustrating the wiper motor in FIG. 12.
Figure 14:
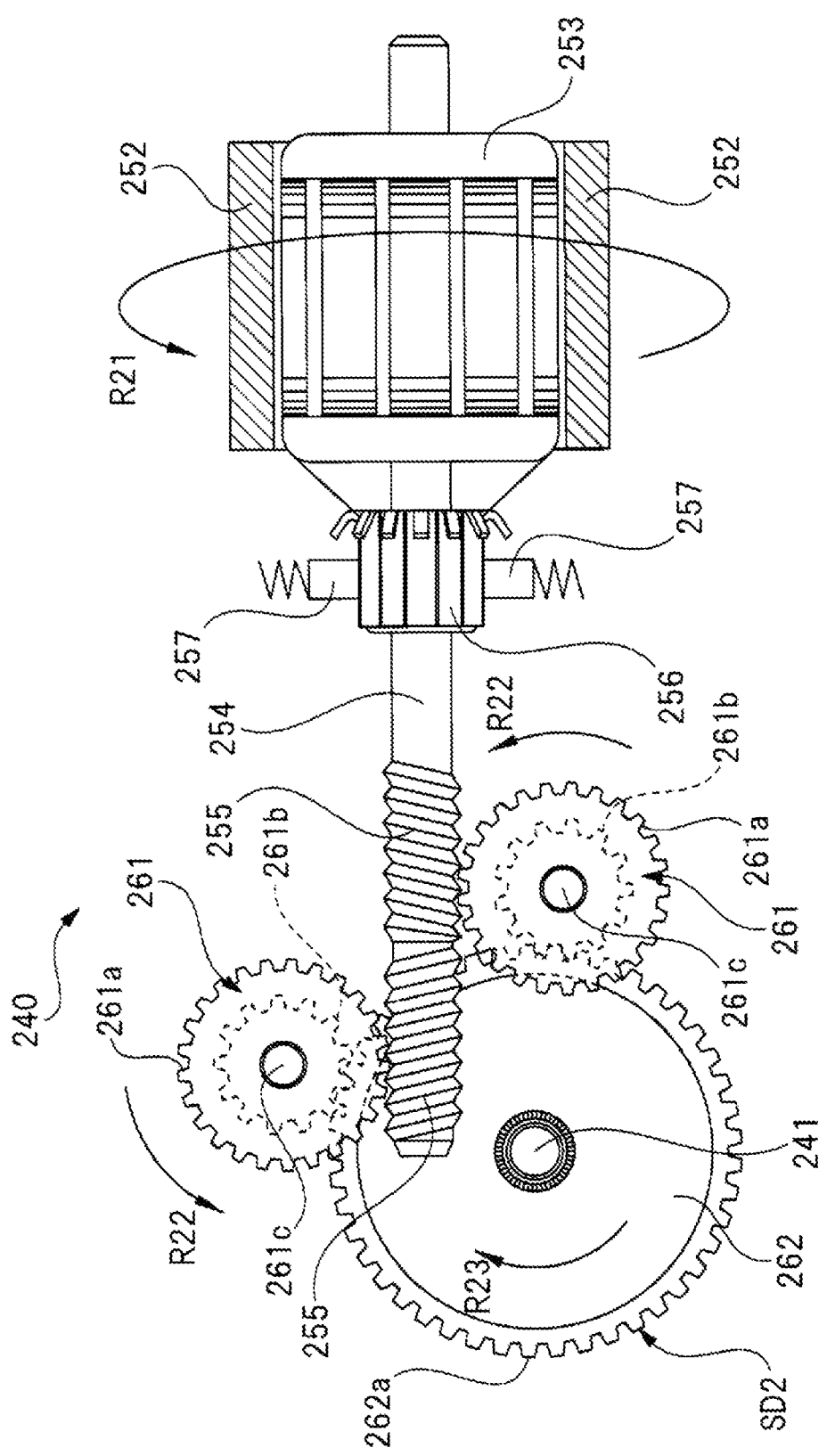
FIG. 14 is a view illustrating an internal structure of the wiper motor in FIG. 13.
Figure 15:
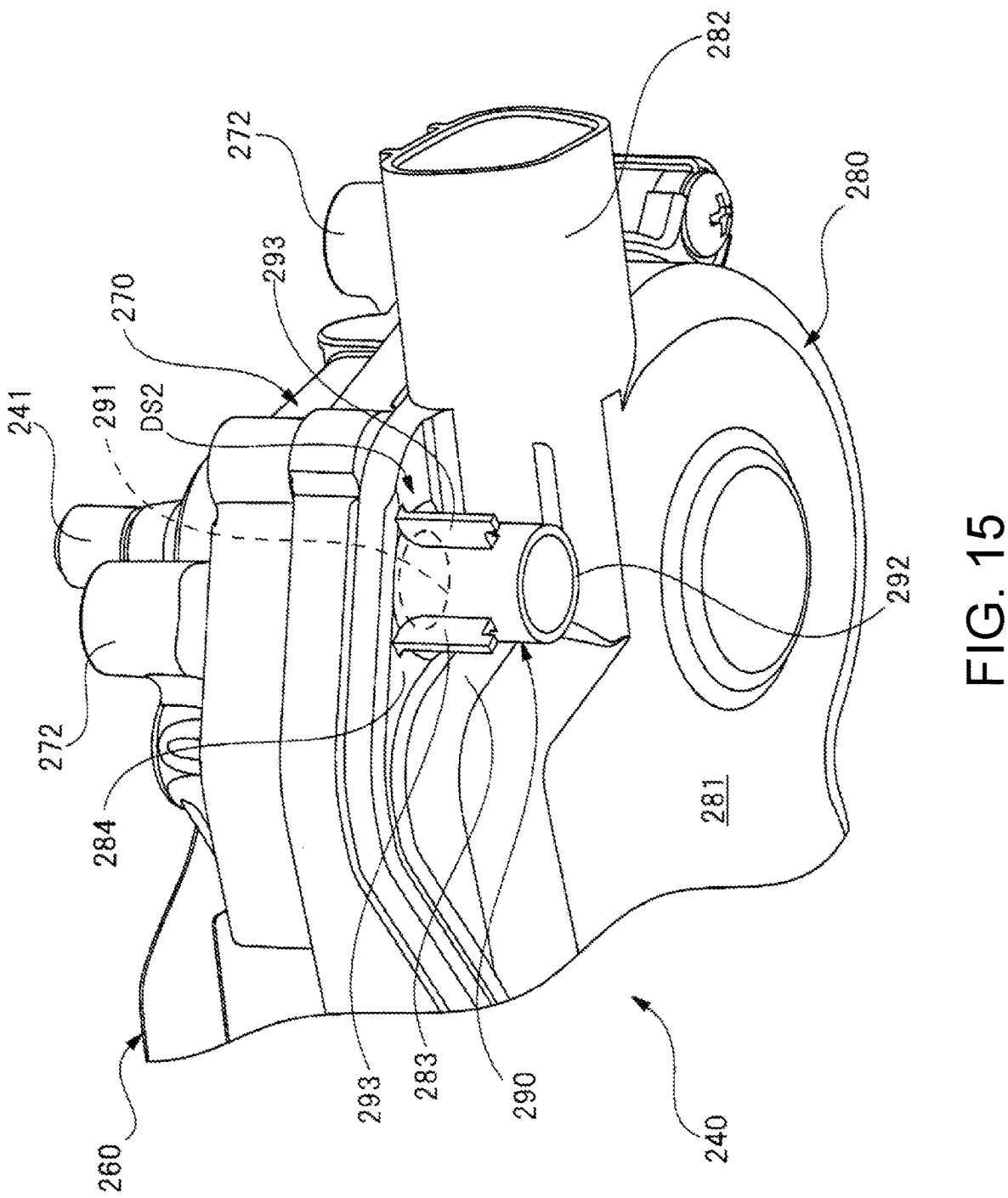
FIG. 15 is an enlarged perspective view around the cylindrical member of the wiper motor in FIG. 13.
Figure 16:
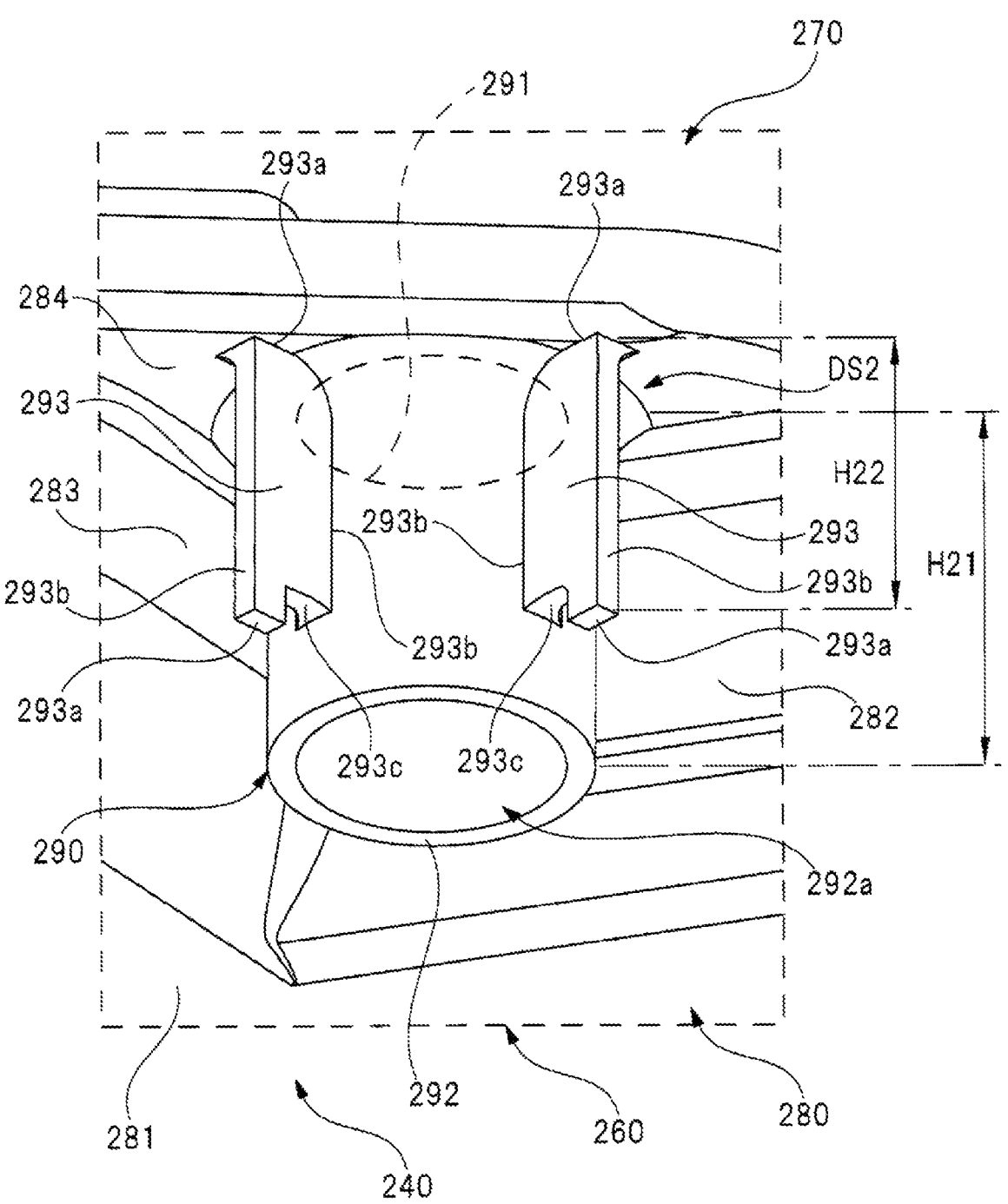
FIG. 16 is an enlarged perspective view of the cylindrical member.

FIG. 12 is a schematic view of a vehicle in which the wiper motor is mounted, FIG. 13 is a perspective view illustrating the wiper motor in FIG. 12, FIG. 14 is a view illustrating an internal structure of the wiper motor in FIG. 13, FIG. 15 is an enlarged perspective view around the cylindrical member of the wiper motor in FIG. 13, FIG. 16 is an enlarged perspective view of the cylindrical member, and (a) and (b) of FIG. 17 are enlarged explanatory cross-sectional views of a state when the wiper motor is exposed to water, respectively.

As illustrated in FIG. 12, a wiper device 220 is mounted inside an engine room (not illustrated) on the front side of a vehicle 210 such as an automobile. The wiper device 220 swings a pair of wiper members 230 provided correspondingly to the driver's seat side (Driver) and the assistant driver's seat side (Assist). The wiper members 230 include wiper arms 231 formed to have substantially a rod shape, and the proximal end sides of the wiper arms 231 in the longitudinal direction are fixed to pivot axes 211 which are turnably provided in the vehicle 210. In addition, wiper blades 232 are mounted on the distal end sides of the wiper arms 231 in the longitudinal direction. Accordingly, the wiper arms 231 swing on a windshield 212 when the wiper device 220 is driven.

The wiper device 220 includes a wiper motor (motor with a deceleration mechanism) 240. In addition, the wiper motor 240 includes an output shaft 241, and a link mechanism 242 for converting rotational motion of the output shaft 241 into swing motion of the pair of pivot axes 211 is provided between the output shaft 241 and the pair of pivot axes 211. Accordingly, rotational motion of the output shaft 241 becomes swing motion of the pivot axes 211 through the link mechanism 242 in accordance with operation of the wiper motor 240, and the wiper blades 232 perform a reciprocating wiping operation in respective wiping ranges 213.

Here, the attachment posture of the wiper motor 240 with respect to the vehicle 210 is a posture in which the output shaft 241 of the wiper motor 240 faces a side above the vehicle 210. That is, in the wiper motor 240, a gear case 270 side (refer to FIG. 15) on which the output shaft 241 protrudes faces a side above the vehicle 210, and a gear cover 280 side (refer to FIG. 15) blocking the gear case 270 faces a side below the vehicle 210.

As illustrated in FIG. 13, the wiper motor 240 forming the wiper device 220 includes a motor part 250 and a deceleration mechanism part 260. The motor part 250 includes a yoke (motor case) 251 which is formed to have substantially a bottomed cylindrical shape by performing deep drawing or the like with a steel plate, and as illustrated in FIG. 14, four magnets 252 in total (only two are illustrated in the diagram) are fixed to the radially inner side of the yoke 251. In addition, an armature core 253 is turnably provided on the radially inner side of each of the magnets 252 with a predetermined space (air gap) therebetween.

An armature shaft (rotation shaft) 254 constituted of a round steel rod is fixed to a rotation center of the armature core 253. The armature shaft 254 jointly rotates in accordance with rotation of the armature core 253. A pair of worms 255 are integrally provided on the distal end side of the armature shaft 254 (left side in FIG. 14), and twirling directions of the respective worms 255 are opposite to each other.

Moreover, a commutator 256 is fixed between the worms 255 and the armature core 253 in the longitudinal direction of the armature shaft 254. Three brushes 257 in total (only two are illustrated in the diagram) come into sliding contact with an outer circumferential portion of the commutator 256. In this manner, the wiper motor 240 is an electric motor with brushes, which is rotationally driven in the forward direction or the reverse direction when a drive current is supplied from a battery or the like (not illustrated) installed in the engine room or the like.

As illustrated in FIG. 13, the deceleration mechanism part 260 includes the gear case 270 and the gear cover 280. The gear case 270 and the gear cover 280 correspond to the housings in the present invention. As illustrated in FIG. 14, a deceleration mechanism SD2 is accommodated inside the gear case 270 and the gear cover 280. The deceleration mechanism SD2 is formed to include the pair of worms 255 provided in the armature shaft 254, a pair of counter gears 261 respectively meshed with these worms 255, and a single spur gear 262 meshed with these counter gears 261.

The pair of worms 255 are respectively meshed with large-diameter teeth parts 261*a* of the pair of counter gears 261. Accordingly, the pair of counter gears 261 individually rotate in the same direction (counterclockwise direction) in accordance with rotation of the armature core 253 (refer to the arrow R21) as indicated by the arrow R22. In addition, a teeth part 262*a* of the spur gear 262 is meshed with small-diameter teeth parts 261*b* of the pair of counter gears

261. Accordingly, the spur gear 262 rotates in the clockwise direction as indicated by the arrow R23.

Accordingly, high-speed rotation of the armature core 253 (armature shaft 254) is decelerated by the pair of worms 255 and the pair of counter gears 261, and therefore the spur gear 262 rotates at a low speed. Accordingly, a torque-increased rotation force is output toward the link mechanism 242 (refer to FIG. 12) from the output shaft 241 fixed to the rotation center of the spur gear 262.

As illustrated in FIG. 13, the gear case 270 forming the deceleration mechanism part 260 is formed to have substantially a bowl shape including a case bottom wall 271 by pouring a molten aluminum material into a casting mold. In addition, as illustrated in FIG. 15, the gear cover 280 forming the deceleration mechanism part 260 is formed to have substantially a bowl shape including a cover bottom wall 281 by pouring a molten plastic material into a mold (not illustrated).

Further, in a state in which the gear case 270 and the gear cover 280 abut against each other, a hollow part 263 (refer to FIG. 17) is formed inside these, and the deceleration mechanism SD2 (refer to FIG. 14) is accommodated inside the hollow part 263. In a state in which the motor part 250 and the deceleration mechanism part 260 are assembled, the inside of the hollow part 263 and the inside of the yoke 251 (not illustrated) communicate with each other.

In addition, a connection portion (abutment portion) between the gear case 270 and the gear cover 280 and a connection portion (abutment portion) between the gear case 270 and the yoke 251 are sealed from each other with a seal member such as an O-ring (not illustrated) therebetween. Accordingly, intrusion of rainwater or the like into the wiper motor 240 from these connection portions is inhibited.

Moreover, as illustrated in FIG. 13, three attachment legs 272 in total are provided integrally with the case bottom wall 271 of the gear case 270. These attachment legs 272 are provided outside the gear case 270 and disposed with an interval of substantially 120 degrees therebetween centering on the output shaft 241. The attachment legs 272 are portions fixed to an attachment bracket (not illustrated) provided in the vehicle 210. An attachment bolt (not illustrated) is screw-fastened to each of the attachment legs 272. Accordingly, the wiper motor 240 can be firmly fixed to the attachment bracket without shaking.

Further, a distal end portion of the output shaft 241 fixed to the spur gear 262 protrudes toward the outside from a substantially center portion of the case bottom wall 271. Here, a seal member such as an O-ring (not illustrated) is provided between the case bottom wall 271 and the output shaft 241. Accordingly, intrusion of rainwater or the like into the wiper motor 240 from between the output shaft 241 and the case bottom wall 271 is inhibited.

As illustrated in FIG. 13, similar to the output shaft 241 of the spur gear 262, center shafts 261*c* of the pair of counter gears 261 are also rotatably supported by the case bottom wall 271 of the gear case 270.

As illustrated in FIGS. 13 and 15, a connector connection part 282 is provided integrally with the gear cover 280. An external connector (not illustrated) provided in the vehicle 210 is connected to a distal end portion of the connector connection part 282 (right side in FIG. 15). Accordingly, a drive current is supplied to the wiper motor 240 from a battery or the like of the vehicle 210. Here, the connection direction of the external connector with respect to the connector connection part 282 is from a side of the gear cover 280 opposite to the motor part 250 side. That is, as illustrated in FIG. 13, the connector connection part 282 is disposed substantially coaxially with the motor part 250.

In addition, as illustrated in FIG. 15, a breathing mechanism 290 is provided in the vicinity of the connector connection part 282 in the gear cover 280. The breathing mechanism 290 is provided integrally with the gear cover 280 and jointly formed when the gear cover 280 is molded. Further, the breathing mechanism 290 has a function of imparting a breathing function to the wiper motor 240 in order to curb pressure fluctuation between the inside and the outside of the wiper motor 240.

Specifically, the breathing mechanism 290 has a function of preventing intrusion of rainwater or the like into the wiper motor 240 caused by pressure fluctuation between the inside and the outside thereof while allowing air to smoothly flow in and out (breathable) in accordance with pressure fluctuation between the inside and the outside of the wiper motor 240. Here, in order to obtain the ideal breathing mechanism 290, there is a need to achieve both the foregoing antithetical events, that is, to facilitate "breathing" and not to suction rainwater or the like.

The breathing mechanism 290 is disposed at a portion away from the motor part 250 in a portion of the gear cover 280. Accordingly, for instance, even if rainwater or the like has intruded into the wiper motor 240 through the breathing mechanism 290, the rainwater or the like which has intruded is unlikely to reach a portion of the commutator 256 or the brushes 257 (refer to FIG. 14). Thus, damage or the like to the wiper motor 240 or a controller (not illustrated) for controlling the wiper motor 240 due to an overcurrent is effectively curbed.

The breathing mechanism 290 includes a communication hole 291 provided in the gear cover 280, a cylindrical member 292 extending in the axial direction of the communication hole 291 (axial direction of the output shaft 241), and a pair of rib members 293 integrally provided on the radially outer side of the cylindrical member 292. As illustrated in FIG. 15, on a side opposite to the side where the pair of rib members 293 are provided in the radial direction of the cylindrical member 292, a cover side wall 283 forming the gear cover 280 and a proximal end portion of the connector connection part 282 (left side in FIG. 15) are disposed close to each other.

As illustrated in FIG. 16, the communication hole 291 is provided in a cover plane part 284 offset in the axial direction of the output shaft 241 (refer to FIG. 15) with respect to the cover bottom wall 281 of the gear cover 280. Specifically, the communication hole 291 is provided in a portion of the gear cover 280 closest to the gear case 270 (upper side in the diagram) the axial direction of the output shaft 241. Here, an inner diameter dimension of the communication hole 291 is approximately 10 mm. Further, the communication hole 291 allows the inside and the outside of the gear cover 280 (wiper motor 240) to communicate with each other and functions as a so-called "breathing hole".

In addition, as illustrated in FIG. 16, the cylindrical member 292 is provided integrally with the cover plane part 284 of the gear cover 280. Specifically, the proximal end side of the cylindrical member 292 in the axial direction is fixed to the cover plane part 284. The cylindrical member 292 is provided outside the gear cover 280, and the distal end side thereof in the axial direction extends to a side opposite to the gear case 270 side in the axial direction of the output shaft 241. That is, the cylindrical member 292 extends in the axial direction of the communication hole 291 (output shaft 241).

Further, the cylindrical member 292 is disposed coaxially with the communication hole 291, and the radially inner side of the cylindrical member 292 communicates with the communication hole 291. In addition, an inner diameter dimension of the cylindrical member 292 is also approximately 10 mm. Accordingly, the inside and the outside of the wiper motor 240 communicate with each other through the cylindrical member 292 and the communication hole 291, air circulates through the cylindrical member 292 and the communication hole 291.

A length dimension H21 of the cylindrical member 292 from the cover plane part 284 is substantially equivalent to the height dimension of the cover side wall 283 in the axial direction of the output shaft 241. That is, a portion of the cylindrical member 292 on the distal end side in the axial direction substantially reaches a portion of the cover bottom wall 281 of the gear cover 280. Accordingly, a situation in which the cylindrical member 292 significantly protrudes in the axial direction of the communication hole 291 is curbed, and therefore increase in size of the wiper motor 240 is curbed. In other words, the breathing mechanism 290 is disposed in a relatively large dead space DS2 (refer to FIGS. 15 and 16) formed in the gear cover 280.

In this manner, since the cylindrical member 292 communicating with the communication hole 291 is provided, when the wiper motor 240 is exposed to water, rainwater or the like approaching along a surface of the wiper motor 240 from above in the diagram moves along a surface of the cylindrical member 292. Thus, even if the wiper motor 240 is exposed to water, rainwater or the like is unlikely to reach the communication hole 291.

Moreover, as illustrated in FIG. 16, the pair of rib members 293 are disposed on the radially outer side of the cylindrical member 292 with an interval of substantially 90 degrees therebetween in the circumferential direction of the cylindrical member 292. These rib members 293 are formed to have substantially the same thickness as the thickness of the cylindrical member 292, have substantially a rectangular plate shape, protrude toward the radially outer side of the cylindrical member 292, and extend in the axial direction of the cylindrical member 292.

Specifically, a pair of short side parts 293a of the rib members 293 extend in the radial direction of the cylindrical member 292, and the short side parts 293a of the rib members 293 on the proximal end side in the axial direction of the cylindrical member 292 are fixed to the cover plane part 284. In addition, a pair of long side parts 293b of the rib members 293 extend in the axial direction of the cylindrical member 292, and the long side parts 293b of the rib members 293 on the proximal end side in the radial direction of the cylindrical member 292 are fixed to the cylindrical member 292.

In this manner, while thicknesses of the rib members 293 have substantially the same thickness as the thickness of the cylindrical member 292, and one short side part 293a and one long side part 293b of the rib members 293 are respectively integrated with the cover plane part 284 and the cylindrical member 292. Therefore, when the gear cover 280 is molded, a molten material can be easily and evenly spread over each of narrow portions in molds for forming the cylindrical member 292 and the pair of rib members 293. Thus, occurrence of a manufacturing failure so-called "short shot" is curbed.

In addition, each of the pair of rib members 293 extends from the cover plane part 284 in the axial direction of the cylindrical member 292 with a length dimension H22. The length dimensions H22 of these rib members 293 are smaller than the length dimension H21 of the cylindrical member 292 from the cover plane part 284 (H22<H21). Specifically, the length dimensions H22 of the rib members 293 are approximately ⅔ of the length dimension H21 of the cylindrical member 292. Accordingly, unnecessary increase in size of the breathing mechanism 290 is curbed.

Moreover, recessed parts 293c recessed toward the proximal end sides of the rib members 293 in the axial direction of the cylindrical member 292 (communication hole 291) are respectively provided in the pair of rib members 293. The recessed parts 293c are provided on the distal end sides of the rib members 293 in the axial direction of the cylindrical member 292 and provided between the cylindrical member 292 and the rib members 293. Here, the recessed parts 293c correspond to the first recessed parts in the present invention.

In this manner, since the pair of rib members 293 are provided on the radially outer side of the cylindrical member 292, when the wiper motor 240 is exposed to water, rainwater or the like moving along a surface of the gear case 270 also moves along surfaces of these rib members 293 in addition to an area around the cylindrical member 292. Thus, a flow of rainwater or the like reaching an opening portion 292a of the cylindrical member 292 is disturbed so that generation of a water film formed to block the opening portion 292a can be curbed.

Particularly, since the recessed parts 293c are provided on the distal end sides of the rib members 293 and between the cylindrical member 292 and the rib members 293, a position where rainwater or the like moving along the surfaces of the rib members 293 drops can be kept away from the cylindrical member 292 to the radially outer side. Thus, generation of a water film formed to block the opening portion 292a can be further curbed.

Next, the breathing function of the wiper motor 240 formed as described above and a function when it is exposed to water will be described in detail using (a) and (b) of FIG. 17.

(a) of FIG. 17 is an enlarged cross-sectional view of a portion of the cylindrical member 292 (not including the rib members 293), and (b) of FIG. 17 is an enlarged cross-sectional view of the cylindrical member 292 including the rib members 293.

First, the breathing function of the wiper motor 240 will be described.

If the wiper motor 240 installed inside the engine room is driven, the temperature inside the wiper motor 240 rises due to heat generated by the wiper motor 240 and a high-temperature atmosphere inside the engine room. Further, if rainwater WA2 spatters on the wiper motor 240 and the wiper motor 240 is exposed to water in this state, the wiper motor 240 is rapidly cooled. Thus, a temperature difference occurs between the inside and the outside of the wiper motor 240. Consequently, the hollow part 263 (inside) of the wiper motor 240 is at a relatively low temperature compared to the outside of the wiper motor 240. Accordingly, the hollow part 263 is under a negative pressure, and air AR2 outside the gear case 270 flows into the hollow part 263 (refer to the dashed line arrow in the diagram) through the cylindrical member 292 and the communication hole 291. Accordingly, occurrence of a differential pressure between the inside and the outside of the wiper motor 240 is curbed.

In contrast, if the temperature inside the wiper motor 240 significantly rises due to a high-speed operation or the like of the wiper motor 240 performed for a long period of time, and the temperature inside the wiper motor 240 exceeds the external temperature, the hollow part 263 is at a relatively high temperature compared to the outside of the wiper motor 240.

Consequently, contrary to that described above, the hollow part 263 is under a positive pressure, and the air AR2 inside the hollow part 263 is discharged to the outside through the communication hole 291 and the cylindrical member 292 (refer to the solid line arrow in the diagram). Accordingly, occurrence of a differential pressure between the inside and the outside of the wiper motor 240 is curbed.

However, the inside and the outside of the wiper motor 240 communicates with each other at all times through the cylindrical member 292 and the communication hole 291. For this reason, the air AR2 does not rapidly move between the inside and the outside of the wiper motor 240.

Next, a function when the wiper motor 240 is exposed to water will be described.

If the vehicle 210 travels in heavy rain, the rainwater WA2 intrudes into the engine room so that the wiper motor 240 is exposed to water. Consequently, as indicated by the arrows M21 and M22 in the diagram, the rainwater WA2 approaches along the surface of the wiper motor 240 from the gear case 270 side toward the gear cover 280. At this time, it is divided into rainwater or the like moving along the surface of the cylindrical member 292 (arrow M21) and rainwater or the like moving along the surfaces of the rib members 293 (arrow M22), and thereafter it drops immediately below (downward) the breathing mechanism 290. In this case, confluence of rainwater or the like moving along the surfaces of the rib members 293 and rainwater or the like moving along the surface of the cylindrical member 292 is curbed by the recessed parts 293c between the cylindrical member 292 and the rib members 293.

Accordingly, a flow of rainwater or the like reaching the opening portion 292a of the cylindrical member 292 is disturbed so that a water film is unlikely to be formed in the opening portion 292a. For instance, even if a water film is formed in the opening portion 292a, the water film has an unstable thickness, and the water film is in a fragile state. Thus, intrusion of rainwater or the like into the wiper motor 240 (hollow part 263) is curbed.

As described above in detail, according to the wiper motor 240 of the present embodiment, since the rib members 293 protruding toward the radially outer side of the cylindrical member 292 and extending in the axial direction of the cylindrical member 292 are integrally provided on the radially outer side of the cylindrical member 292, when the gear cover 280 is molded, a molten plastic material can be spread over each of narrow portions in molds for forming the cylindrical member 292 and the rib members 293. Thus, occurrence of a manufacturing failure so-called "short shot" is curbed, and therefore reduction in defective rate can be realized.

In addition, since rainwater or the like flows along each of the cylindrical member 292 and the rib members 293 when the gear cover 280 is exposed to water, a situation in which rainwater or the like reaches the opening portion 292a of the cylindrical member 292 simultaneously (at the same time) is curbed. Therefore, a water film can be prevented from being formed in the opening portion 292a. Thus, a situation in which rainwater or the like is suctioned into the gear cover 280 is effectively curbed, and therefore improvement in water exposure reliability can be realized.

Moreover, according to the wiper motor 240 of the present embodiment, the recessed parts 293c recessed toward the proximal end sides of the rib members 293 in the axial direction of the cylindrical member 292 are provided on the distal end sides of the rib members 293 in the axial direction of the cylindrical member 292 and between the cylindrical member 292 and the rib members 293. Accordingly, a position where rainwater or the like moving along the surfaces of the rib members 293 drops can be kept away from the cylindrical member 292 to the radially outer side. Thus, generation of a water film formed to block the opening portion 292*a* can be further curbed.

In addition, according to the wiper motor 240 of the present embodiment, a defective rate can be reduced by curbing occurrence of a manufacturing failure. Moreover, water exposure reliability can be improved, a lifespan of the product can be extended, and therefore a life cycle of the product can be lengthened while manufacturing energy saving is achieved. Thus, in the Sustainable Development Goals (SDGs) led by the United Nations, it is possible to particularly contribute to Goal 7 (Ensure access to affordable, reliable, sustainable, and modern energy for all) and Goal 13 (Take urgent action to combat climate change and its impacts). Next, Embodiment 5 of the present invention will be described in detail using the drawings. The same signs are applied to portions having a function similar to that in Embodiment 4 described above, and detailed description thereof will be omitted.

FIG. 18 is an enlarged perspective view around a cylindrical member in a wiper motor according to Embodiment 5.

As illustrated in FIG. 18, a wiper motor (motor with a deceleration mechanism) 2100 according to Embodiment 5 differs from the wiper motor 240 according to Embodiment 4 (refer to FIG. 16) in structure of a breathing mechanism 2110. Specifically, it differs from Embodiment 4 in that three notch parts 2111 in total are additionally provided in the cylindrical member 292 forming the breathing mechanism 2110.

These notch parts 2111 are formed to have substantially a rectangular shape, provided on the distal end side of the cylindrical member 292 in the axial direction (lower side in the diagram), and provided in a recessed manner at a predetermined depth toward the proximal end side of the cylindrical member 292 in the axial direction. Here, the notch parts 2111 correspond to the second recessed parts in the present invention, and a depth dimension D2 is substantially equivalent to a value obtained subtracting the length dimensions H22 of the rib members 293 from the cover plane part 284 from the length dimension H21 of the cylindrical member 292 from the cover plane part 284 (D2≈H21−H22).

In addition, the three notch parts 2111 in total are disposed with an interval of substantially 90 degrees therebetween in the circumferential direction of the cylindrical member 292 and disposed at positions shifted by substantially 45 degrees from the pair of rib members 293 with respect to the circumferential direction of the cylindrical member 292. That is, when the cylindrical member 292 is viewed in the axial direction, the notch parts 2111 and the rib members 293 are alternately arranged with a substantially equal interval (interval of substantially 45 degrees) therebetween in the circumferential direction of the cylindrical member 292.

In Embodiment 5 formed as described above as well, it is possible to exhibit operational effects substantially similar to those in Embodiment 4 described above. In addition to this, in Embodiment 5, since the three notch parts 2111 in total recessed at a predetermined depth toward the proximal end side of the cylindrical member 292 in the axial direction are provided on the distal end side of the cylindrical member 292 in the axial direction, a situation in which rainwater or the like reaches the opening portion 292*a* of the cylindrical member 292 at the same time can be even further curbed. Therefore, a water film can be further prevented from being formed in the opening portion 292*a*.

Next, Embodiment 6 of the present invention will be described in detail using the drawings. The same signs are applied to portions having a function similar to that in Embodiment 4 described above, and detailed description thereof will be omitted.

FIG. 19 is an enlarged perspective view around a cylindrical member in a wiper motor according to Embodiment 6.

As illustrated in FIG. 19, a wiper motor (motor with a deceleration mechanism) 2120 according to Embodiment 6 differs from the wiper motor 240 according to Embodiment 4 (refer to FIG. 16) in structure of a breathing mechanism 2130. The breathing mechanism 2130 includes elongated rib members 2131 having a pair of short side parts 2131*a* and a pair of long side parts 2131*b*. Length dimensions H23 of the rib members 2131 in the longitudinal direction are greater than the length dimensions H22 of the rib members 293 according to Embodiment 4 (refer to FIG. 16) in the longitudinal direction (H23>H22).

In addition, length dimensions H23 of the rib members 2131 in the axial direction of the cylindrical member 292 is greater than the length dimension H21 of the cylindrical member 292 (H23>H21>H22). Moreover, in Embodiment 6, the length dimensions H23 of the rib members 2131 is made greater than the length dimension H21 of the cylindrical member 292. Accordingly, the recessed parts 293*c* (refer to FIG. 16) between the cylindrical member 292 and the rib members 293 according to Embodiment 4 are omitted.

In Embodiment 6 formed as described above as well, it is possible to exhibit operational effects substantially similar to those in Embodiment 4 described above. In addition to this, in Embodiment 6, since the length dimensions H23 of the rib members 2131 in the axial direction of the cylindrical member 292 is greater than the length dimension H21 of the cylindrical member 292, rainwater or the like can gather on the distal end sides of the rib members 2131 in the longitudinal direction (lower side in the diagram). Therefore, rainwater or the like can be made difficult to reach the opening portion 292*a* of the cylindrical member 292. Thus, a water film can be even further prevented from being formed in the opening portion 292*a*.

Next, Embodiment 7 of the present invention will be described in detail using the drawings. The same signs are applied to portions having a function similar to that in Embodiment 4 described above, and detailed description thereof will be omitted.

FIG. 20 is an enlarged perspective view around a cylindrical member in a wiper motor according to Embodiment 7.

As illustrated in FIG. 20, a wiper motor (motor with a deceleration mechanism) 2140 according to Embodiment 7 differs from the wiper motor 240 according to Embodiment 4 (refer to FIG. 16) in structure of a breathing mechanism 2150. The breathing mechanism 2150 has a breathing cylinder 2151 having a communication hole 2151*a* on the radially inner side of the cylindrical member 292. The breathing cylinder 2151 is provided outside the gear cover 280 and protrudes in the same direction as the cylindrical member 292. Further, a length dimension H24 of the breathing cylinder 2151 from the cover plane part 284 is smaller than the length dimension H21 of the cylindrical member 292 from the cover plane part 284 (H24<H21). Accordingly, when the cylindrical member 292 is viewed from the radially outer side, the breathing cylinder 2151 is hidden by the cylindrical member 292.

In addition, the cylindrical member 292 is provided with rib members 2152 each having a rib main body 2152a and a tapered part 2152b. The tapered part 2152b is provided on the distal end side of each rib member 2152 in the axial direction of the cylindrical member 292 and formed such that a height dimension of the rib member 2152 in the radial direction of the cylindrical member 292 gradually decrease toward the distal end side of the rib member 2152.

Here, a length dimension H25 of the tapered part 2152b in the axial direction of the cylindrical member 292 is smaller than a length dimension H26 of the rib main body 2152a from the cover plane part 284 (H25<H26). In addition, the length dimension H24 of the breathing cylinder 2151 is smaller than the length dimensions H26 and H25 of the rib members 2152 (H24<H26+H25). Moreover, the length dimensions H26 and H25 of the rib members 2152 are smaller than the length dimension H21 of the cylindrical member 292 (H26+H25<H21).

In addition, in Embodiment 7, the tapered parts 2152b are respectively provided in the rib members 2152. Accordingly, the recessed parts 293c (refer to FIG. 16) between the cylindrical member 292 and the rib members 293 according to Embodiment 4 are omitted.

Moreover, the cylindrical member 292 is provided with a pair of slits 2153 extending in the axial direction of the cylindrical member 292. These slits 2153 are disposed at positions respectively shifted by substantially 45 degrees to one side in the circumferential direction and the other side in the circumferential direction of the cylindrical member 292 with respect to one rib member 2152 (right side in the diagram). Further, the opening widths W2 of the slits 2153 are smaller than thickness dimensions T2 of the rib members 2152 (W2<T2). Accordingly, while intrusion of rainwater or the like into the radially inner side of the cylindrical member 292 is curbed, rainwater or the like which has intruded into the radially inner side of the cylindrical member 292 can be quickly discharged to the outside of the cylindrical member 292.

In Embodiment 7 formed as described above as well, it is possible to exhibit operational effects substantially similar to those in Embodiment 4 described above. In addition to this, in Embodiment 7, the tapered parts 2152b are respectively provided on the distal end sides of the rib members 2152 in the axial direction of the cylindrical member 292 such that height dimensions of the rib members 2152 in the radial direction of the cylindrical member 292 gradually decrease toward the distal end sides of the rib members 2152. Therefore, a mold used when the gear cover 280 is injection-molded or the like can be easily released. Thus, moldability of the gear cover 280 can be further improved.

The present invention is not limited to each of the embodiments described above, and it goes without saying that various changes can be made within a range not departing from the gist thereof. For example, in each of the embodiments described above, each of the breathing mechanisms 290, 2110, 2130, and 2150 is provided in the gear cover 280, but the present invention is not limited thereto. For example, in a case of an attachment posture in which the gear case 270 side faces a side below the vehicle 210, a breathing mechanism may be provided in the gear case 270.

In addition, in each of the embodiments described above, the communication hole 291 or 2151a is provided with nothing in order to sufficiently exhibit the breathing function, but the present invention is not limited thereto, and a porous film (made of a fluororesin or the like) which blocks the communication hole allowing air to pass therethrough but not allowing water to pass therethrough can also be provided.

Moreover, in each of the embodiments described above, the wiper motor 240, 2100, 2120, or 2140 is applied to a wiper device on the front side wiping the wiping ranges 213 on the windshield 212, but the present invention is not limited thereto and can also be applied to wiper devices on the rear side wiping a wiping range on a rear glass.

In addition, in each of the embodiments described above, the wiper motor 240, 2100, 2120, or 2140 has been described as an example, but the present invention is not limited thereto and can also be applied to motors with a deceleration mechanism in a similar attachment posture for other purposes having a probability of water exposure.

Moreover, in each of the embodiments described above, the motor part 250 is an electric motor with brushes, but the present invention is not limited thereto, and a motor part may be a brushless electric motor.

Furthermore, the material, the shape, the dimension, the number, the installation place, and the like of each of the constituent elements in each of the embodiments described above are arbitrary as long as the present invention can be achieved and are not limited to each of the embodiments described above.

Hereinafter, Embodiment 8 of the present invention will be described in detail using the drawings.

FIG. 21 a schematic view of a vehicle in which the wiper motor is mounted, FIG. 22 is a perspective view illustrating the wiper motor in FIG. 21, FIG. 23 is a cross-sectional view along line A3-A3 in FIG. 22, FIG. 24 is a view illustrating an internal structure of the wiper motor in FIG. 22, FIG. 25 is an enlarged view of a dashed circle B3 part in FIG. 22, FIG. 26 is an enlarged view of a dashed circle C3 part in FIG. 24, FIG. 27 is a cross-sectional view along line D3-D3 in FIG. 26, FIG. 28 is a perspective view of a single gear cover, (a) and (b) of FIG. 29 are perspective views of a single breather cap, FIG. 30 is an exploded perspective view of a deceleration mechanism part of the wiper motor in FIG. 22, FIG. 31 is an explanatory view of a flow condition of rainwater or the like in the cylindrical member, and FIG. 32 is an explanatory view of another attachment posture of the wiper motor in FIG. 22, respectively.

As illustrated in FIG. 21, a wiper device 320 is mounted in an engine room (not illustrated) on the front of a vehicle 310 such as an automobile. The wiper device 320 swings a pair of wiper members 330 provided correspondingly to the driver's seat side (Driver) and the assistant driver's seat side (Assist). The wiper members 330 include wiper arms 331 formed to have substantially a rod shape, and the proximal end sides of the wiper arms 331 in the longitudinal direction are fixed to pivot axes 311 which are turnably provided in the vehicle 310. In addition, wiper blades 332 are mounted on the distal end sides of the wiper arms 331 in the longitudinal direction. Accordingly, the wiper arms 331 swing on a windshield 312 when the wiper device 320 is driven.

The wiper device 320 includes a wiper motor (motor with a deceleration mechanism) 340. In addition, the wiper motor 340 includes an output shaft 341, and a link mechanism 342 for converting rotational motion of the output shaft 341 into swing motion of the pair of pivot axes 311 is provided between the output shaft 341 and the pair of pivot axes 311. Accordingly, rotational motion of the output shaft 341 becomes swing motion of the pivot axes 311 through the link mechanism 342 in accordance with operation of the wiper motor 340, and the wiper blades 332 perform a reciprocating wiping operation in respective wiping ranges 313.

Here, in a state in which the wiper motor 340 is mounted in the vehicle 310, the attachment posture of the wiper motor 340 with respect to the vehicle 310 is a posture illustrated in FIG. 22. That is, a gear case 370 side where the output shaft 341 protrudes faces a side below the vehicle 310, and a gear cover 380 side mounted in the gear case 370 faces a side above the vehicle 310. In addition, a deceleration mechanism part 360 side of the wiper motor 340 in the longitudinal direction is inclined toward a side below the vehicle 310, and a breathing mechanism 390 side of the wiper motor 340 in transverse direction is inclined toward a side below the vehicle 310. Thus, the rainwater WA moving along a surface of the wiper motor 340 flows as indicated by the dashed line arrow.

As illustrated in FIG. 22, the wiper motor 340 forming the wiper device 320 includes a motor part 350 and the deceleration mechanism part 360. The motor part 350 includes a yoke (motor case) 351 which is formed to have substantially a bottomed cylindrical shape by performing deep drawing or the like with a steel plate, and as illustrated in FIG. 23, four magnets 352 in total (only two are illustrated in the diagram) are fixed to the radially inner side of the yoke 351. In addition, an armature core 353 is turnably provided on the radially inner side of each of the magnets 352 with a predetermined space (air gap) therebetween.

An armature shaft (rotation shaft) 354 constituted of a round steel rod is fixed to a rotation center of the armature core 353. The armature shaft 354 jointly rotates in accordance with rotation of the armature core 353. A pair of worms 355 are integrally provided on the distal end side of the armature shaft 354 (left side in FIG. 23), and the twirling directions of the respective worms 355 are opposite to each other.

Moreover, a commutator 356 is fixed between the worms 355 and the armature core 353 in the longitudinal direction of the armature shaft 354. Three brushes 357 in total (only two are illustrated in the diagram) come into sliding contact with an outer circumferential portion of the commutator 356. In this manner, the wiper motor 340 is an electric motor with brushes, which is rotationally driven in the forward direction or the reverse direction when a drive current is supplied from a battery or the like (not illustrated) installed in the engine room or the like. As illustrated in FIG. 22, the deceleration mechanism part 360 includes the gear case 370 and the gear cover 380. The gear case 370 and the gear cover 380 correspond to the housings in the present invention. As illustrated in FIGS. 23 and 30, a deceleration mechanism SD3 is accommodated inside the gear case 370 and the gear cover 380. The deceleration mechanism SD3 is formed to include the pair of worms 355 provided in the armature shaft 354, a pair of counter gears 361 respectively meshed with these worms 355, and a single spur gear 362 meshed with these counter gears 361.

The pair of worms 355 are respectively meshed with large-diameter teeth parts 361*a* of the pair of counter gears 361. Accordingly, the pair of counter gears 361 individually rotate in the same direction (counterclockwise direction) in accordance with rotation of the armature core 353 (refer to the arrow R31) as indicated by the arrow R32. In addition, a teeth part 362*a* of the spur gear 362 is meshed with small-diameter teeth parts 361*b* of the pair of counter gears 361. Accordingly, the spur gear 362 rotates in the clockwise direction as indicated by the arrow R33.

Accordingly, high-speed rotation of the armature core 353 (armature shaft 354) is decelerated by the pair of worms 355 and the pair of counter gears 361, and therefore the spur gear 362 rotates at a low speed. Accordingly, a torque-increased rotation force is output toward the link mechanism 342 (refer to FIG. 21) from the output shaft 341 fixed to the rotation center of the spur gear 362.

As illustrated in FIG. 22, the gear case 370 forming the deceleration mechanism part 360 is formed to have substantially a bowl shape including a case bottom wall 371 (refer to FIG. 24) by pouring a molten aluminum material into a casting mold. In addition, the gear cover 380 forming the deceleration mechanism part 360 is formed to have substantially a bowl shape including a cover bottom wall 381 by pouring a molten plastic material into a mold (not illustrated).

Further, in a state in which the gear case 370 and the gear cover 380 abut against each other, a hollow part 363 (refer to FIGS. 24, 26, and 27) is formed inside these, and the deceleration mechanism SD3 is accommodated inside the hollow part 363. This deceleration mechanism SD3 is rotatably supported by the case bottom wall 371 of the gear case 370. In a state in which the motor part 350 and the deceleration mechanism part 360 are assembled, the inside of the hollow part 363 and the inside of the yoke 351 (not illustrated) communicate with each other.

In addition, a connection portion (abutment portion) between the gear case 370 and the gear cover 380 and a connection portion (abutment portion) between the gear case 370 and the yoke 351 are sealed from each other with a seal member such as an O-ring (not illustrated) therebetween. Accordingly, intrusion of rainwater or the like into the wiper motor 340 from these connection portions is inhibited.

Here, three attachment legs 372 in total (only two are illustrated in the diagram) are provided integrally with the case bottom wall 371 of the gear case 370, and the wiper motor 340 is fixed to the vehicle 310 with these attachment legs 372 therebetween. In addition, the output shaft 341 fixed to the spur gear 362 is rotatably supported by a substantially center portion of the case bottom wall 371 with a seal member such as an O-ring (not illustrated) therebetween. Thus, intrusion of rainwater or the like into the wiper motor 340 from between the output shaft 341 (refer to FIG. 23) and the case bottom wall 371 is inhibited. Moreover, center shafts 361*c* (refer to FIG. 23) of the pair of counter gears 361 are also rotatably supported by the case bottom wall 371 of the gear case 370.

As illustrated in FIGS. 22 and 30, the gear cover 380 mounted in the gear case 370 is fixed to the gear case 370 using four fixing screws SC31 in total. In addition, a connector connection part 382 provided integrally with the gear cover 380. An external connector (not illustrated) provided in the vehicle 310 is connected to a distal end portion of the connector connection part 382 (left side in the diagram). Accordingly, a drive current is supplied to the wiper motor 340 from a battery or the like of the vehicle 310. Here, the connection direction of the external connector with respect to the connector connection part 382 is from a side of the gear cover 380 opposite to the motor part 350 side. That is, as illustrated in FIG. 22, the connector connection part 382 is disposed substantially coaxially with the motor part 350.

In addition, as illustrated in FIGS. 22, 24 to 27, the breathing mechanism 390 is provided in the vicinity of the connector connection part 382 in the gear cover 380. The breathing mechanism 390 includes a communication hole 391, a small-diameter cylinder part 392, a cylindrical member 393, a filter 394, and a breather cap 395. Here, the communication hole 391, the small-diameter cylinder part 392, and the cylindrical member 393 are provided integrally with the gear cover 380 and jointly formed when the gear cover 380 is molded. Further, the breathing mechanism 390 has a function of imparting a breathing function to the wiper motor 340 in order to curb pressure fluctuation between the inside and the outside of the wiper motor 340.

Specifically, the breathing mechanism 390 has a function of preventing intrusion of rainwater or the like into the wiper motor 340 while allowing air to smoothly flow in and out (breathable) in accordance with pressure fluctuation between the inside and the outside of the wiper motor 340. Here, in order to obtain the ideal breathing mechanism 390, there is a need to achieve both the foregoing antithetical events, that is, to facilitate "breathing" and to make it difficult for rainwater or the like to intrude.

The breathing mechanism 390 is disposed at a portion away from the motor part 350 in a portion of the gear cover 380 (refer to FIG. 22). Accordingly, for instance, even if rainwater or the like has intruded into the wiper motor 340 through the breathing mechanism 390, the rainwater or the like which has intruded is unlikely to reach a portion of the commutator 356 or the brushes 357 (refer to FIG. 23). Thus, damage or the like to the wiper motor 340 or a controller (not illustrated) for controlling the wiper motor 340 due to an overcurrent is effectively curbed.

As illustrated in FIGS. 26 and 27, the communication hole 391 is provided in a cover plane part 384 which is provided to be offset in the axial direction of the output shaft 341 (refer to FIG. 23) with respect to the cover bottom wall 381 of the gear cover 380. Specifically, the communication hole 391 is provided in a portion of the gear cover 380 near the gear case 370 (below in FIG. 26) in the axial direction of the output shaft 341. Here, an inner diameter dimension of the communication hole 391 is approximately 2 mm. Further, the communication hole 391 allows the inside and the outside of the gear cover 380 (wiper motor 340) to communicate with each other and functions as a so-called "breathing hole".

The small-diameter cylinder part 392 is provided outside the gear cover 380 and extends in the axial direction of the communication hole 391. Further, an air passage 392a is provided on the radially inner side of the small-diameter cylinder part 392, and the proximal end side of the air passage 392a in the longitudinal direction (below in FIG. 26) communicates with the communication hole 391. That is, the proximal end side of the small-diameter cylinder part 392 in the longitudinal direction is provided integrally with the cover plane part 384. An inner diameter dimension of the air passage 392a is approximately 2 mm which is the same as the inner diameter dimension of the communication hole 391. In addition, an outer diameter dimension of the small-diameter cylinder part 392 is approximately 5 mm. Moreover, a height dimension of the small-diameter cylinder part 392 from the cover plane part 384 is approximately ⅔ of a distance from the cover plane part 384 to the cover bottom wall 381.

In addition, the cylindrical member 393 is provided integrally with the cover plane part 384 of the gear cover 380 and disposed in a manner of surrounding an area around the small-diameter cylinder part 392. That is, the cylindrical member 393 extends in the axial direction of the small-diameter cylinder part 392 and the communication hole 391 (in the axial direction of the output shaft 341). Specifically, the cylindrical member 393 is provided outside the gear cover 380, and the proximal end side of the cylindrical member 393 in the axial direction is fixed to the cover plane part 384.

Here, an inner diameter dimension of the cylindrical member 393 is approximately 10 mm, and the radially inner side of the cylindrical member 393 communicates with the communication hole 391 through the air passage 392a of the small-diameter cylinder part 392. Accordingly, the inside and the outside of the wiper motor 340 communicate with each other through the cylindrical member 393, the small-diameter cylinder part 392, and the communication hole 391, and air circulates through the cylindrical member 393, the small-diameter cylinder part 392, and the communication hole 391. In other words, the small-diameter cylinder part 392 having a smaller diameter than the cylindrical member 393 is provided on the radially inner side of the cylindrical member 393, and the air passage 392a on the radially inner side of the small-diameter cylinder part 392 communicates with both the radially inner side of the cylindrical member 393 and the communication hole 391.

A height dimension H2 of the cylindrical member 393 from the cover plane part 384 is substantially equivalent to the distance from the cover plane part 384 to the cover bottom wall 381. Accordingly, a situation in which the cylindrical member 393 (breathing mechanism 390) significantly protrudes in the axial direction of the communication hole 391 is curbed, and therefore increase in size of the wiper motor 340 is curbed. In other words, the breathing mechanism 390 is disposed in a relatively large dead space DS3 (refer to FIGS. 22, 25, and 27) formed in the gear cover 380.

In this manner, since the small-diameter cylinder part 392 and the cylindrical member 393 communicating with the communication hole 391 are provided, when the wiper motor 340 is exposed to water, rainwater or the like approaching along a surface of the wiper motor 340 is unlikely to reach the hollow part 363 inside the wiper motor 340.

As illustrated in FIGS. 27 and 28, a pair of slits 393a and 393b are provided in the cylindrical member 393. These slits 393a and 393b extend in the axial direction of the cylindrical member 393 and are provided throughout the entire area of the cylindrical member 393 in the longitudinal direction. The pair of slits 393a and 393b penetrate the cylindrical member 393 in the radial direction such that the inside and the outside of the cylindrical member 393 communicate with each other. In addition, the pair of slits 393a and 393b are disposed with an interval of substantially 90 degrees therebetween in the circumferential direction of the cylindrical member 393. Accordingly, even if the breather cap 395 is mounted on the distal end side of the cylindrical member 393 in the axial direction, air can circulate between the inside and the outside of the cylindrical member 393 through the pair of slits 393a and 393b.

As illustrated in FIG. 27, one slit 393a is disposed on a side farther from the hollow part 363 and the other slit 393b is disposed on a side closer to the hollow part 363. Further, regarding an attachment posture of the wiper motor 340 with respect to the vehicle 310, the one slit 393a is disposed near a side below the vehicle 310 and the other slit 393b is disposed near a side above the vehicle 310 (refer to FIG. 31).

Further, an opening width of the one slit 393a on the inner side of the cylindrical member 393 is wider than an opening width on the outer side. In other words, the opening width of the one slit 393a in the circumferential direction of the cylindrical member 393 is narrower on the outer side than on the inner side of the cylindrical member 393. Here, the opening width of the slit 393a on the wider side is approximately 2.5 mm, and the opening width thereof on the narrower side is approximately 1.5 mm.

Accordingly, rainwater or the like is unlikely to intrude into the cylindrical member 393 from a portion of the one slit 393a. For instance, even if rainwater or the like has intruded into the cylindrical member 393, the amount is very small, and rainwater or the like is likely to gather on the inner side of the one slit 393a (a portion of the opening width on the wider side). Thus, rainwater or the like which has intruded into the cylindrical member 393 from a portion of the one slit 393a can be quickly discharged to the outside of the cylindrical member 393.

In the other slit 393b as well, the opening width on the inner side of the cylindrical member 393 is wider than the opening width on the outer side. In other words, the opening width of the other slit 393b in the circumferential direction of the cylindrical member 393 is narrower on the outer side than on the inner side of the cylindrical member 393. Here, the opening width of the slit 393b on the wider side is approximately 2.5 mm, and the opening width on the narrower side is approximately 1.5 mm.

Moreover, as illustrated in FIGS. 27 and 28, a pair of rib members 393c are provided on the radially outer side of the cylindrical member 393 with an interval of substantially 90 degrees therebetween in in the circumferential direction of the cylindrical member 393. These rib members 393c have substantially the same thickness as the thickness of the cylindrical member 393, and they protrude toward the radially outer side of the cylindrical member 393 and extend in the axial direction of the cylindrical member 393.

Here, the proximal end sides of the rib members 393c in the axial direction of the cylindrical member 393 are fixed to the cover plane part 384. In addition, tapered parts TP3 are respectively provided on the distal end sides of the rib members 393c in the axial direction of the cylindrical member 393, and the tapered parts TP3 are formed such that height dimensions of the rib members 393c in the radial direction of the cylindrical member 393 gradually decrease toward the distal end sides of the rib members 393c. Accordingly, a mold used for injection molding or the like of the gear cover 380 can be easily released.

Further, the pair of slits 393a and 393b and the pair of rib members 393c are alternately disposed at positions shifted by substantially 45 degrees in the circumferential direction of the cylindrical member 393. More specifically, as illustrated in FIG. 27, when the cylindrical member 393 is viewed in the axial direction, the other slit 393b, the rib member 393c, the one slit 393a, and the rib member 393c are arranged in this order from the left side in the diagram in the circumferential direction of the cylindrical member 393.

Here, the pair of rib members 393c are disposed on both sides of the one slit 393a in the circumferential direction of the cylindrical member 393. Accordingly, regarding an attachment posture of the wiper motor 340 with respect to the vehicle 310, rainwater or the like approaching along the surface of the wiper motor 340 can be kept away from the one slit 393a (refer to FIG. 31). That is, the pair of rib members 393c have a function of preventing rainwater or the like from intruding into the cylindrical member 393 through the one slit 393a.

As illustrated in FIGS. 24, 26, and 30, the filter 394 is formed to have a thin disk shape and fixed to the distal end side of the small-diameter cylinder part 392 in the longitudinal direction (upper side in FIG. 26) by means of an adhesive, welding, or the like. Specifically, the filter 394 is provided in a manner of blocking the air passage 392a of the small-diameter cylinder part 392. The filter 394 is constituted of a porous film made of polytetrafluoroethylene (PTFE), for example, and has properties of allowing air to pass therethrough but not allowing water, dust, and the like to pass therethrough. Accordingly, water exposure reliability of the wiper motor 340 is improved. However, the filter 94 can also be omitted in accordance with the water exposure performance required for the wiper motor 340.

Moreover, as illustrated in FIGS. 25 to 27 and 29, the breather cap 395 is formed to have a predetermined shape using a resin material such as plastic and corresponds to the slit cover member in the present invention. The breather cap 395 includes a slit cover wall 396, a cap part 397, and a hook part 398.

As illustrated in FIG. 27, the slit cover wall 396 is disposed on the radially outer side of the cylindrical member 393 in a state in which the breather cap 395 is mounted in the wiper motor 340 (the gear case 370 and the gear cover 380). The slit cover wall 396 is formed to have substantially a V-shaped cross section in a direction intersecting the axial direction of the cylindrical member 393 and covers the pair of slits 393a and 393b from the radially outer side of the cylindrical member 393.

Here, a predetermined first space S31 is formed between the slit cover wall 396 and the pair of slits 393a and 393b. Accordingly, the pair of slits 393a and 393b are not blocked by the slit cover wall 396 so that air can flow in and out between the inside and the outside of the cylindrical member 393.

In addition, a predetermined second space S32 (refer to FIG. 25) is formed between the slit cover wall 396 and the cover plane part 384 with respect to the axial direction of the cylindrical member 393. According to this as well, the pair of slits 393a and 393b allow air to flow in and out between the inside and the outside of the cylindrical member 393 without being blocked by the slit cover wall 396.

Moreover, the cap part 397 is integrally provided on one side of the slit cover wall 396 in the axial direction of the cylindrical member 393. As illustrated in (b) of FIG. 29, a fitting cylinder part 397a is integrally provided on the inner side of the cap part 397. The fitting cylinder part 397a extends toward the proximal end side of the cylindrical member 393 and is fitted into an opening part 393d (refer to FIG. 26) provided on the distal end side of the cylindrical member 393, thereby blocking the opening part 393d. Here, the fitting cylinder part 397a corresponds to the fitting part in the present invention.

In a state in which the fitting cylinder part 397a is fitted into the opening part 393d, the pair of slits 393a and 393b in their entirety are not blocked by the fitting cylinder part 397a. That is, in a state in which the breather cap 395 is mounted in the cylindrical member 393, air can flow in and out between the inside and the outside of the cylindrical member 393 through the pair of slits 393a and 393b.

Moreover, a leg part 399 extending in the axial direction of the cylindrical member 393 is integrally provided on the other side of the slit cover wall 396 in the axial direction of the cylindrical member 393. One side of the leg part 399 in the longitudinal direction is provided integrally with the cap part 397, and the hook part 398 is integrally provided on the other side of the leg part 399 in the longitudinal direction.

As illustrated in FIG. 26, the hook part 398 protrudes in a direction intersecting the axial direction of the cylindrical member 393 at a predetermined height on the fitting cylinder part 397a side. Accordingly, the hook part 398 is hooked to an engagement part 373 which is provided integrally with the gear case 370. In addition, a convex part 398a formed to have substantially a columnar shape is provided integrally with the hook part 398. The convex part 398a extends toward the distal end side of the cylindrical member 393 and protrudes at a predetermined height with respect to the cap part 397.

Further, the convex part 398*a* of the hook part 398 is hooked to a concave part 373*a* of the engagement part 373 provided in the gear case 370. Here, the engagement part 373 of the gear case 370 is provided in the vicinity of the breathing mechanism 390 in the gear case 370 and protrudes at a predetermined height on the radially outer side of the cylindrical member 393. Specifically, the engagement part 373 includes the concave part 373*a* (refer to FIG. 26) formed to have substantially a triangular shape as illustrated in FIG. 27 and recessed in the axial direction of the cylindrical member 393. The concave part 373*a* is recessed to the gear cover 380 side in the axial direction of the cylindrical member 393, and the convex part 398*a* enters the concave part 373*a* and engages therewith.

In this manner, the fitting cylinder part 397*a* of the breather cap 395 is fitted into the opening part 393*d* of the cylindrical member 393 from one side (distal end side) of the cylindrical member 393 in the axial direction. In addition, the convex part 398*a* of the breather cap 395 engages with the concave part 373*a* of the engagement part 373 from the other side of the cylindrical member 393 in the axial direction. Accordingly, the breather cap 395 does not shake in the axial direction of the cylindrical member 393 and is firmly fixed to both the gear case 370 and the gear cover 380. That is, the convex part 398*a* of the hook part 398 has a function of preventing the fitting cylinder part 397*a* of the cap part 397 from coming off from the opening part 393*d*.

Here, in order to mount the breather cap 395 in the gear case 370 and the gear cover 380, first, the fitting cylinder part 397*a* is fitted into the opening part 393*d*. Subsequently, the convex part 398*a* is inserted into the concave part 373*a* and hooked thereto. At this time, since the breather cap 395 is made of a resin such as plastic, it has some flexibility. Thus, when the convex part 398*a* is hooked to the concave part 373*a*, the leg part 399 bends so that the convex part 398*a* can be easily hooked to the concave part 373*a*.

In this manner, in the present embodiment, the hook part 398 provided in the leg part 399 is hooked to the engagement part 373 of the gear case 370. Accordingly, the leg part 399 can be made relatively long so that hooking work can be easily performed. For instance, when the hook part 398 is hooked to the gear cover 380, the leg part 399 becomes short. Therefore, it is difficult to perform hooking work and there is a need to make the convex part 398*a* short. Thus, a fixing strength is reduced and it becomes easy to come off due to heat shrinkage or the like. However, if the material of the breather cap 395 is devised and a sufficient fixing strength can be secured, the hook part 398 can also be hooked to the gear cover 380. In this case, additional miniaturization of the breather cap 395 can be realized.

In addition, as illustrated in FIG. 26 and (a) of FIG. 29, the cap part 397 is provided with a penetration hole part 397*b* penetrating the cylindrical member 393 in the axial direction. The penetration hole part 397*b* faces the convex part 398*a* of the hook part 398 in the axial direction of the cylindrical member 393. Specifically, the penetration hole part 397*b* is provided at an intersection part of a line CL3 extending in the axial direction of the cylindrical member 393 and passing through the hook part 398, and the cap part 397. Accordingly, the penetration hole part 397*b* is disposed on the radially outer side of the cylindrical member 393 from the opening part 393*d*.

In this manner, since the line CL3 extending in the axial direction of the cylindrical member 393 and passing through the hook part 398 is disposed in a manner of being shifted (offset) in the radial direction of the cylindrical member 393 and the penetration hole part 397*b* is provided at a position facing the convex part 398*a* of the hook part 398 in the axial direction of the cylindrical member 393, the breather cap 395 can be easily manufactured using simple upper and lower molds without causing an undercut.

Moreover, on the inner side of the breather cap 395 and between the fitting cylinder part 397*a* and the penetration hole part 397*b*, a partitioning wall 397*c* for partitioning them is provided. As illustrated in FIG. 27, the partitioning wall 397*c* is formed to have substantially a V-shaped cross section in a direction intersecting the axial direction of the cylindrical member 393. Thus, the partitioning wall 397*c* has a function of reinforcing the slit cover wall 396.

As illustrated in FIG. 26 and (b) of FIG. 29, the proximal end side of the partitioning wall 397*c* is provided integrally with the cap part 397. On the other hand, the distal end side of the partitioning wall 397*c* protrudes toward the convex part 398*a* of the hook part 398 at a predetermined height. Specifically, a protrusion height of the partitioning wall 397*c* from the cap part 397 is a height corresponding to substantially twice a protrusion height of the fitting cylinder part 397*a* from the cap part 397.

Accordingly, for instance, even if rainwater or the like intrudes into the inner side from the radially outer side of the breather cap 395 through the penetration hole part 397*b*, rainwater or the like moving along the inner side of the penetration hole part 397*b* can be made difficult to reach the pair of slits 393*a* and 393*b*. That is, the partitioning wall 397*c* also has a function of curbing intrusion of rainwater or the like into the cylindrical member 393.

Next, the breathing function of the wiper motor 340 formed as described above and a function when it is exposed to water will be described in detail using FIG. 31. In FIG. 31, in order to facilitate understanding of a path along which rainwater WA3 moves, illustration of the filter 394 and the breather cap 395 is omitted.

First, the breathing function of the wiper motor 340 will be described.

If the wiper motor 340 installed in the engine room operates, the temperature inside the wiper motor 340 rises due to heat generated by the wiper motor 340 and a high-temperature atmosphere in the engine room. Further, if the rainwater WA3 spatters on the wiper motor 340 and the wiper motor 340 is exposed to water in this state, the wiper motor 340 is rapidly cooled. Thus, a temperature difference occurs between the inside and the outside of the wiper motor 340. Consequently, the hollow part 363 of the wiper motor 340 (refer to FIGS. 24, 26, and 27) is at a relatively low temperature compared to the outside of the wiper motor 340. Accordingly, the hollow part 363 is under a negative pressure, and air outside the gear case 370 flows into the hollow part 363 through the pair of slits 393*a* and 393*b*, the air passage 392*a*, and the communication hole 391 between the breather cap 395 and the cylindrical member 393. Accordingly, occurrence of a differential pressure between the inside and the outside of the wiper motor 340 is curbed.

In contrast, if the temperature inside the wiper motor 340 significantly rises due to a high-speed operation or the like of the wiper motor 340 performed for a long period of time and the temperature inside the wiper motor 340 exceeds the external temperature, the hollow part 363 is at a relatively high temperature compared to the outside of the wiper motor 340. Consequently, contrary to that described above, the hollow part 363 is under a positive pressure, and air inside the hollow part 363 is discharged to the outside through the communication hole 391, the air passage 392a, the pair of slits 393a and 393b, and a space between the breather cap 395 and the cylindrical member 393. Accordingly, occurrence of a differential pressure between the inside and the outside of the wiper motor 340 is curbed.

However, the inside and the outside of the wiper motor 340 communicate with each other at all times through a space between the breather cap 395 and the cylindrical member 393, the pair of slits 393a and 393b, the air passage 392a, and the communication hole 391. For this reason, air does not rapidly move between the inside and the outside of the wiper motor 340. Thus, even if the filter 394 is provided, the breathing function can be sufficiently exhibited.

Next, a function when the wiper motor 340 is exposed to water will be described.

For example, if the vehicle 310 travels in heavy rain, the rainwater WA3 intrudes into the engine room so that the wiper motor 340 is exposed to water. Consequently, as indicated by the arrow M31, the rainwater WA3 flows toward the breathing mechanism 390 along a surface of the gear cover 380. Thereafter, the rainwater WA3 which has reached the breathing mechanism 390 flows between the breather cap 395 and the cylindrical member 393 and flows in two directions with the cylindrical member 393 as a boundary as indicated by the arrow M32 and the arrow M33. Particularly, the rainwater WA3 flowing along the arrow M32 reaches a portion of the other slit 393b.

In contrast, the rainwater WA3 flowing along the arrow M33 reaches one rib member 393c (right side in the diagram), and thereafter, as indicated by the arrow M34, it flows downward to a side below the vehicle 310 from a portion of the one rib member 393c. Therefore, the rainwater WA3 flowing along the arrow M33 and the arrow M34 flows downward to a side below the vehicle 310 at a position away from the one slit 393a. At this time, since the one slit 393a is covered by the slit cover wall 396 (refer to FIG. 27), the rainwater WA3 is unlikely to reach the one slit 393a.

As indicated by the arrow M32, most of the rainwater WA3 which has reached the other slit 393b passes over the other slit 393b and flows along the arrow M35. Further, it reaches the other rib member 393c (left side in the diagram). Thereafter, the rainwater WA3 which has reached the other rib member 393c flows from a portion of the other rib member 393c as indicated by the arrow M36 and flows downward to a side below the vehicle 310 from between the breather cap 395 and the cylindrical member 393. Accordingly, the rainwater WA3 flowing along the arrow M32, the arrow M35, and the arrow M36 flows downward to a side below the vehicle 310 at a position away from the one slit 393a.

Some of the rainwater WA3 which has reached the other slit 393b may enter the inside of the cylindrical member 393 from the other slit 393b as indicated by the arrow M37 (dashed line). Further, the rainwater WA3 which has entered the inside of the cylindrical member 393 flows along the inner side of the cylindrical member 393 and smoothly gathers in the one slit 393a. Thereafter, as indicated by the arrow M38 (dashed line), the rainwater WA3 which has flowed along the inner side of the cylindrical member 393 flows downward to a side below the vehicle 310 from the one slit 393a through a space between the breather cap 395 and the cylindrical member 393.

Accordingly, the rainwater WA3 is unlikely to reach the small-diameter cylinder part 392 and the air passage 392a so that intrusion of rainwater or the like into the wiper motor 340 (hollow part 363) is curbed.

Here, for example, the wiper motor 340 can also be mounted in the vehicle 310 in an attachment posture as illustrated in FIG. 32. In other words, the wiper motor 340 according to the present embodiment can cope with attachment postures for various kinds of vehicles 310, and further improvement in water exposure reliability has been achieved.

Specifically, in an attachment posture of the wiper motor 340 (illustrated in FIG. 32) with respect to the vehicle 310, first, similar to the attachment posture illustrated in FIG. 22, the gear case 370 side where the output shaft 341 (refer to FIG. 22) protrudes faces a side below the vehicle 310, and the gear cover 380 side mounted in the gear case 370 faces a side above the vehicle 310. In addition, the deceleration mechanism part 360 side of the wiper motor 340 in the longitudinal direction is inclined toward a side below the vehicle 310. On the other hand, differently from the attachment posture illustrated in FIG. 22, the breathing mechanism 390 side of the wiper motor 340 in the transverse direction is inclined toward a side above the vehicle 310. Thus, the rainwater WA3 moving along the surface of the wiper motor 340 flows as indicated by the dashed line arrow.

Even if the wiper motor 340 is in such an attachment posture with respect to the vehicle 310, since the slit cover wall 396 of the breather cap 395 covers each of the pair of slits 393a and 393b from the radially outer side of the cylindrical member 393 as illustrated in FIG. 27, while the breathing function is secured, intrusion of the rainwater WA3 into the inner side of the cylindrical member 393 is curbed.

As described above in detail, according to the wiper motor 340 of the present embodiment, even if a breathing function is imparted to the gear cover 380 and the gear cover 380 is exposed to water, a differential pressure can be made difficult to occur between the inside and the outside of the gear cover 380. In addition, since the breather cap 395 covering the pair of slits 393a and 393b is provided, a situation in which rainwater or the like reaches the communication hole 391 through the slits 393a and 393b and the cylindrical member 393 can be curbed. Therefore, intrusion of rainwater or the like into the inner side of the gear cover 380 can be effectively curbed without relying on a large-sized waterproof cover, and therefore water exposure reliability can be improved. Moreover, since the breather cap 395 is mounted in the gear cover 380 and the gear case 370, versatility can be enhanced regardless of the length and the thickness of the frame member to which the wiper motor 340 is fixed.

In addition, the wiper motor 340 according to the present embodiment has the gear case 370 rotatably supporting the deceleration mechanism SD3, and the gear cover 380 mounted in the gear case 370. The gear case 370 is provided with the engagement part 373, and the gear cover 380 is provided with the cylindrical member 393.

Accordingly, the breather cap 395 can be mounted in a manner of straddling both the gear case 370 and the gear cover 380. Thus, the leg part 399 of the breather cap 395 can be made relatively long, and therefore hooking work of the breather cap 395 can be easily performed with respect to the gear case 370 and the gear cover 380.

Moreover, according to the wiper motor 340 of the present embodiment, the penetration hole part 397b penetrating the cylindrical member 393 in the axial direction is provided at an intersection part of a line CL3 extending in the axial direction of the cylindrical member 393 and passing through the hook part 398 (convex part 398a), and the cap part 397.

The penetration hole part 397b is disposed on the radially outer side of the cylindrical member 393 from the opening part 393d.

Accordingly, the breather cap 395 can be easily manufactured using simple upper and lower molds without causing an undercut.

In addition, according to the wiper motor 340 of the present embodiment, the cap part 397 is provided with the fitting cylinder part 397a extending toward the proximal end side of the cylindrical member 393 and fitted into the opening part 393d, and the hook part 398 is provided with the convex part 398a extending toward the distal end side of the cylindrical member 393 and engaging with the concave part 373a provided in the engagement part 373.

Accordingly, the breather cap 395 does not shake in the axial direction of the cylindrical member 393 and can be firmly fixed to both the gear case 370 and the gear cover 380.

Moreover, according to the wiper motor 340 of the present embodiment, water exposure reliability can be improved, a lifespan of the product can be extended, and therefore manufacturing energy saving can be achieved. Thus, in the Sustainable Development Goals (SDGs) led by the United Nations, it is possible to particularly contribute to Goal 7 (Ensure access to affordable, reliable, sustainable, and modern energy for all) and Goal 13 (Take urgent action to combat climate change and its impacts).

The present invention is not limited to the foregoing embodiments, and it goes without saying that various changes can be made within a range not departing from the gist thereof. For example, in the foregoing embodiments, the breathing mechanism 390 is provided in the gear cover 380, but the present invention is not limited thereto. For example, in a case of an attachment posture in which the output shaft 341 faces a side above the vehicle 310, a breathing mechanism can also be provided in the gear case 370.

In addition, in the foregoing embodiments, the wiper motor 340 is applied to a wiper device on the front side wiping the wiping ranges 313 on the windshield 312, but the present invention is not limited thereto and can also be applied to wiper devices on the rear side wiping a wiping range on a rear glass.

Moreover, in the foregoing embodiments, the motor part 350 of the wiper motor 340 is an electric motor with brushes including the brushes 357, but the present invention is not limited thereto, and a brushless electric motor including no brush in a motor part can also be employed.

In addition, in the foregoing embodiments, the wiper motor 340 has been described as an example, but the present invention is not limited thereto and can also be applied to motors with a deceleration mechanism in a similar attachment posture for other purposes having a probability of water exposure.

Furthermore, the material, the shape, the dimension, the number, the installation place, and the like of each of the constituent elements in the foregoing embodiments are arbitrary as long as the present invention can be achieved and are not limited to the foregoing embodiments.

INDUSTRIAL APPLICABILITY

A motor with a deceleration mechanism is used as a drive source for a wiper device mounted in a vehicle such as an automobile and is used for wiping rainwater, dust, and the like which has adhered to a window glass by driving wiper arms for swinging operation.

What is claimed is:

1. A motor with a deceleration mechanism, including: a motor part having a rotation shaft; and a deceleration mechanism part having the deceleration mechanism for decelerating rotation of the rotation shaft, the motor with the deceleration mechanism comprising:

a housing which accommodates the deceleration mechanism;

a communication hole which is provided in the housing and allows communication between an inside and an outside of the housing;

a cylindrical member which is provided outside the housing, which extends in an axial direction of the communication hole, and of which an inside communicates with the communication hole; and at least one slit which is provided in the cylindrical member and extend in an axial direction of the cylindrical member, wherein an opening width of the at least one slit in a circumferential direction of the cylindrical member is narrower on an outer side than on an inner side of the cylindrical member, wherein each tip end side of the at least one slit on the outer side of the cylindrical member is tapered in the circumferential direction of the cylindrical member.

2. The motor with the deceleration mechanism according to claim 1, wherein a small-diameter cylinder part having a smaller diameter than the cylindrical member is provided inside the cylindrical member, and an inside of the small-diameter cylinder part communicates with the inside of the cylindrical member and the communication hole.

3. The motor with the deceleration mechanism according to claim 2, wherein a distal end side of the cylindrical member in the axial direction is blocked by a cap member.

4. The motor with the deceleration mechanism according to claim 3, wherein a fitting cylinder part fitted into the cylindrical member is provided in the cap member, and a distal end side of the small-diameter cylinder part in the axial direction enters an inside of the fitting cylinder part.

5. The motor with the deceleration mechanism according to claim 1, wherein rib members extending in the axial direction of the cylindrical member are provided on an outer circumferential surface of the cylindrical member.

6. The motor with the deceleration mechanism according to claim 5, wherein the at least one slit and the rib members are alternately disposed in the circumferential direction of the cylindrical member.

7. The motor with the deceleration mechanism according to claim 1, wherein rib members protruding toward a radially outer side of the cylindrical member and extending in the axial direction of the cylindrical member are integrally provided on the radially outer side of the cylindrical member.

8. The motor with the deceleration mechanism according to claim 7, wherein a recessed part recessed toward a proximal end side of the rib members in the axial direction of the cylindrical member is provided on a distal end side of the rib members in the axial direction of the cylindrical member and between the cylindrical member and the rib members.

9. The motor with the deceleration mechanism according to claim 7, wherein a recessed part recessed toward a proximal end side of the cylindrical member in the axial direction is provided on a distal end side of the cylindrical member in the axial direction.

10. The motor with the deceleration mechanism according to claim 7, wherein length dimensions of the rib members are greater than a length dimension of the cylindrical member in the axial direction of the cylindrical member.

11. The motor with the deceleration mechanism according to claim 7, wherein a tapered part in which a height dimension of the rib member in a radial direction of the cylindrical member gradually decreases toward a distal end side of the rib members is provided on the distal end side of the rib members in the axial direction of the cylindrical member.

12. The motor with the deceleration mechanism according to claim 1, wherein a slit cover member mounted in the housing and covering the at least one slit from a radially outer side of the cylindrical member is provided, and the slit cover member includes a cap part provided on a distal end side of the cylindrical member and blocking an opening part, and a hook part hooked in an engagement part provided in the housing.

13. The motor with the deceleration mechanism according to claim 12, wherein the housing has a gear case rotatably supporting the deceleration mechanism, and a gear cover mounted in the gear case, and the engagement part is provided in the gear case, and the cylindrical member is provided in the gear cover.

14. The motor with the deceleration mechanism according to claim 12, wherein a penetration hole part penetrating in the axial direction of the cylindrical member is provided at an intersection part between a line extending in the axial direction of the cylindrical member and passing through the hook part and the cap part, and the penetration hole part is disposed on the radially outer side of the cylindrical member from the opening part.

15. The motor with the deceleration mechanism according to claim 12, wherein a fitting part extending toward a proximal end side of the cylindrical member and fitted into the opening part is provided in the cap part, and a convex part extending toward the distal end side of the cylindrical member and engaged with a concave part provided in the engagement part is provided in the hook part.

\*    \*    \*    \*    \*